US012750241B2

(12) United States Patent

Zhang et al.

(10) Patent No.: US 12,750,241 B2

(45) Date of Patent: Sep. 29, 2026

(54) IDENTITY VERIFICATION METHOD, RELATED APPARATUS, AND MEDIUM

(71) Applicant: Tencent Technology (Shenzhen) Company Limited, Shenzhen (CN)

(72) Inventors: Hui Zhang, Shenzhen (CN); Hu Lan, Shenzhen (CN); Zongyou Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 24 days.

(21) Appl. No.: 19/059,850

(22) Filed: Feb. 21, 2025

(65) Prior Publication Data

US 2025/0193023 A1 Jun. 12, 2025

Related U.S. Application Data

(63) Continuation of application No. PCT/CN2023/126412, filed on Oct. 25, 2023.

(30) Foreign Application Priority Data

Feb. 16, 2023 (CN) ......................... 202310166040.2

(51) Int. Cl.

*G06F 21/64* (2013.01)
*G06F 21/71* (2013.01)

(Continued)

(52) U.S. Cl.

CPC .......... *H04L 9/3247* (2013.01); *H04L 9/0825* (2013.01)

(58) Field of Classification Search

None

See application file for complete search history.

(56) References Cited

U.S. PATENT DOCUMENTS

| | | | | |
|---|---|---|---|---|
| 2009/0260058 A1* | 10/2009 | Huang | .................. | G06F 21/445 713/176 |
| 2022/0043926 A1 | 2/2022 | Saad et al. | | |
| 2025/0193023 A1* | 6/2025 | Zhang | ..................... | G06F 21/45 |

FOREIGN PATENT DOCUMENTS

| | | |
|---|---|---|
| CN | 108696511 A | 10/2018 |
| CN | 110224837 A | 9/2019 |

(Continued)

OTHER PUBLICATIONS

A Permissioned Blockchain-Based Platform for Education Certificate Verification. Cheng et al. Springer. (Year: 2020).*

(Continued)

*Primary Examiner* — Venkat Perungavoor

(74) *Attorney, Agent, or Firm* — Crowell & Moring LLP

(57) ABSTRACT

This application provides an identity verification method, a related apparatus, and a medium. The identity verification method includes: receiving a target declaration issuance request from an object terminal; performing authentication on a target attribute, and generating a target declaration after the authentication succeeds; generating a first tree; and transmitting the target declaration to the object terminal, to cause the object terminal to transmit, when receiving a verification request of a verification device for the target attribute, the target declaration and first bypass nodes of a first path in the first tree to the verification device for first verification. In embodiments of this application, identity verification efficiency and security of object identity information can be improved. The embodiments of this application can be applied to various scenarios such as data security, a blockchain, data storage, and information technologies.

20 Claims, 33 Drawing Sheets

(51) Int. Cl.
*H04L 9/08* (2006.01)
*H04L 9/32* (2006.01)
*G06F 21/78* (2013.01)

(56) References Cited

FOREIGN PATENT DOCUMENTS

| | | | | | |
|---|---|---|---|---|---|
| CN | 110311782 | A | | 10/2019 | |
| CN | 111147477 | A | | 5/2020 | |
| CN | 110224837 | B | * | 11/2021 | ........... H04L 9/3221 |
| CN | 112989294 | B | * | 8/2022 | ............. G06F 21/31 |
| CN | 115622812 | A | | 1/2023 | |

OTHER PUBLICATIONS

International Search Report and Written Opinion including English translations, mailed Jan. 23, 2024, pp. 1-10, issued in PCT/CN2023/126412, China National Intellectual Property Administration, Beijing, China.

* cited by examiner

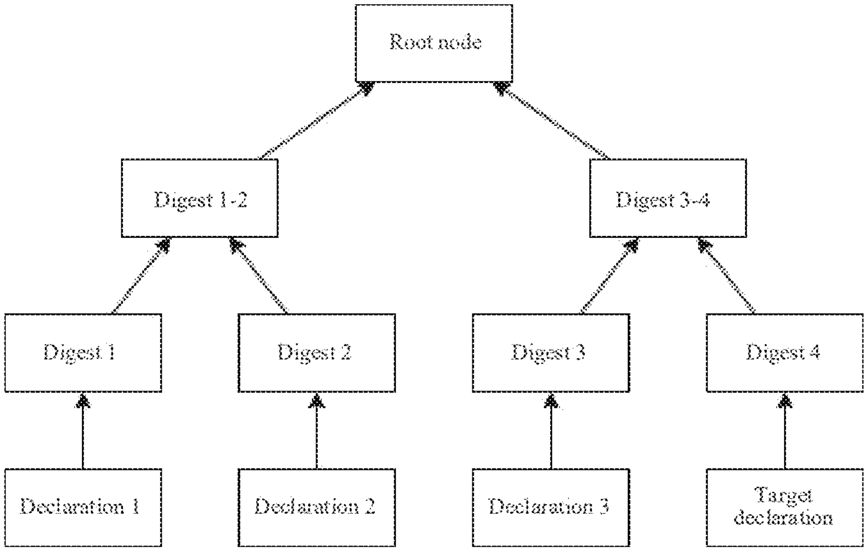
FIG. 4A
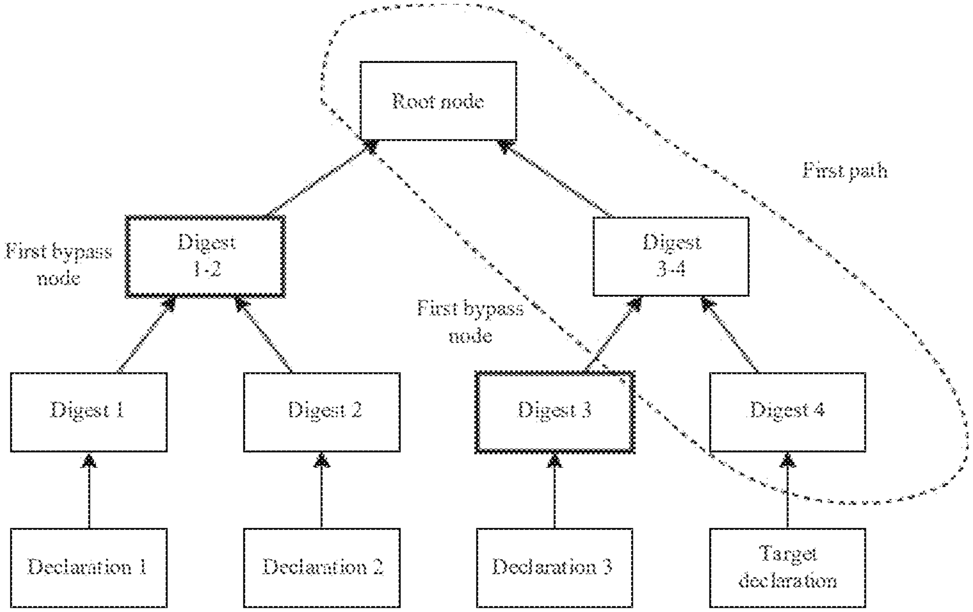
FIG. 4B
| | | | | | | |
|---|---|---|---|---|---|---|
| Object terminal identifier | Declaration issuing device identifier | Task level | Target attribute 1 | Target attribute 2 | Target attribute 3 | Another field |
FIG. 5

| | |
|---|---|
| Identifier 1 of a block | Object identifier 1 |
| Identifier 2 of a block | Object identifier 2 |
| Identifier 3 of a block | Object identifier 3 |
| ... | ... |
| Identifier n of a block | Object identifier n |

| | |
|---|---|
| Object identifier 1 | Object identity tree 1 |
| Object identifier 2 | Object identity tree 2 |
| Object identifier 3 | Object identity tree 3 |
| ... | ... |
| Object identifier n | Object identity tree n |

IDENTITY VERIFICATION METHOD, RELATED APPARATUS, AND MEDIUM

RELATED APPLICATION

This application is a continuation application of PCT Patent Application No. PCT/CN2023/126412, filed on Oct. 25, 2023, which claims priority to Chinese Patent Application No. 2023101660402, filed with the China National Intellectual Property Administration on Feb. 16, 2023, each of which is incorporated herein by reference in its entirety.

FIELD OF THE TECHNOLOGY

This application relates to the field of data security, and specifically, to an identity verification technology.

BACKGROUND OF THE DISCLOSURE

Currently, object identity verification is usually performed in a centralized manner. Each time an object logs in to an application or a website requiring identity verification, identity verification needs to be performed once. The object needs to repeatedly upload a same original certifying material (such as a material configured for reflecting identity information) for verification, resulting in low verification efficiency. In addition, the application or the website directly contacts the original certifying material of the object. In this way, the identity information is easily leaked out, and the object lacks a capability of autonomously controlling the identity information, resulting in low security of the identity information.

SUMMARY

Embodiments of this disclosure provide an identity verification method, a related apparatus, and a medium, which can improve identity verification efficiency and ensure security of object identity information.

According to an aspect of this application, an identity verification method is provided, performed by an electronic device. The method includes:

- receiving a target declaration issuance request transmitted by an object terminal;
- performing authentication on a target attribute of an identity of an object that initiates the target declaration issuance request;
- generating a target declaration, the target declaration being an authentication result for the target attribute of the object identity;
- generating a first tree, a digest of the target declaration being a bottom-layer node of the first tree, digests of other declarations issued to the object being used as other bottom-layer nodes of the first tree, and a digest operation being performed on each two adjacent nodes on each layer of the first tree to generate and connect to a higher-layer node, until a root node of the first tree is generated; and
- transmitting the target declaration to the object terminal, to cause the object terminal to transmit, when receiving a verification request of a verification device for the target attribute, the target declaration and first bypass nodes of a first path in the first tree to the verification device for first verification, the first path being a path from the digest of the target declaration to the root node in the first tree, and the first bypass nodes being lower-layer nodes to which other nodes except the digest of the target declaration are further connected on the first path.

According to an aspect of this application, an identity verification apparatus is provided. The apparatus includes: a first receiving unit, configured to receive a target declaration issuance request transmitted by an object terminal; an authentication unit, configured to perform authentication on a target attribute of an identity of an object that initiates the target declaration issuance request; a first generation unit, configured to generate a target declaration, the target declaration being an authentication result for the target attribute of the object identity; a second generation unit, configured to generate a first tree, a digest of the target declaration being a bottom-layer node of the first tree, digests of other declarations issued to the object being used as other bottom-layer nodes of the first tree, and a digest operation being performed on each two adjacent nodes on each layer of the first tree to generate and connect to a higher-layer node, until a root node of the first tree is generated; and a first transmission unit, configured to transmit the target declaration to the object terminal, to cause the object terminal to transmit, when receiving a verification request of a verification device for the target attribute, the target declaration and first bypass nodes of a first path in the first tree to the verification device for first verification, the first path being a path from the digest of the target declaration to the root node in the first tree, and the first bypass nodes being lower-layer nodes to which other nodes except the digest of the target declaration are further connected on the first path.

According to an aspect of this application, an electronic device is provided, including a memory and a processor, the memory having a computer program stored therein, the processor, when executing the computer program, implementing the identity verification method described above.

According to an aspect of this application, a computer-readable storage medium is provided, having a computer program stored therein, the computer program, when executed by a processor, implementing the identity verification method described above.

According to an aspect of this application, a computer program product is provided, including a computer program, the computer program being read and executed by a processor of a computer device, to cause the computer device to perform the identity verification method described above.

In the embodiments of this application, an object terminal does not need to upload a verification material once for verification each time the object terminal receives a verification request of a verification device, but requests, for a to-be-subjected-to-verification target attribute of an identity of an object, a declaration issuing device to issue a target declaration in advance, where the target declaration is an authentication result for the target attribute. Then, each time the object terminal receives the verification request of the verification device, the object terminal directly transmits the target declaration issued by the declaration issuing device to the verification device, thereby reducing repeated verification and improving verification efficiency. The declaration issuing device further maintains a first tree, where bottom-layer nodes of the first tree are digests of declarations issued to the object. A digest operation is performed on the digests upward layer by layer, to obtain a root node of the first tree. When the target declaration is transmitted to the verification device for verification, first bypass nodes further connected to a first path from a bottom-layer node corresponding to the target declaration to the root node in the first tree are also transmitted to the verification device. In this way, the verification device can recover a root node of the first tree according to the target declaration and the first bypass nodes, and compares the recovered root node with the real root node of the first tree. If the recovered root node is consistent with the real root node of the first tree, it is proved that the target declaration is a declaration that the declaration issuing device has really issued to the object, and the target declaration is credible. During verification, an original identity certifying material is not provided, and underlying identity information of the object is not contacted, but only the target declaration of the declaration issuing device is provided, thereby improving security of the object identity information during the verification.

BRIEF DESCRIPTION OF THE DRAWINGS

FIG. 4A shows an exemplary structure of a first tree according to an embodiment of this application.

FIG. 4B is a schematic diagram of first bypass nodes of a first path of the first tree in FIG. 4A.

FIG. 5 shows a frame structure of a target declaration issuance request in operation 310 in FIG. 3.

DESCRIPTION OF EMBODIMENTS

Figure 1:
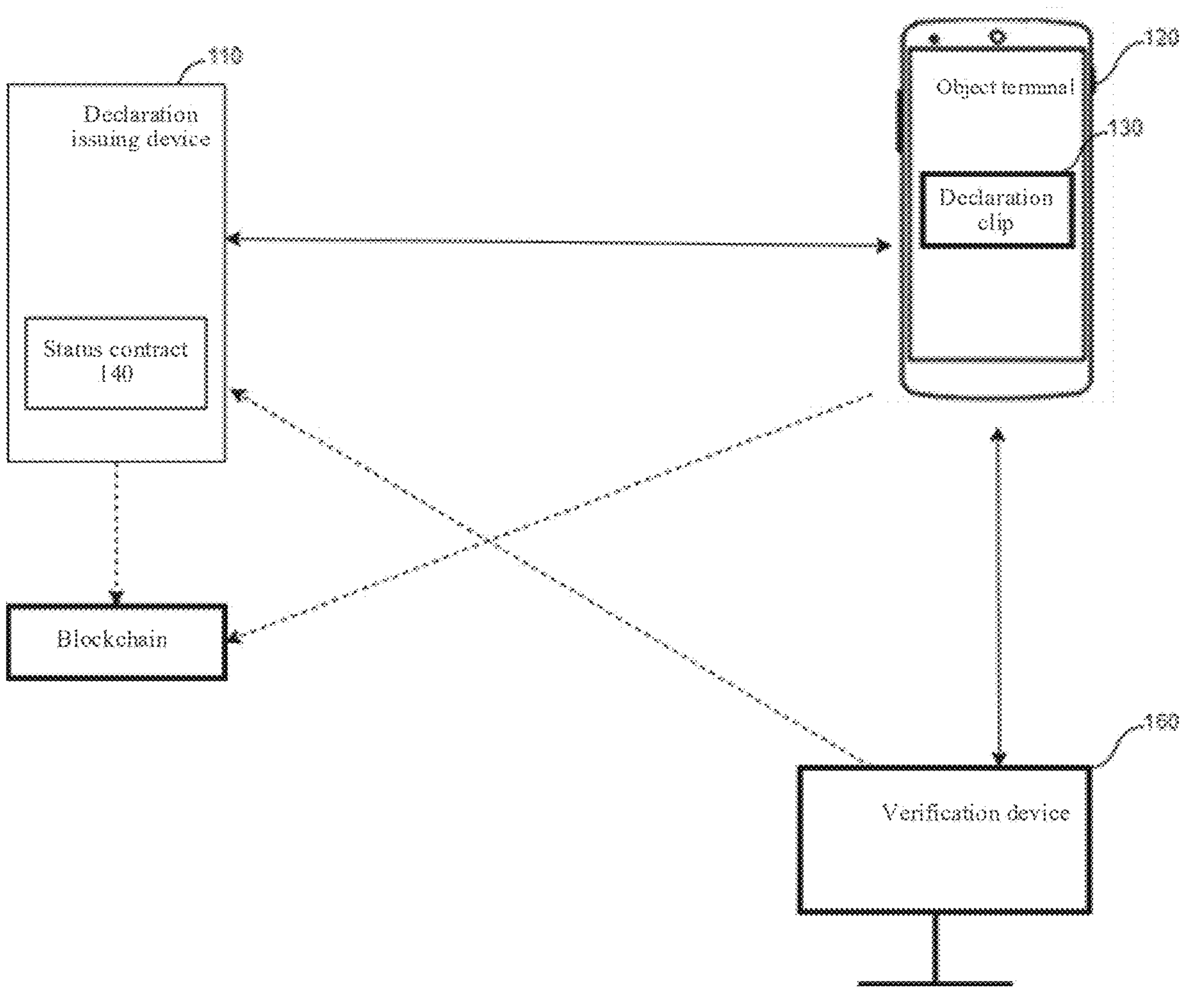
FIG. 1 is a diagram of a system architecture of a system to which an identity verification method according to an embodiment of this application is applied.

Description of a System Architecture of a System and Scenarios to which the Embodiments of this Application are Applied FIG. 1 is a diagram of an architecture of a system to which an identity verification method according to an embodiment of this application is applied. The architecture of the system includes a declaration issuing device 110, an object terminal 120, a verification device 160, a blockchain, and the like.

The object terminal 120 may be in various forms such as a desktop computer, a laptop computer, a personal digital assistant (PDA), a mobile phone, an in-vehicle terminal, a home theater terminal, and a dedicated terminal. In addition, the object terminal 120 may be a single device, or may be a set formed by a plurality of devices. The object terminal 120 includes a declaration clip 130, where the declaration clip 130 is configured to store an identity declaration received by the object terminal 120 from the declaration issuing device 110.

The declaration issuing device 110 and the verification device 160 are computer systems configured to provide some services to the object terminal 120. The declaration issuing device 110 provides a service of issuing an identity declaration to an object. The verification device 160 provides a service of accessing content by object, but verification needs to be performed on an identity of the object before the object accesses the content.

Compared with the object terminal 120, the declaration issuing device 110 and the verification device 160 have higher requirements in aspects such as stability, security, and performance. The declaration issuing device 110 and the verification device 160 each may be a high-performance computer, a cluster of a plurality of high-performance computers, a part (for example, a virtual machine) of a high-performance computer that is drawn out, a combination of parts (for example, virtual machines) of a plurality of high-performance computers that are drawn out respectively, or the like in a network platform. For example, the declaration issuing device 110 may be a server that issues the identity declaration to the object. The declaration issuing device includes a status contract 140, where the status contract 140 is configured to perform verification on whether a status transition of the identity declaration is appropriate, and store the verified identity declaration in a block, to record the block on the blockchain. For example, the verification device 160 may be a server that performs identity verification when the object terminal is logged in.

The embodiments of this application may be applied to a plurality of scenarios, such as a website login identity filtering scenario shown in FIG. 2A to FIG. 2K.

The identity verification refers to performing verification and reviewing on authenticity of a user identity by using a specific means, to confirm that an object who currently declares that the object has an identity is really the declared identity.

There are many identity verification methods, which may be basically classified into identity verification based on a shared key, identity verification based on biological features, and identity verification based on a public key encryption algorithm. Security of different identity verification methods also varies.

A process of implementing identity verification in a website login identity filtering scenario is described in detail below with reference to FIG. 2A to FIG. 2K.

Figure 2A:
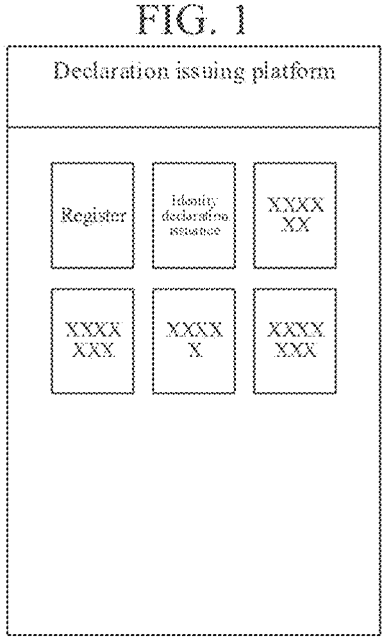
FIG. 2A to FIG. 2K are schematic diagrams when an identity verification method according to an embodiment of this application is applied to a website login identity filtering scenario.

As shown in FIG. 2A, the object terminal 120 is a mobile phone terminal. When an object logs in to a website requiring identity verification, the object clicks on a "register" button on a declaration issuing platform in advance to perform account registration. After the account registration is completed, the object may log in to the declaration issuing platform and click on an "identity declaration issuance" button on the declaration issuing platform, to enter an identity declaration issuing procedure.

Figure 2B:
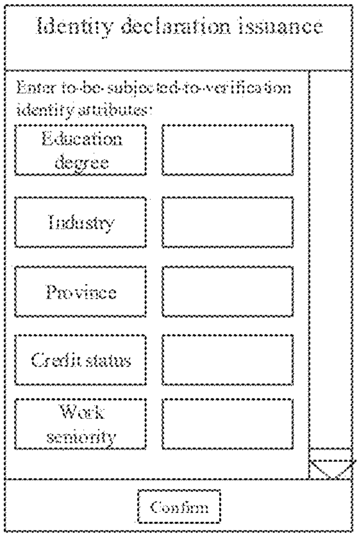

As shown in FIG. 2B, after the object clicks on the "identity declaration issuance" button on the declaration issuing platform to enter the identity declaration issuing procedure, prompt information "Enter to-be-subjected-to-verification identity attributes" is displayed on an interface, to prompt the object to enter the to-be-subjected-to-verification identity attributes, and a plurality of pieces of identity attribute information that the object needs to fill in are displayed on the interface. The series of identity attribute information may include, for example, an education degree, an industry, a province, a credit status, work seniority, and the like, so that the object enters corresponding authentication information in input boxes corresponding to the identity attributes according to an actual requirement.

Figure 2C:
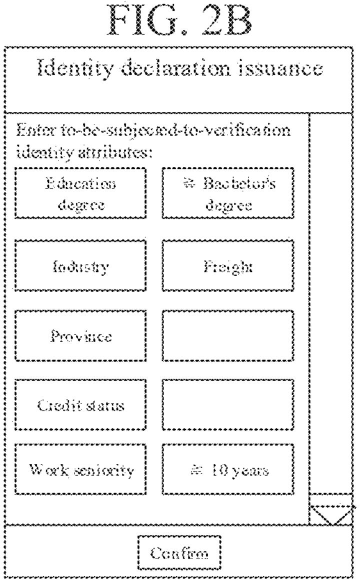

As shown in FIG. 2C, when the object enters the authentication information in the input boxes corresponding to the identity attributes, the object enters "not lower than a Bachelor's degree" in an input box corresponding to the education degree, enters "freight" in an input box corresponding to the industry, and enters "not less than 10 years" in an input box corresponding to the work seniority. After the object enters the authentication information corresponding to the to-be-subjected-to-verification identity attributes, the object clicks on a "confirm" button below, to determine that the identity declaration is issued based on the foregoing identity attributes.

Figure 2D:
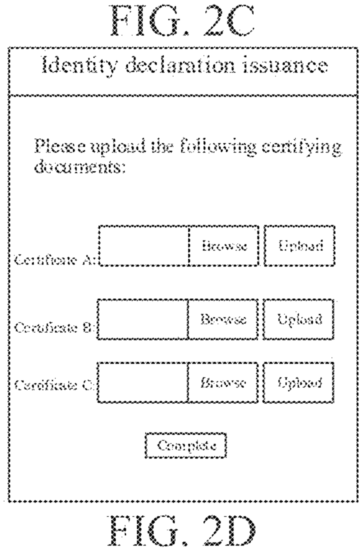

As shown in FIG. 2D, after the object clicks on the "confirm" button, an operation of uploading certifying documents is performed on the interface, and prompt information "Please upload the following certifying documents" is displayed on the interface, to prompt the object to upload certifying materials. The certifying materials include certifying materials corresponding to a certificate A, a certificate B, and a certificate C. An upload path of the certifying material corresponding to each certificate is further displayed on the interface. For example, when the object uploads the certifying material of the certificate A, the object may click on a "browse" button behind the certificate A, to select the certifying material from a local folder, and click on an "upload" button behind the certificate A to upload the corresponding certifying material to the declaration issuing platform.

Figure 2E:
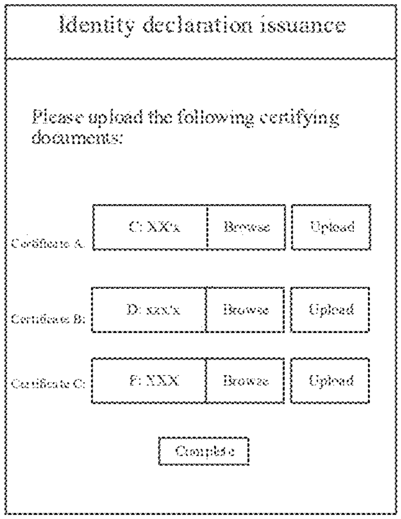

As shown in FIG. 2E, when the object uploads the certifying material of the certificate A, the object clicks on the "browse" button behind the certificate A, to select a storage path of the certifying material from a local magnetic disk C, and clicks on the "upload" button behind the certificate A to upload the corresponding certifying material; when the object uploads the certifying material of the certificate B, the object clicks on a "browse" button behind the certificate B, to select a storage path of the certifying material from a local magnetic disk D, and clicks on an "upload" button behind the certificate B to upload the corresponding certifying material; and when the object uploads the certifying material of the certificate C, the object clicks on a "browse" button behind the certificate C, to select a storage path of the certifying material from a local magnetic disk F, and clicks on an "upload" button behind the certificate C to upload the corresponding certifying material. In this manner, the object can upload the certifying materials of all the certificates to the declaration issuing platform. In this case, the object clicks on a "complete" button below the interface, to jump to a next operation.

Figure 2F:
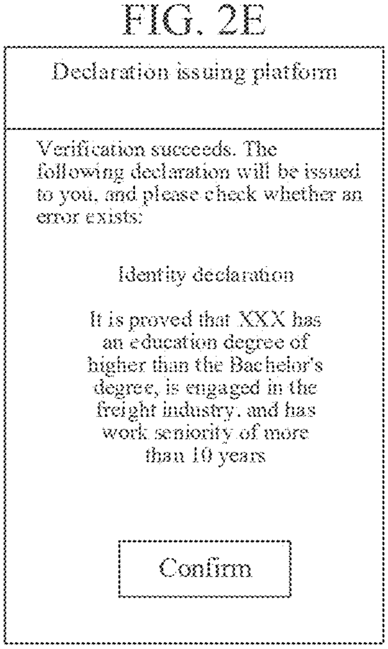

As shown in FIG. 2F, after the object completes uploading of all the certifying materials, the declaration issuing platform performs identity verification on the object according to the certifying materials and the to-be-subjected-to-verification identity attributes. After the verification is completed, a verification result is displayed on the interface. When the verification result indicates that the verification succeeds, the identity declaration is issued to the object, and prompt information "Verification succeeds. The following declaration will be issued to you, and please check whether an error exists" and a "confirm" button are displayed, to prompt the object to check and confirm the issued identity declaration. Content of the identity declaration issued by the declaration issuing platform to the object is "It is proved that XXX has an education degree of higher than the Bachelor's degree, is engaged in the freight industry, and has work seniority of more than 10 years".

Figure 2G:
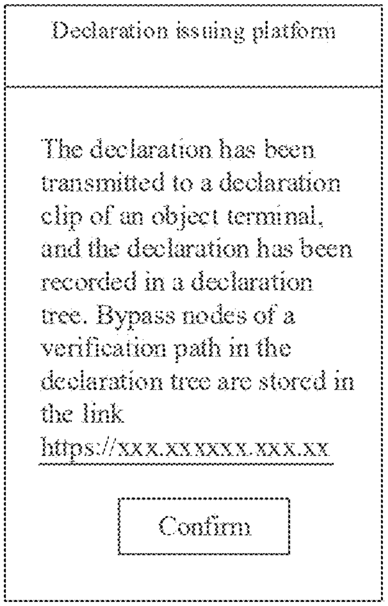

As shown in FIG. 2G, after the object checks and confirms the issued identity declaration, the declaration issuing platform transmits the declaration to a declaration clip of the object terminal, to record the declaration in a declaration tree. In addition, the declaration issuing platform may further display prompt information "The declaration has been transmitted to the declaration clip of the object terminal, and the declaration has been recorded in the declaration tree" on the interface, and provide a storage link of bypass nodes of a verification path in the declaration tree to the object. The object can confirm the foregoing prompt information through a "confirm" button below the interface.

Figure 2H:
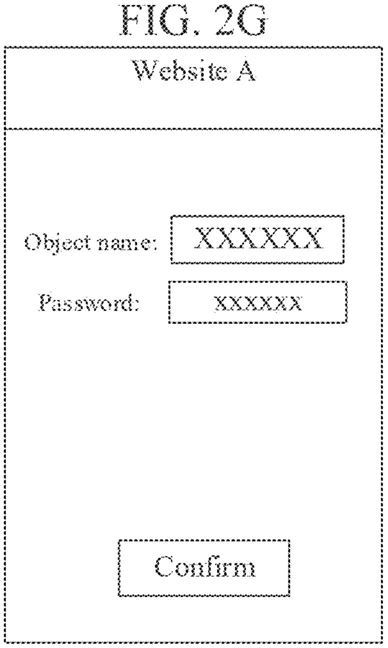

As shown in FIG. 2H, when the object logs in to a website A, the object first enters an object name and a password of the object on a login interface of the website A, and clicks on a "confirm" button to perform account login.

Figure 2I:
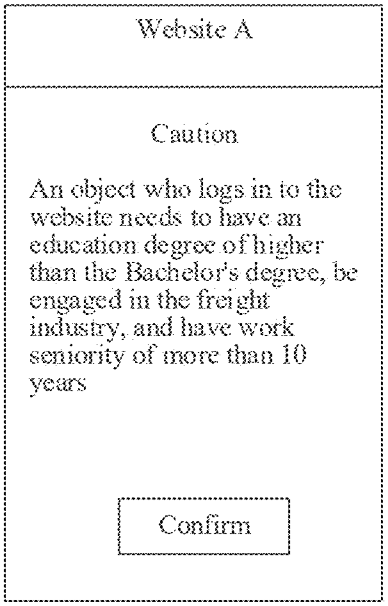

As shown in FIG. 2I, in response to the login operation of the object, the website A displays prompt information "An object who logs in to the website needs to have an education degree of higher than the Bachelor's degree, be engaged in the freight industry, and have work seniority of more than 10 years", and provides a "confirm" button for the object to perform confirmation.

Figure 2J:
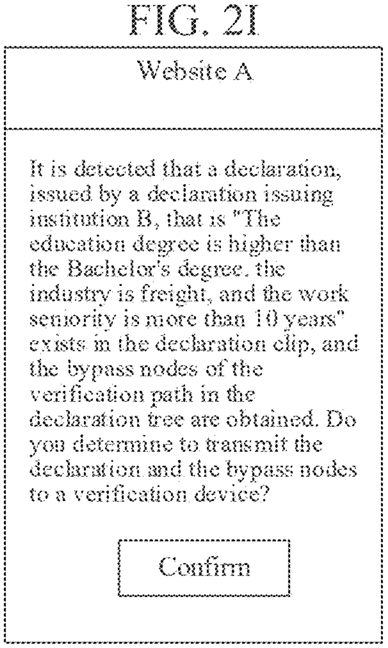

As shown in FIG. 2J, after the object reads the prompt information of the website A and clicks on the "confirm" button, prompt information "It is detected that a declaration, issued by a declaration issuing institution B, that is 'The education degree is higher than the Bachelor's degree, the industry is freight, and the work seniority is more than 10 years' exists in the declaration clip, and the bypass nodes of the verification path in the declaration tree are obtained. Do you determine to transmit the declaration and the bypass nodes to a verification device?" and a "confirm" button are displayed on an interface of the website A, to query whether the object provides the declaration and the bypass nodes (described in detail below) to the verification device for identity verification.

Figure 2K:

As shown in FIG. 2K, after the object reads the prompt information of the website A and clicks on the "confirm" button, the verification device performs identity verification based on the declaration and the bypass nodes provided by the object, to generate a verification result. In addition, prompt information "Verification succeeds. The object may log in to a web page. The interface will be jumped after 5s" is displayed on the interface of the website A, so that the object can smoothly complete the identity verification on the website A and log in to the website A.

General Description of the Embodiments of this Application

According to an embodiment of this application, an identity verification method is provided.

The identity verification method is often applied to a task such as website login identity filtering in FIG. 2A to FIG. 2K. Specifically, identity verification mainly refers to verifying that an object who currently declares that the object has an identity is really the declared identity. Currently, each time the object logs in to an application or a website requiring identity verification, identity verification needs to be performed once. The object needs to repeatedly upload a same original certifying material for verification, resulting in low verification efficiency. In addition, the application or the website directly contacts the original certifying material of the object. In this way, identity information is easily leaked out, resulting in low security of the identity information. An embodiment of this application provides a solution in which an identity declaration is issued by a declaration issuing device; and when an object logs in to an application or a website requiring identity verification, during verification, no identity certifying material is provided, but only a target declaration of the declaration issuing device is provided, thereby improving verification efficiency and ensuring security of identity information.

Figure 3:
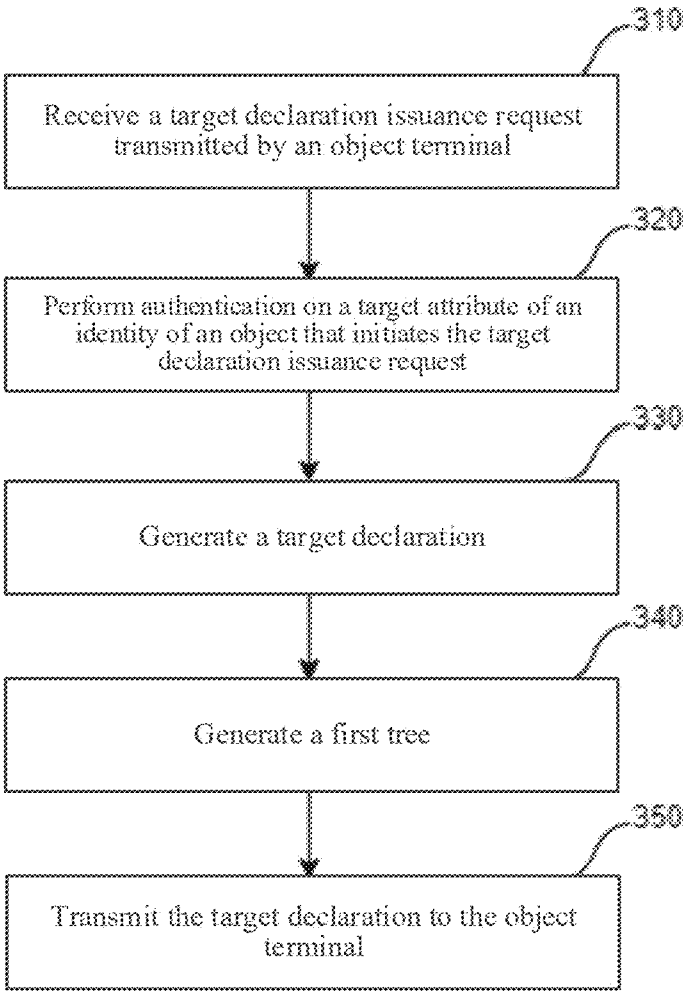
FIG. 3 is a flowchart of an identity verification method according to an embodiment of this application.

As shown in FIG. 3, an identity verification method according to an embodiment of this application includes the following operations.

Operation 310: Receive a target declaration issuance request transmitted by an object terminal.

Operation 320: Perform authentication on a target attribute of an identity of an object that initiates the target declaration issuance request.

Operation 330: Generate a target declaration.

Operation 340: Generate a first tree.

Operation 350: Transmit the target declaration to the object terminal.

Operation 310 to operation 350 are briefly described below.

In operation 310, the target declaration issuance request is a request that the object terminal requests a declaration issuing device to issue the target declaration in advance for the to-be-subjected-to-verification target attribute of the object identity. The target declaration is an authentication result for the target attribute of the object identity. The target declaration can reflect whether the target attribute of the object identity satisfies an authentication requirement. The target attribute includes to-be-subjected-to-verification data related to the object identity of the object terminal. For example, the target attribute may include an education degree, an industry, work seniority, and the like of a target object using the object terminal.

In operation 320, during authentication of the target attribute, verification is performed on whether the target attribute satisfies the authentication requirement. For example, if the authentication requirement is that the education degree is higher than a Bachelor's degree, the target attribute indicates an actual education degree of an object M. In this case, verification needs to be performed on whether the actual education degree of the object is higher than the Bachelor's degree.

In operation 330, when the target attribute satisfies the authentication requirement, it is determined that the authentication succeeds, and the corresponding target declaration is generated for the verified target attribute. For example, the authentication requirement is that the education degree is higher than the Bachelor's degree, and the target attribute indicates that the actual education degree of the object M is a postgraduate degree. Therefore, the target attribute of the object M satisfies the authentication requirement. In this case, it is determined that the authentication succeeds, and a target declaration "The education degree of the object M satisfies the requirement that the education degree is higher than the Bachelor's degree" is generated for the object M. Certainly, when the target attribute does not satisfy the authentication requirement, it is determined that the authentication fails. In this case, generation of the target declaration may be rejected, or a target declaration configured for reflecting that the authentication of the target attribute fails may be generated.

In operation 340, the first tree is usually a binary tree, or may be a multiway tree. The first tree in this embodiment of this application has all features of a tree structure. The tree structure usually includes a plurality of nodes, and the plurality of nodes includes at least one leaf node and one root node, and usually further includes a plurality of intermediate nodes between the leaf node and the root node. Therefore, in a feature tree in this embodiment of this application, a digest of the target declaration is used as a bottom-layer node of the first tree, namely, a lowest-layer leaf node in the first tree; digests of other declarations issued to the object are used as other bottom-layer nodes of the first tree, namely, other lowest-layer leaf nodes in the first tree; and a digest operation may be performed on each two adjacent nodes on each layer of the first tree to generate and connect to a higher-layer node, until a root node of the first tree is generated, to obtain the complete first tree.

As shown in FIG. 4A, the other declarations issued to the object include a declaration 1, a declaration 2, and a declaration 3. The target declaration is a fourth declaration issued to the object. First, the digest operation is performed on the declaration 1, to obtain a digest 1 corresponding to the declaration 1; the digest operation is performed on the declaration 2, to obtain a digest 2 corresponding to the declaration 2; the digest operation is performed on the declaration 3, to obtain a digest 3 corresponding to the declaration 3; and the digest operation is performed on the target declaration, to obtain a digest 4 corresponding to the target declaration, and the digest 1, the digest 2, the digest 3, and the digest 4 are used as the bottom-layer nodes of the first tree. Next, the digest operation is performed on the digest 1 and the digest 2, to generate and connect to a higher-layer node, namely, a digest 1-2; this may be considered as a two step operation: 1) generate digest 1-2 based on digests 1 and 2, and 2) connect digests 1 and 2 to the generated node, digest 1-2. And the digest operation is performed on the digest 3 and the digest 4, to generate and connect to a higher-layer node, namely, a digest 3-4. Finally, the digest operation is performed on the digest 1-2 and the digest 3-4, to generate and connect to a higher-layer node, namely, the root node of the first tree. So far, the complete first tree is obtained. As described above, in this disclosure, the generate and connect operation may be considered as a two step operation.

In operation 350, the target declaration is transmitted to the object terminal, to cause the object terminal to transmit, when receiving a verification request of a verification device for the target attribute, the target declaration and first bypass nodes of a first path in the first tree to the verification device for first verification.

The first path is a path from the digest of the target declaration to the root node of the first tree in the first tree, and the first bypass nodes are bottom-layer nodes to which other nodes except the digest of the target declaration are connected on the first path. Stated in another way, the first bypass nodes are nodes that connect to the first path but are not in the second path.

As shown in FIG. 4B, the digest of the target declaration issued to the object is the digest 4, and the first path is a path from the digest 4 to the root node in the first tree, where the first path is a path connecting the digest 4, the digest 3-4, and the root node. The digest 3-4 needs to be generated based on the digest 3 and the digest 4, and if a feature of the digest 4 is known, the digest 3 further needs to be obtained. Therefore, the digest 3 is determined as a first bypass node. Similarly, the root node needs to be generated based on the digest 1-2 and the digest 3-4, and after the digest 3-4 is generated according to the digest 4 and the digest 3 used as the first bypass node, the digest 1-2 further needs to be obtained. Therefore, the digest 1-2 is also determined as a first bypass node. Therefore, the first bypass nodes of the first path include the digest 1-2 and the digest 3, and the first bypass nodes are indicated by black thick solid line boxes in FIG. 4B. Other features except the first bypass nodes and the target declaration of the object in the first tree are not provided to the verification device. Advantages of this lie in that, when the verification device performs the first verification, information related to generation of the root node from the digest of the target declaration upward layer by layer has been provided to the verification device, thereby ensuring that the verification device can perform correct first verification. In addition, information unrelated to generation of the root node from the digest of the target declaration upward layer by layer is not provided to the verification device, thereby reducing leakage of object information. In addition, the first bypass nodes are generally provided in only a form such as digest values, thereby reducing leakage of real information of the object.

Referring to FIG. 4B, a bypass node has such properties: the bypass node is used to generate a node in the first path but is not included in the first path. For example, node digest 3 is used to generate a first path node, node digest 3-4, however node digest 3 is not in the first path. Then node digest 3 is a bypass node. Similarly, digest 1-2 is used to generate a first path node, the root node, however node digest 1-2 is not in the first path. Then node digest 1-2 is also a bypass node.

General description of operation 310 to operation 350 is provided above. Specific implementation of each of operation 310 to operation 350 is described in detail below.

Detailed Description of Operation 310

In operation 310, the target declaration issuance request transmitted by the object terminal is received.

During specific implementation of this embodiment, the target declaration issuance request may be transmitted in a form of a frame structure. The target declaration issuance request includes target attributes, an object terminal identifier, a declaration issuing device identifier, a task level, and the like. Each target attribute corresponds to one piece of to-be-subjected-to-verification data of the identity of the object using the object terminal. The object terminal identifier is configured for indicating object identity information of the object, and the object terminal identifier is in a one-to-one correspondence with the object. The declaration issuing device identifier is configured for indicating device information of each declaration issuing device, and the declaration issuing device identifier is in a one-to-one correspondence with the declaration issuing device. The task level is configured for indicating importance of a task to which the target declaration is applied. The task level may include important, common, or the like. As shown in FIG. 5, an exemplary frame structure of the target declaration issuance request includes seven fields. The seven fields are sequentially an object terminal identifier, a declaration issuing device identifier, a task level, a target attribute 1, a target attribute 2, a target attribute 3, and another field.

Figure 6:
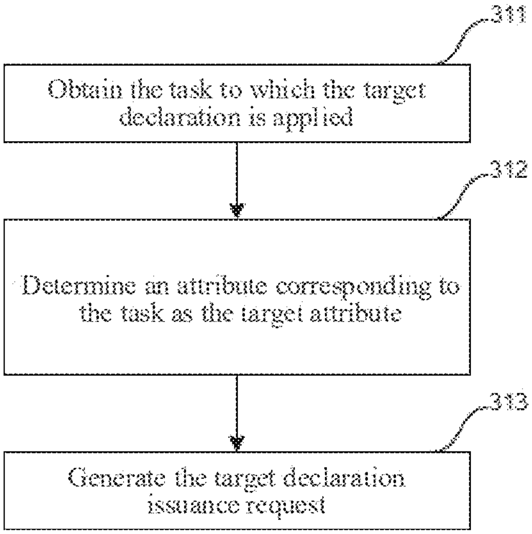
FIG. 6 is a detailed flowchart of a process of generating a target declaration issuance request in operation 310 in FIG. 3.

The following describes a process of generating the target declaration issuance request in detail with reference to FIG. 6.

In some embodiments, the object terminal generates the target declaration issuance request, and a process in which the object terminal generates the target declaration issuance request may include, but not limited to, operation 311 to operation 313.

Operation 311: Obtain the task to which the target declaration is applied.

Operation 312: Determine an attribute corresponding to the task as the target attribute.

Operation 313: Generate the target declaration issuance request.

Operation 311 to operation 313 are described in detail below.

In operation 311, the obtaining the task to which the target declaration is applied includes, but not limited to the following operations: initiating a task obtaining request to an application platform corresponding to the task to which the target declaration is applied; and receiving task information fed back by the application platform according to the task obtaining request, where the task information includes a task type and a task level of the task.

In a specific embodiment, before transmitting the target declaration issuance request, a target terminal initiates the task obtaining request to the application platform corresponding to the task to which the target declaration is applied, to obtain the task information of the task to which the target declaration is applied that is fed back by the application platform, where the task information can reflect the task type, the task level, and the like of the task to which the target declaration is applied. For example, the task to which the target declaration is applied in the target declaration issuance request is logging in to a finance website. Before transmitting the target declaration issuance request, the target terminal initiates the task obtaining request to the application platform corresponding to the task to which the target declaration is applied. The target terminal may receive the task information of the task fed back by the application platform, where the task information includes: The task type is a finance type, and the task level is important.

In operation 312, the determining an attribute corresponding to the task as the target attribute includes, but not limited to, the following operations: searching a preset relationship table based on the task type of the task, to determine the attribute corresponding to the task, where the preset relationship table is configured for indicating a correspondence between the attribute and the task type; and determining the attribute corresponding to the task as the target attribute.

In a specific embodiment, the preset relationship table is configured for storing the correspondence between the attribute and the task type, where the attribute and the task type may be in a one-to-one correspondence, a one-to-many correspondence, or a many-to-one correspondence. All attributes corresponding to the task type of the task to which the target declaration is applied can be determined according to the preset relationship table, and all the attributes corresponding to the task type are determined as target attributes. For example, the task type of the task to which the target declaration is applied is the finance type, and in the preset relationship table, attributes corresponding to the task type being the finance type include that an education degree is not lower than a high school degree, and a credit status is good. Therefore, that the education degree is not lower than the high school degree and that the credit status is good are used as target attributes.

In operation 313, the generating the target declaration issuance request includes, but not limited to the following operations: obtaining the declaration issuing device identifier of the declaration issuing device; and combining the declaration issuing device identifier, the object terminal identifier, the target attributes, and the task level to form a frame structure, and using the frame structure as the target declaration issuance request.

In a specific embodiment, the declaration issuing device identifier of the declaration issuing device may be found from a preset database. When the declaration issuing device identifier, the object terminal identifier, the target attributes, and the task level are combined, the object terminal identifier, the declaration issuing device identifier, the task level, and the target attributes may be sequentially connected to form the frame structure, and the frame structure is used as the target declaration issuance request. For example, the task type of the task to which the target declaration is applied is the finance type, the task level is important, the target attributes include that the education degree is not lower than the high school degree and the credit status is good, the object terminal identifier is dxzd1, and the declaration issuing device identifier is m1. In this case, the target declaration issuance request is "The object terminal whose object terminal identifier is dxzd1 requires the declaration issuing device whose declaration issuing device identifier is m1 to issue a target declaration in which a task level is important, where target attributes in the target declaration are that the education degree is not lower than the high school degree and the credit status is good".

Based on operation 311 to operation 313, the object terminal can conveniently determine the to-be-subjected-to-verification target attributes of the task to which the target declaration is applied, and generate the target declaration issuance request in the form of the frame structure based on the object terminal identifier, the declaration issuing device identifier, and the task level, thereby effectively improving transmission security of each piece of data in the target declaration issuance request. In addition, after receiving the target declaration issuance request, the declaration issuing device can determine the to-be-subjected-to-verification target attributes corresponding to the target declaration. In this way, compared with a manner of entering the to-be-subjected-to-verification target attributes by the object one by one, verification efficiency can be effectively improved.

Detailed Description of Operation 320

In operation 320, authentication is performed on the target attribute of the identity of the object that initiates the target declaration issuance request.

Tasks to which different declarations are applied have different importance. Tasks to which some declarations are applied are unimportant, and requirements of the declarations on certifying materials do not need to be very strict. However, tasks to which some declarations are applied are very important, and certifying materials of the declarations are required to be real and credible. If authentication is performed on target attributes of all declarations in a same manner, reliability of some declarations is relatively low. Based on this, the target declaration issuance request in this embodiment of this application includes the level of the task to which the target declaration is applied, and different authentication manners may be configured for target declarations with different task levels, thereby improving security and reliability of authentication.

Figure 7:
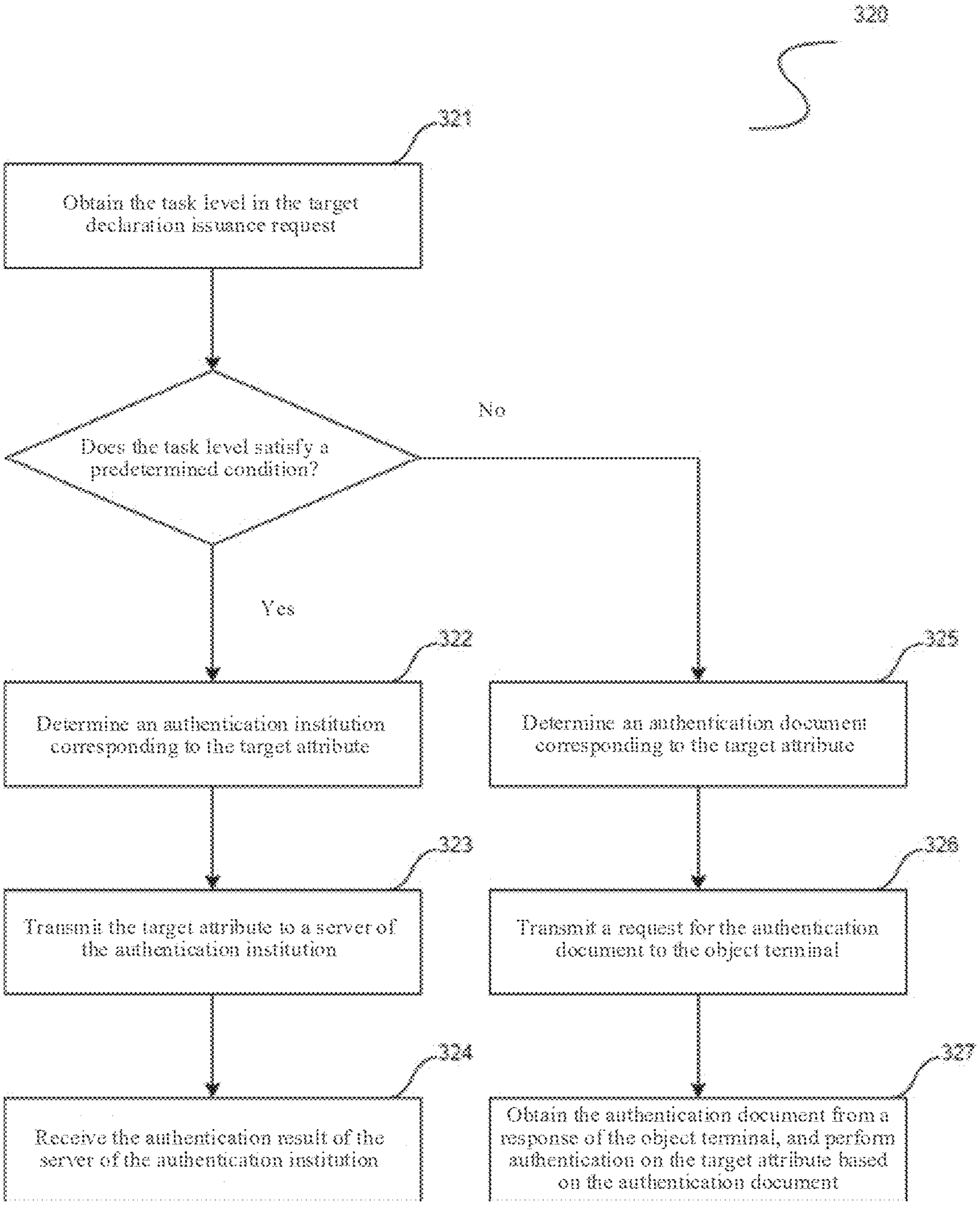
FIG. 7 is a detailed flowchart of operation 320 in FIG. 3.

As shown in FIG. 7, in some embodiments, a process of performing authentication on the target attribute may include, but not limited to, the following operations: obtaining the task level in the target declaration issuance request (operation 321); performing first authentication on the target attribute if the task level satisfies a predetermined condition, the first authentication including: determining an authentication institution corresponding to the target attribute (operation 322); transmitting the target attribute to a server of the authentication institution (operation 323); and receiving the authentication result returned by the server of the authentication institution (operation 324); and performing second authentication on the target attribute if the task level does not satisfy the predetermined condition, the second authentication including: determining an authentication document corresponding to the target attribute (operation 325); transmitting a request for the authentication document to the object terminal (operation 326); and obtaining the authentication document from a response of the object terminal, and performing authentication on the target attribute based on the authentication document (operation 327).

Operation 321 to operation 327 are described in detail below.

In operation 321, when the object terminal generates the target declaration issuance request, the task level of the task to which the target declaration is applied has been added to the frame structure corresponding to the target declaration issuance request. Therefore, the declaration issuing device may directly obtain, from the target declaration issuance request, the task level of the task to which the target declaration is applied.

Further, it is determined whether the task level satisfies the predetermined condition, so that the declaration issuing device selects different authentication manners according to different determining results, to perform authentication on the target attribute. The predetermined condition may be set according to an actual verification requirement, and is not limited. For example, the task level includes super-important, important, common, and unimportant, and the predetermined condition is that the task level reaches important or above (that is, the task level is super-important or important).

In operation 322 to operation 324, if the task level satisfies the predetermined condition, it indicates that the task to which the target declaration is applied is an important task, and a certifying material required for authentication needs to be more real and credible, and an authentication document directly obtained from the object terminal has low credibility. Therefore, the first authentication may be performed on the target attribute.

Specifically, when the first authentication is performed on the target attribute, a target attribute-institution correspondence table is first searched according to the target attribute, to determine the authentication institution corresponding to the target attribute, where the target attribute-institution correspondence table is configured for storing a correspondence between the target attribute and the authentication institution. Further, the target attribute is transmitted to the server of the corresponding authentication institution, and the server of the authentication institution performs authentication on the target attribute, to determine whether the target attribute is real, to generate the authentication result. Finally, the server of the authentication institution transmits the authentication result to the declaration issuing device, and the declaration issuing device may directly obtain the authentication result. For example, the task type of the task to which the target declaration is applied is resource transfer, the task level is important, and the target attribute is "A quantity of available resources of the object is not less than five thousand". In this case, based on the target attribute-institution correspondence table, it is determined that the authentication institution corresponding to the target attribute is a resource hosting institution. Further, the target attribute is transmitted to a server of a resource hosting institution, and the server of the resource hosting institution performs authentication on whether the quantity of available resources of the object satisfies that the quantity of available resources declared in the target attribute is not less than five thousand. After authentication, because the quantity of available resources of the object is eight thousand, and eight thousand is greater than five thousand, the server of the resource hosting institution obtains the authentication result as "The quantity of available resources of the object is not less than five thousand", and feeds back the authentication result to the declaration issuing device.

In operation 325 to operation 327, if the task level does not satisfy the predetermined condition, it indicates that the task to which the target declaration is applied is not a very important task, and precision required for authentication is not high. Therefore, the second authentication may be performed on the target attribute.

Specifically, when the second authentication is performed on the target attribute, a target attribute-authentication document correspondence table is first searched according to the target attribute, to determine the authentication document (for example, a certificate letter from a workplace, or a certificate from a financial institution) corresponding to the target attribute, where the target attribute-authentication document correspondence table is configured for storing a correspondence between the target attribute and the authentication document. Further, a request for the authentication document is transmitted to the object terminal, and the object terminal makes a response feedback according to the request. Correspondingly, the authentication document is obtained from the response of the object terminal, and authentication is performed on the target attribute based on the authentication document, to determine the target attribute of the object identity of the object terminal.

In the foregoing manner, in this embodiment of this application, different authentication manners may be configured for target declarations with different task levels. For a task whose task level does not satisfy the predetermined condition, an authentication document of a target attribute of the task is directly obtained from the object terminal, thereby improving efficiency of obtaining the authentication document. For a task whose task level satisfies the predetermined condition, a target attribute is transmitted to a corresponding authentication institution for authentication, and the declaration issuing device obtains only an authentication result, thereby better improving security and reliability of authentication.

Detailed Description of Operation 330

In operation 330, the target declaration is generated.

The target declaration relates to the authentication result for the identity information of the object, and once the target declaration is modified, normal login of the object to various websites or platforms requiring identity verification is greatly affected. Therefore, in this embodiment of this application, a design of a specific structure of the target declaration is improved, to reduce a risk that the target declaration is modified, and improve use security of the target declaration.

Figure 8:
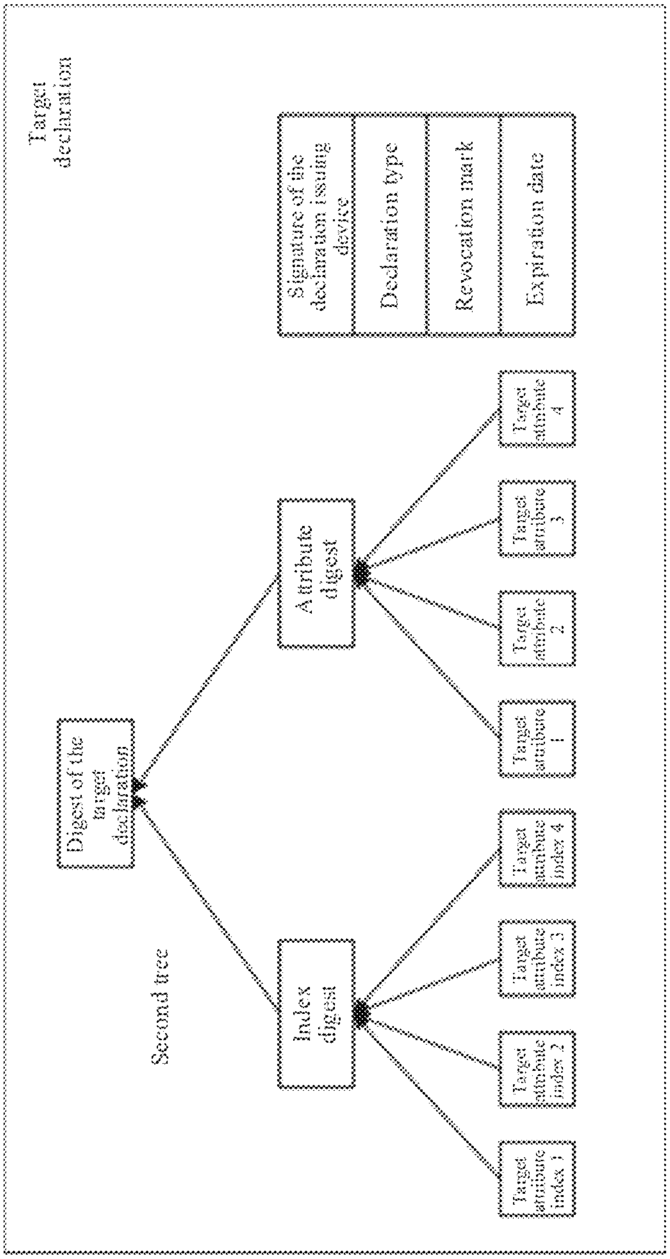
FIG. 8 shows a specific structure of a target declaration in operation 330 in FIG. 3.
Figure 9:
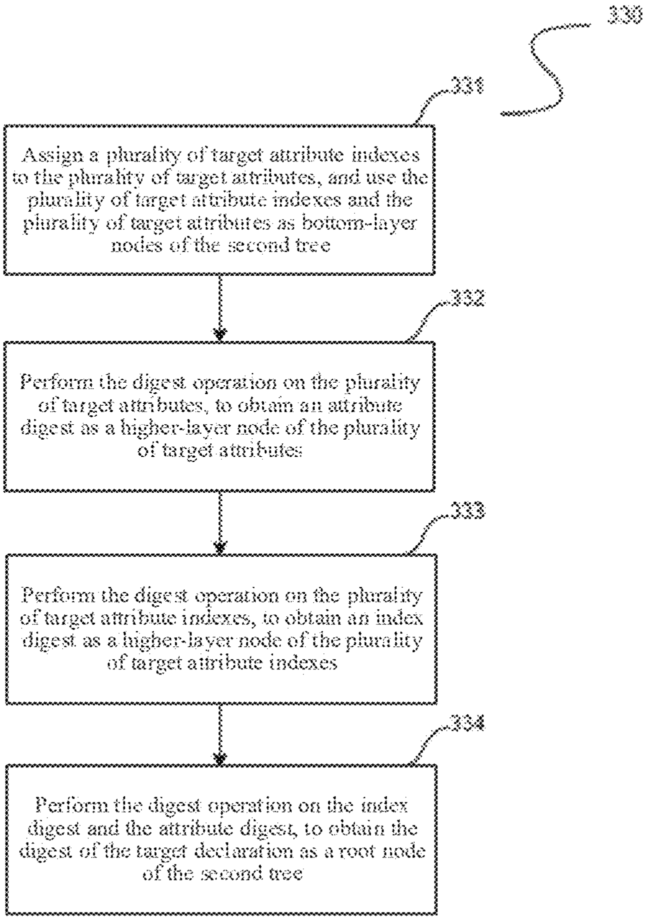
FIG. 9 is a detailed flowchart of operation 330 in FIG. 3.

The following describes a process of generating the target declaration in detail with reference to FIG. 8 and FIG. 9.

As shown in FIG. 9, in some embodiments, the target attribute includes a plurality of target attributes, and the target declaration includes a second tree; and the process of generating the target declaration may include, but not limited to, the following operation 331 to operation 333.

Operation 331: Assign a plurality of target attribute indexes to the plurality of target attributes, and use the plurality of target attribute indexes and the plurality of target attributes as bottom-layer nodes of the second tree.

Operation 332: Perform the digest operation on the plurality of target attributes, to obtain an attribute digest as a higher-layer node of the plurality of target attributes.

Operation 333: Perform the digest operation on the plurality of target attribute indexes, to obtain an index digest as a higher-layer node of the plurality of target attribute indexes.

Operation 334: Perform the digest operation on the index digest and the attribute digest, to obtain the digest of the target declaration as a root node of the second tree. Operation 331 to operation 334 are described in detail below.

In operation 331, the target attributes and the target attribute indexes correspond to each other. First, a preset dictionary is queried, where the preset dictionary includes an index corresponding to each attribute, and the attribute and the index are in a one-to-one correspondence. Further, one target attribute index is assigned to each target attribute according to a correspondence between the attribute and the index in the preset dictionary. Finally, the plurality of target attribute indexes and the plurality of target attributes are used as the bottom-layer nodes of the second tree, namely, lowest-layer nodes in the second tree. As shown in FIG. 8, the target declaration includes four target attributes: a target attribute 1, a target attribute 2, a target attribute 3, and a target attribute 4. Based on the correspondence between the attribute and the index in the preset dictionary, a target attribute index 1 is assigned to the target attribute 1, a target attribute index 2 is assigned to the target attribute 2, a target attribute index 3 is assigned to the target attribute 3, and a target attribute index 4 is assigned to the target attribute 4. Finally, the target attribute 1, the target attribute 2, the target attribute 3, the target attribute 4, the target attribute index 1, the target attribute index 2, the target attribute index 3, and the target attribute index 4 are used as the bottom-layer nodes of the second tree.

In some embodiments, operation 332 includes, but not limited to, the following operations: obtaining priorities of the plurality of target attributes; arranging the plurality of target attributes into a first character string according to the priorities; and performing the digest operation on the first character string, to obtain the attribute digest.

In some embodiments, the priority of each target attribute may be written by the object terminal into the target declaration issuance request when the object terminal generates the target declaration issuance request, so that the declaration issuing device can obtain the priorities of the plurality of target attributes from the target declaration issuance request. Next, the target attributes are arranged in descending order of the priorities, and then the arranged target attributes are concatenated into a character string, to obtain the first character string. Finally, the digest operation is performed on the first character string by using a predetermined digest algorithm, to obtain the attribute digest, and use the attribute digest as the higher-layer node of the plurality of target attributes in the second tree.

Figure 10:
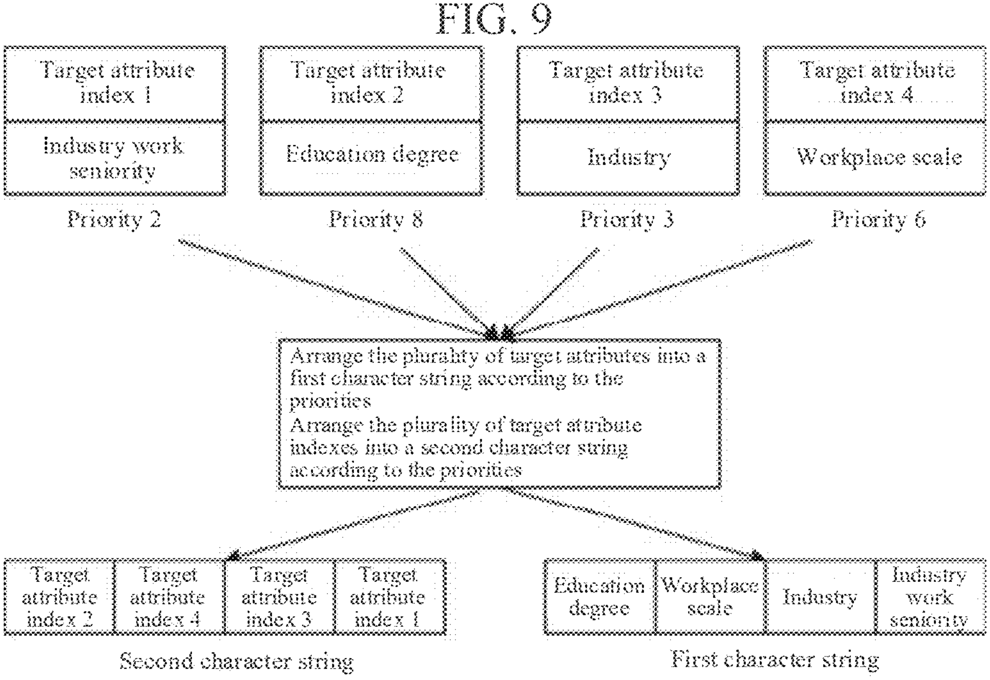
FIG. 10 is a schematic diagram of performing a digest operation on a plurality of target attributes in operation 332 and performing a digest operation on a plurality of target attribute indexes in operation 333 in FIG. 9.

As shown in FIG. 10, the target declaration includes four target attributes. First, it is determined that a target attribute 1 is industry work seniority, and a priority of the target attribute 1 is 2; a target attribute 2 is an education degree, and a priority of the target attribute 2 is 8; a target attribute 3 is an industry, and a priority of the target attribute 3 is 3; and a target attribute 4 is a workplace scale, and a priority of the target attribute 4 is 6. Further, the target attributes are arranged into a first character string in descending order of the priorities. The first character string specifically includes the education degree, the workplace scale, the industry, and the industry work seniority. Finally, the digest operation is performed on the first character string by using the predetermined digest algorithm, to obtain the attribute digest, and use the attribute digest as the higher-layer node of the plurality of target attributes in the second tree.

In some embodiments, operation 333 includes, but not limited to, the following operations: arranging the plurality of target attribute indexes into a second character string according to the priorities; and performing the digest operation on the second character string, to obtain the index digest.

An implementation process of operation 333 in this embodiment is similar to that of operation 332. A difference lies in that, operation 332 includes: arranging the plurality of target attributes into the first character string according to the priorities, and performing the digest operation on the first character string, to obtain the attribute digest; and operation 333 includes: arranging the plurality of target attribute indexes into the second character string according to the priorities, and performing the digest operation on the second character string by using the predetermined digest algorithm, to obtain the index digest. Details are not described herein again.

As shown in FIG. 10, the target declaration includes four target attribute indexes. First, it is determined that a priority of a target attribute index 1 is 2; a priority of a target attribute index 2 is 8; a priority of a target attribute index 3 is 3; and a priority of a target attribute index 4 is 6. Further, the target attribute indexes are arranged into a second character string in an order of the priorities. The second character string specifically includes the target attribute index 2, the target attribute index 4, the target attribute index 3, and the target attribute index 1. Finally, the digest operation is performed on the second character string by using the predetermined digest algorithm, to obtain the index digest, and use the index digest as the higher-layer node of the plurality of target attribute indexes in the second tree.

Advantages of the foregoing embodiments are that: The plurality of target attributes and the plurality of target attribute indexes are arranged according to the priorities, to obtain the first character string and the second character string, and the attribute digest and the index digest are obtained based on the first character string and the second character string. A fixed arrangement order makes the attribute digest and the index digest unique. In addition, the target attributes and the target attribute indexes are arranged according to the priorities, so that the attribute digest or the index digest can be distinguished stronger, thereby facilitating improving efficiency of generating the second tree.

In operation 334, the index digest and the attribute digest are first concatenated to obtain a character string, then the digest operation is performed on the character string, to obtain the digest of the target declaration, and use the digest of the target declaration as the root node of the second tree. Specifically, when the index digest and the attribute digest are concatenated to obtain the character string, the index digest and the attribute digest may be arranged into the character string in a concatenation order. Then, the predetermined digest algorithm is applied to the character string, to obtain the digest of the target declaration. The concatenation order may be predetermined, or may be a concatenation order based on a rule.

When the concatenation order of the index digest and the attribute digest is a predetermined order, the concatenation order may be an order stipulated for the index digest and the attribute digest, or may be an order of sequentially extracting characters from the index digest and the attribute digest to recombine a character string. An example of the order stipulated for the index digest and the attribute digest is that the index digest is placed at the front, and the attribute digest is placed behind. For example, if the index digest is 3145, and the attribute digest is 3f4yt, the generated character string is 31453f4yt. An advantage of this embodiment lies in that, the manner is simple and easy to implement, thereby improving efficiency of determining the digest. An example of the order of sequentially extracting characters from the index digest and the attribute digest to recombine a character string includes: sequentially extracting first characters from the index digest and the attribute digest to perform concatenation, sequentially extracting second characters from the index digest and the attribute digest to perform concatenation, placing the second characters behind a result obtained through concatenating the first characters, and so on, until all characters in the index digest and the attribute digest are completely extracted. For example, if the index digest is 3145, and the attribute digest is 3f4yt, the generated character string is 331f445yt. An advantage of this embodiment lies in that, the process of determining the digest is more complex and hidden, thereby preventing a third party from cracking, and improving data security of the second tree.

When the concatenation order is a concatenation order based on a rule, the rule may include: performing arrangement in an ASCII code order of first characters to form a character string, performing arrangement in a lexicographical order of the first characters to form a character string, performing arrangement in descending order of quantities of characters included in the index digest and the attribute digest to form a character string, or the like. An example of performing arrangement in the lexicographical order of the first characters to form the character string is that, if the index digest is 3145, and the attribute digest is 2f4yt, the generated character string is 2f4yt3145. An advantage of this embodiment lies in that, because an arrangement order of the index digest and the attribute digest is not fixed, third-party cracking difficulty is improved, and data security of the second tree is improved.

The predetermined digest algorithm may be a common fixed digest algorithm of all second trees, for example, a Poseidon hash algorithm is configured for all the second trees. Alternatively, a particular digest algorithm may be extracted from a digest algorithm set for each second tree. In the latter case, the extracted digest algorithm is configured for generating digests in the second tree. The Poseidon hash algorithm is friendlier to zero-knowledge verification, and can improve verification efficiency of a zero-knowledge circuit mentioned later in this specification. In the latter embodiment, easy cracking caused by a single digest algorithm does not occur, thereby improving data security of the second tree.

The digest concatenation order in operation 334 may also be applied to operation 332 and operation 333. A specific implementation process of applying the foregoing digest concatenation order to form the first character string and the second character string in operation 332 and operation 333 is basically the same as that in operation 334. Details are not described herein again.

The target declaration in this embodiment of this application includes a tree structure and a plurality of fields, where the tree structure is constructed by the target attributes of the target declaration, and the plurality of fields indicate other declaration information except the target attributes in the target declaration. As shown in FIG. 8, the target declaration includes a second tree and four fields. The second tree is generated according to the four target attributes of the target declaration and the target attribute index corresponding to each target attribute. The four fields respectively indicate an expiration date, a revocation mark, and a declaration type of the target declaration, and a signature of the declaration issuing device.

Based on operation 331 to operation 334, in this embodiment of this application, the second tree can be generated according to the target attributes and the target attribute indexes corresponding to the target attributes, and all the target attributes in the target declaration are stored in a form of a tree structure, where a higher-layer node of the tree is obtained through a digest operation on lower-layer nodes; and once an intermediate node is modified, the higher-layer node changes accordingly. Therefore, the target attributes in the target declaration can be effectively prevented from being randomly modified, data security of the second tree can be improved, and reliability of the target declaration can also be improved.

Figure 11:
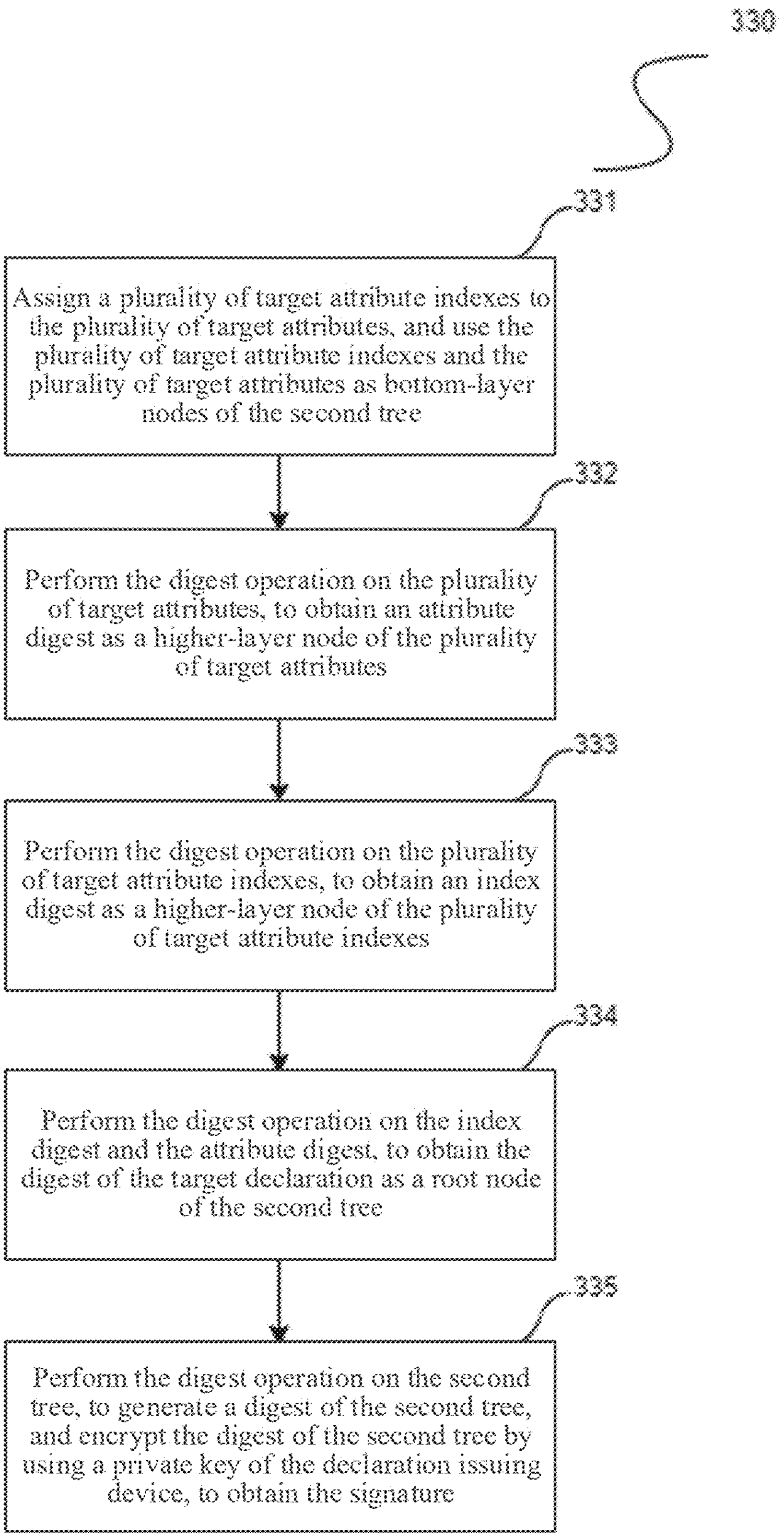
FIG. 11 is another detailed flowchart of operation 330 in FIG. 3.

As shown in FIG. 11, in some other embodiments, the identity verification method is performed by the declaration issuing device, and the target declaration further includes the signature of the declaration issuing device; and the process of generating the target declaration may further include, but not limited to, operation 335.

Operation 335: Perform the digest operation on the second tree, to generate a digest of the second tree, and encrypt the digest of the second tree by using a private key of the declaration issuing device, to obtain the signature.

In operation 335, first, all digests in the second tree are concatenated in the foregoing concatenation order, to obtain a digest character string of the second tree. Then, the digest operation is performed on the digest character string by using the predetermined digest algorithm, to generate the digest of the second tree. Further, the private key of the declaration issuing device is extracted, and the digest of the second tree is encrypted by using the private key of the declaration issuing device, to obtain the signature. Finally, the signature is stored in the target declaration. In the embodiments, the process of performing the digest operation on the second tree to generate the digest of the second tree is consistent with the implementation process in operation 334. Details are not described herein again.

Based on operation 335, the digest of the second tree can be conveniently encrypted by using the private key of the declaration issuing device, to form the signature of the declaration issuing device. The signature can be configured for indicating that the target declaration is issued by the declaration issuing device, so that the verification device can perform verification on a source of the target declaration according to the signature, thereby improving reliability of the source of the target declaration.

In some embodiments, a signature verification process is performed by the verification device, and a process in which the verification device performs verification on the signature in the target declaration includes, but not limited to, the following operations: transmitting a digest obtaining request to the declaration issuing device, and receiving the digest of the second tree fed back by the declaration issuing device based on the digest obtaining request; obtaining a public key of the declaration issuing device; decrypting the signature in the target declaration by using the public key of the declaration issuing device, to obtain a decrypted digest; and determining that the signature verification succeeds if it is verified that the digest of the second tree is consistent with the decrypted digest.

During specific implementation of this embodiment, the verification device transmits the digest obtaining request to the declaration issuing device, so that the declaration issuing device provides the digest of the second tree corresponding to the target declaration. After the digest of the second tree fed back by the declaration issuing device is received, the public key of the declaration issuing device is extracted, and the signature in the target declaration is decrypted by using the public key of the declaration issuing device, to obtain the decrypted digest. Further, verification is performed on whether the digest of the second tree is consistent with the decrypted digest. If the digest of the second tree is consistent with the decrypted digest, it indicates that the signature verification succeeds, and it is determined that the target declaration is from the declaration issuing device. If the digest of the second tree is not consistent with the decrypted digest, it indicates that the signature verification fails, and the target declaration is not from the declaration issuing device. In addition to the first verification, this manner can determine, according to a result of the signature verification, whether the target declaration is from the declaration issuing device, so that authenticity and reliability of the target declaration can further be improved.

In some other embodiments, the target declaration further includes a declaration type, a revocation mark, and an expiration date of the target declaration. The declaration type can be configured for indicating a specific scenario or a specific type of the task to which the target declaration is applied. The revocation mark can be configured for indicating whether the target declaration really exists (whether the target declaration is revoked). The expiration date can be configured for indicating use duration of the target declaration. The revocation mark and the expiration date are described in detail below.

Detailed Description of Operation 340

In operation 340, the first tree is generated.

The first tree is a tree structure. However, for different tree structures, when a new node is added, a node is reduced, or node data is changed, changes in the tree structures are different. For an identity verification scenario in this embodiment of this application, if the structure of the first tree changes due to a change of node data, storage security and verification reliability of the target declaration are reduced. Based on this, in this embodiment of this application, a sparse tree is used as the first tree.

Data included in each node in the sparse tree carries a node index. When the data included in the node changes, the node index remains unchanged. Because the node index does not change, the tree structure of the sparse tree does not change as the node data changes.

Figure 12:
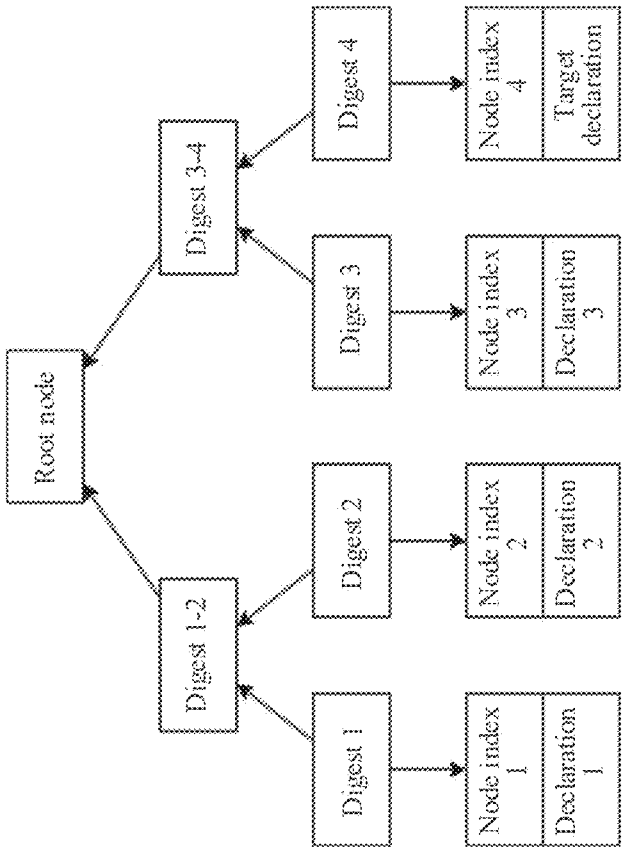
FIG. 12 shows a case in which the first tree in FIG. 4A is a sparse tree.

Based on this, in this embodiment of this application, each declaration in the first tree has a node index, and when a status of a declaration is changed, a node index corresponding to the declaration does not change. Therefore, a node corresponding to the node index continuously exists. As shown in FIG. 12, the first tree includes the target declaration, a declaration 1, a declaration 2, and a declaration 3. The target declaration has a node index 4, the declaration 1 has a node index 1, the declaration 2 has a node index 2, and the declaration 3 has a node index 3. After the declaration 3 is revoked, the node index 3 still exists in the first tree, so that a trace of the declaration 3 is not eliminated, and still exists in the first tree. In addition, a digest 3 can still be obtained through the digest operation on the node index 3, and the overall tree structure of the first tree also does not change. Therefore, an advantage of determining that the sparse tree is used as the first tree is that, each declaration in the first tree has the corresponding node index; and after a declaration is revoked, a node index still remains unchanged, it can be proved that the declaration has ever existed (if the declaration is revoked and the node also disappears, this is not beneficial to proving that the declaration has ever existed but has been revoked. Therefore, this is an advantage of using the sparse tree), and the tree structure of the first tree does not change as a status of the declaration is changed, so that structure stability and data security of the first tree can be improved.

Figure 14:
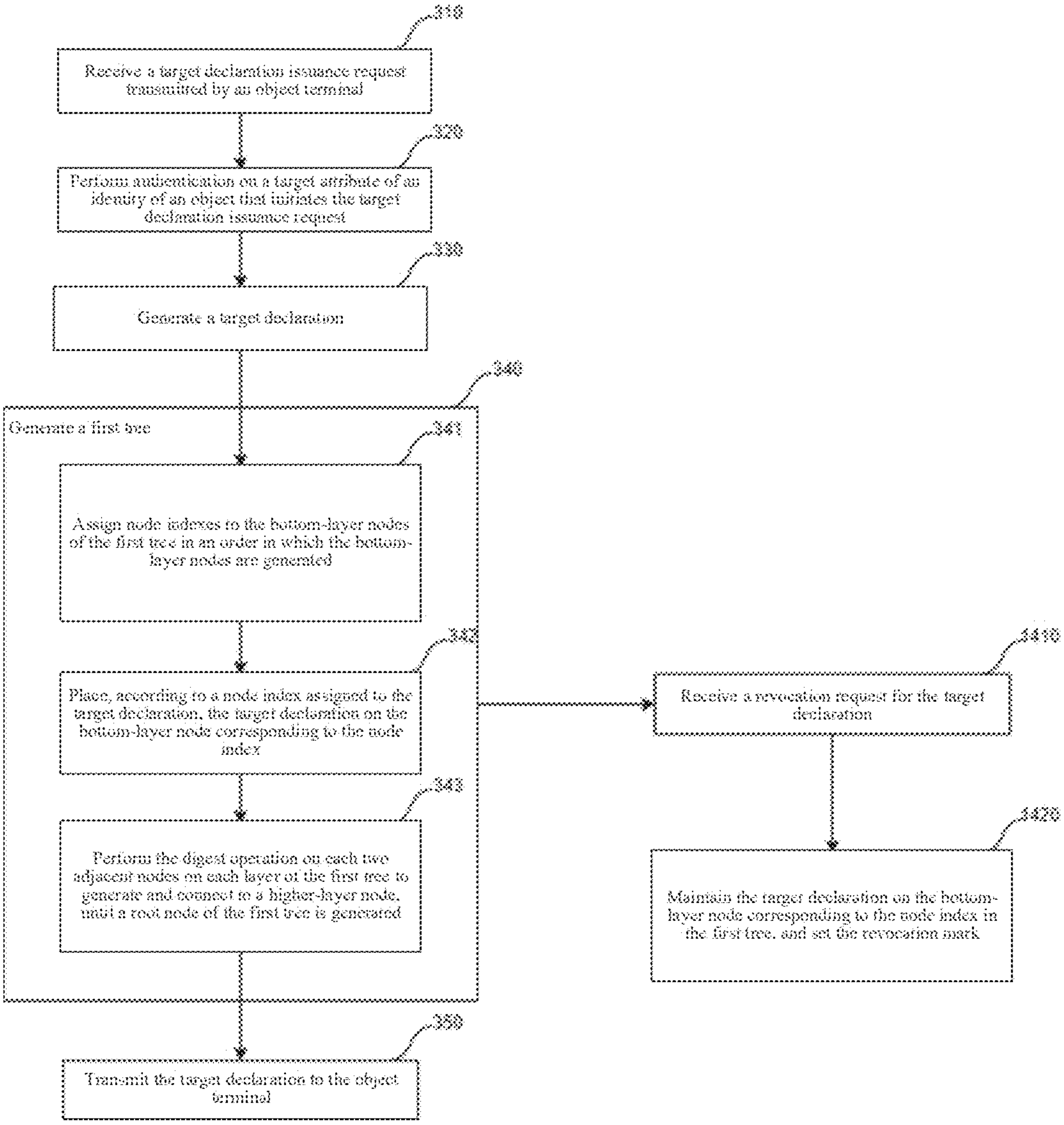
FIG. 14 is a flowchart of an identity verification method according to another embodiment of this application.

As shown in FIG. 14, in an embodiment, a specific process of generating the first tree includes, but not limited to the following operations.

Operation 341: Assign node indexes to the bottom-layer nodes of the first tree in an order in which the bottom-layer nodes are generated.

Operation 342: Place, according to a node index assigned to the target declaration, the target declaration on the bottom-layer node corresponding to the node index.

Operation 343: Perform the digest operation on each two adjacent nodes on each layer of the first tree to generate and connect to a higher-layer node, until a root node of the first tree is generated.

In operation 341, each bottom-layer node of the first tree corresponds to one declaration, and generation time of each declaration is different; and each time the declaration issuing device generates a declaration, a new bottom-layer node is added to the first tree. Therefore, corresponding node indexes may be sequentially assigned to the bottom-layer nodes according to the order in which the bottom-layer nodes are generated. The node index may be randomly generated by a declaration issuing device, and is not limited.

In operation 342, the node index of the target declaration is first determined before the target declaration is stored in the first tree. Further, according to the node index assigned to the target declaration, the newly generated target declaration is placed on the bottom-layer node corresponding to the node index. As shown in FIG. 12, according to a generation order of the declarations, the target declaration is a fourth declaration issued by the declaration issuing device to the object terminal, and the node index assigned to the target declaration is the node index 4. Therefore, the target declaration is placed on a bottom-layer node corresponding to the node index 4, to form a fourth bottom-layer node of the first tree.

An implementation process of operation 343 is similar to that of operation 334. A difference lies in that, in operation 343, the declarations are used as the bottom-layer nodes of the first tree to generate the first tree; and in operation 334, the target attribute and the target attribute index are used as the bottom-layer nodes of the second tree to generate the second tree. Details are not described herein again.

Based on operation 341 to operation 343, a location of each declaration in the first tree is marked by using the node index, so that the tree structure of the first tree does not change with a status of the declaration is changed, thereby improving structure stability and data security of the first tree.

The target declaration is generated for the task to which the target declaration is applied, and when some target declarations for particular tasks are used in other tasks, many uncertain risks are caused. Based on this, in this embodiment of this application, it is considered that after the target declaration is generated, the target declaration needs to be revoked in time according to an actual situation, thereby reducing a risk caused by excessively long existence time of the target declaration, and improving use security of the target declaration.

A process of performing declaration revocation according to a revocation request of the object and a process of performing declaration revocation according to an expiration date of a declaration are respectively described in detail below with reference to FIG. 13A to FIG. 13C, FIG. 14, FIG. 15, and FIG. 16.

As shown in FIG. 14, in some embodiments, the target declaration further includes a revocation mark. After the first tree is generated, the identity verification method further includes the following operations.

Operation 1410: Receive a revocation request for the target declaration.

Operation 1420: Maintain the target declaration on the bottom-layer node corresponding to the node index in the first tree, and set the revocation mark.

In operation 1410, the revocation request for the target declaration is transmitted by the object terminal, and is a request triggered by the object terminal when the object terminal intends to invalidate the target declaration. After receiving the revocation request for the target declaration, the declaration issuing device needs to change a status of the target declaration in the first tree.

Figure 13A:
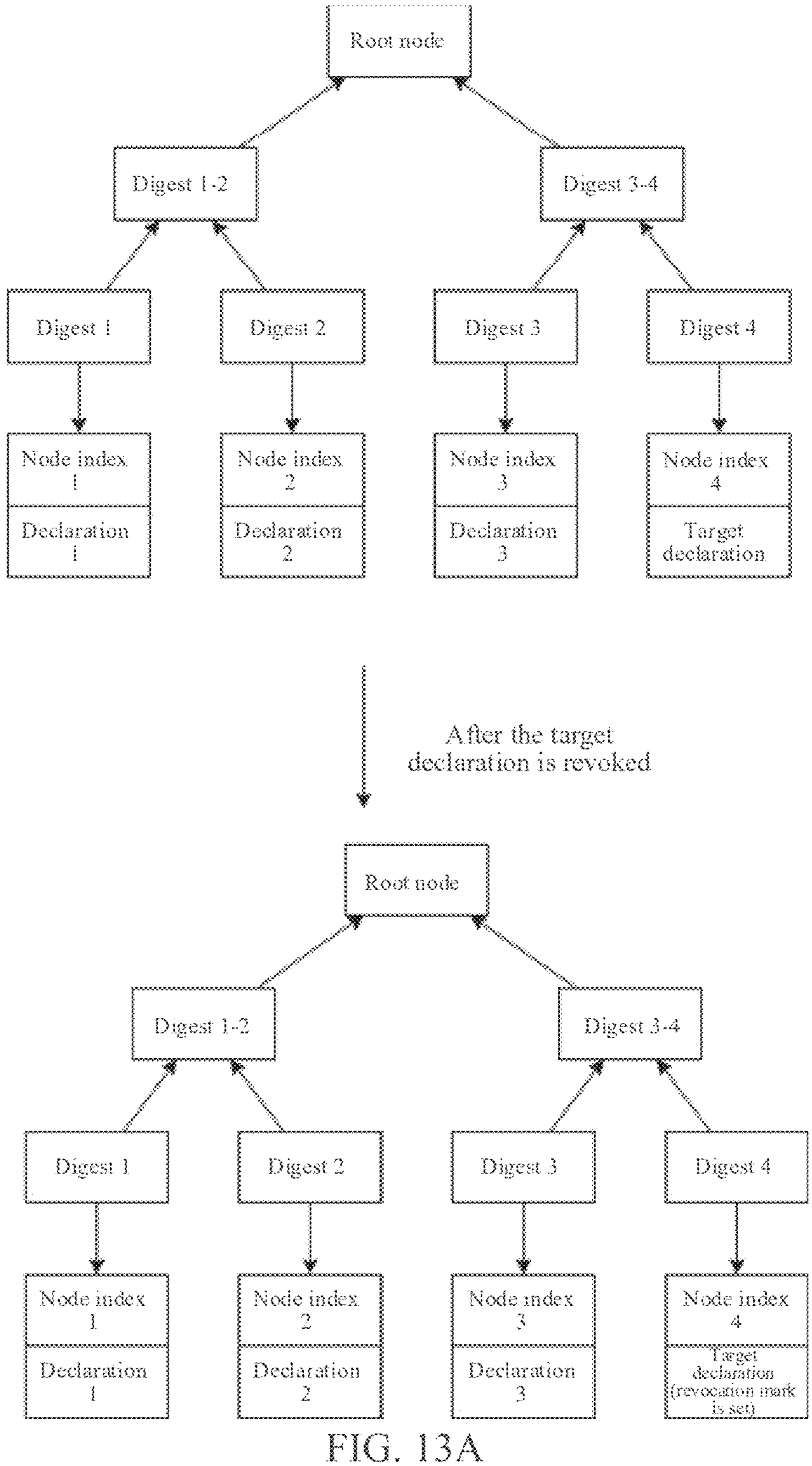
FIG. 13A shows a first tree before and after a target declaration is revoked according to an embodiment of this application.
Figure 13B:
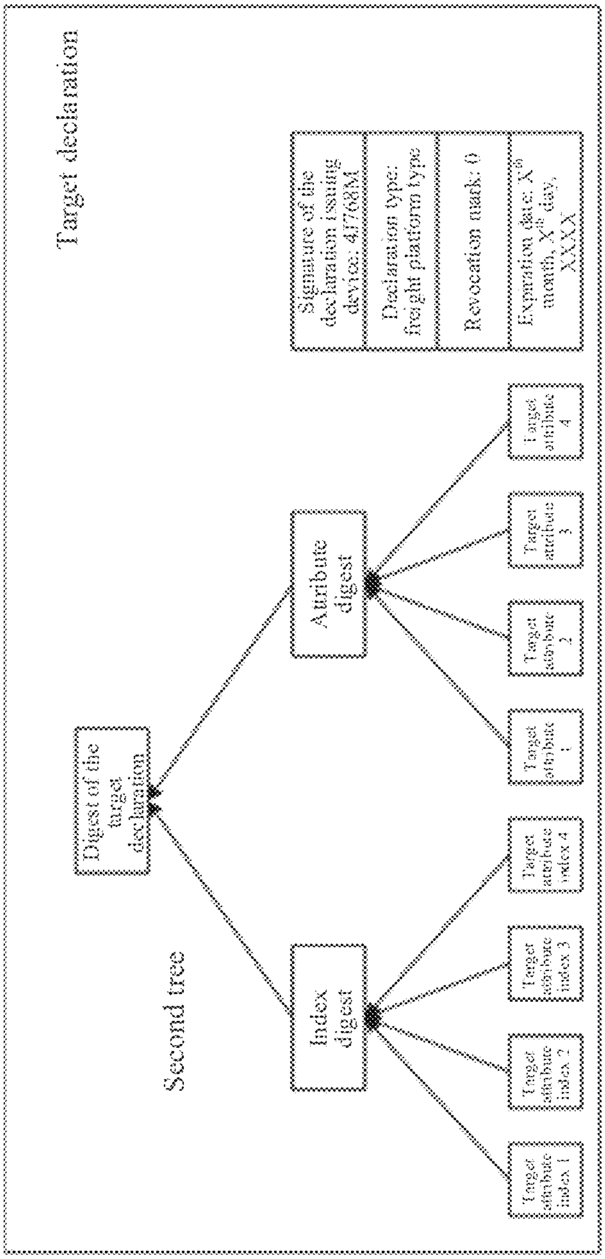
FIG. 13B is a diagram of an internal structure of a target declaration before the target declaration is revoked according to an embodiment of this application.
Figure 13C:
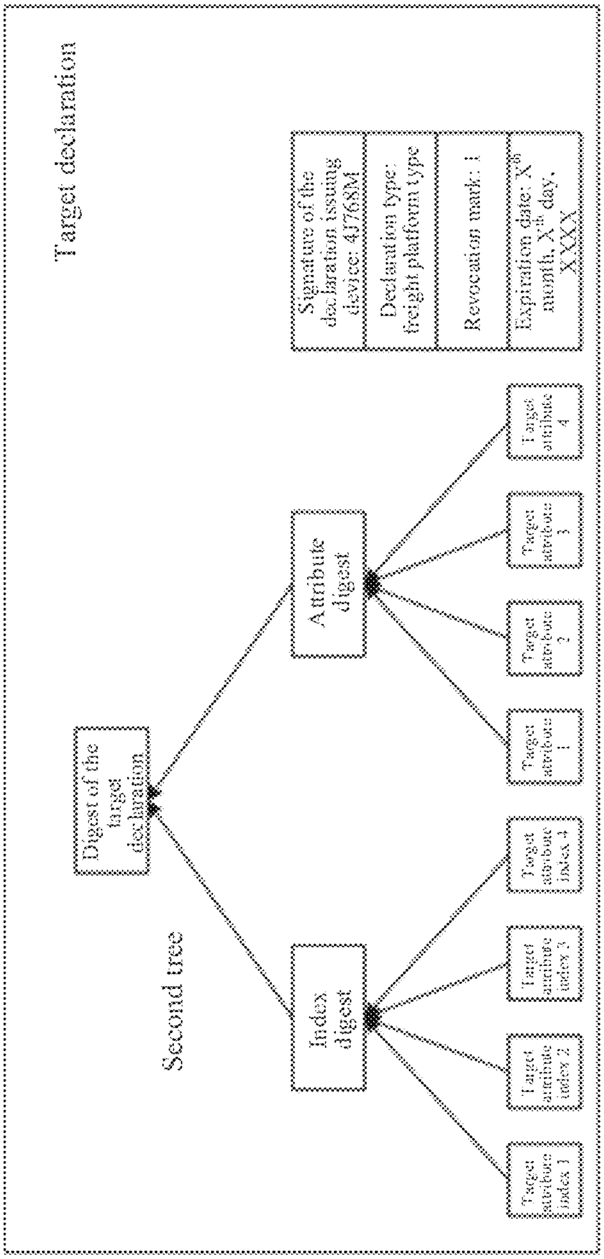
FIG. 13C is a diagram of an internal structure of a target declaration after the target declaration is revoked according to an embodiment of this application.

In operation 1420, when the declaration issuing device performs status adjustment on the target declaration according to the revocation request, the target declaration is maintained on the bottom-layer node corresponding to the node index in the first tree, the node index of the target declaration remains unchanged, and the revocation mark of the target declaration is set. As shown in FIG. 13A, when the revocation request for the target declaration is received, the declaration issuing device revokes the target declaration in the first tree. After the target declaration is revoked, the original target declaration is covered with the revocation mark. In other words, the target declaration is still maintained on a bottom-layer node corresponding to a node index 4 in the first tree, but the target declaration with the revocation mark being set is displayed. As shown in FIG. 13B, before the target declaration is revoked, the revocation mark of the target declaration is 0. As shown in FIG. 13C, after the target declaration is revoked, the revocation mark of the target declaration is set, and the revocation mark is 1.

Based on operation 1410 and operation 1420, the target declaration can be revoked according to the revocation request of the object terminal, so that some important target declarations can be revoked in time after being applied to a particular task, thereby reducing a risk caused when the target declarations are applied to other tasks, and improving use security of the target declaration. In addition, after the revocation, the target declaration is still maintained on the bottom-layer node corresponding to the node index in the first tree, so that it can be proved that the declaration has ever existed.

In another embodiment, the target declaration further includes an expiration date and a revocation mark. The following describes a process of revoking the target declaration according to the expiration date in detail with reference to FIG. 15A, FIG. 15B, and FIG. 16.

Figure 16:
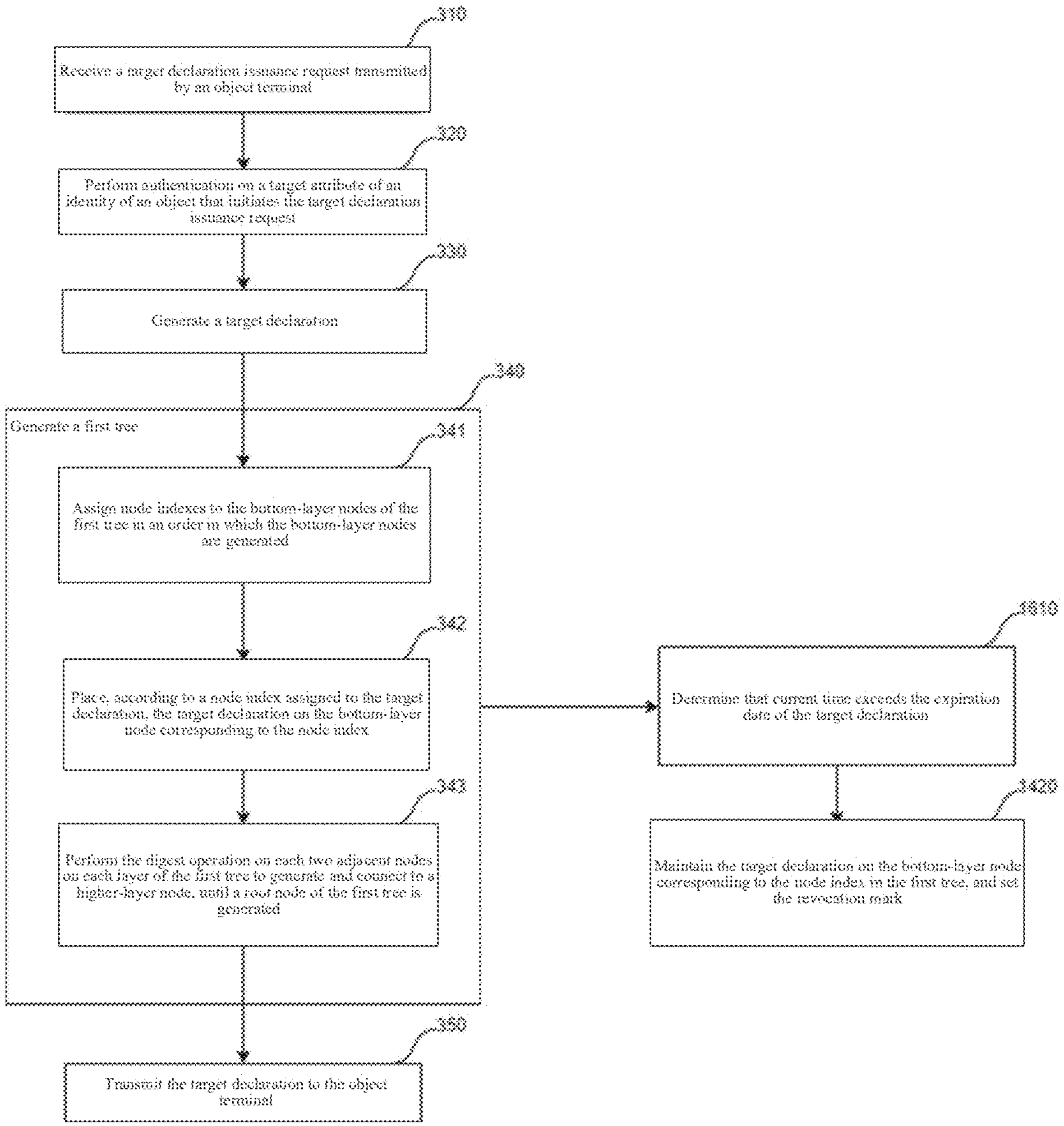
FIG. 16 is a flowchart of an identity verification method according to another embodiment of this application.

As shown in FIG. 16, after the first tree is generated, the identity verification method further includes the following operations.

Operation 1610: Determine that current time exceeds the expiration date of the target declaration.

Operation 1420: Maintain the target declaration on the bottom-layer node corresponding to the node index in the first tree, and set the revocation mark.

During specific implementation of this embodiment, the current time is first obtained. Then, the current time is compared with the expiration date of the target declaration. If the current time exceeds the expiration date of the target declaration, it indicates that usable time of the target declaration has expired, and the target declaration needs to be revoked. In this case, the target declaration is maintained on the bottom-layer node corresponding to the node index in the first tree, the node index of the target declaration remains unchanged, and the revocation mark of the target declaration is set. If the current time does not exceed the expiration date of the target declaration, it indicates that the target declaration is within the usable time. In this case, the revocation mark of the target declaration remains unchanged.

Figure 15A:
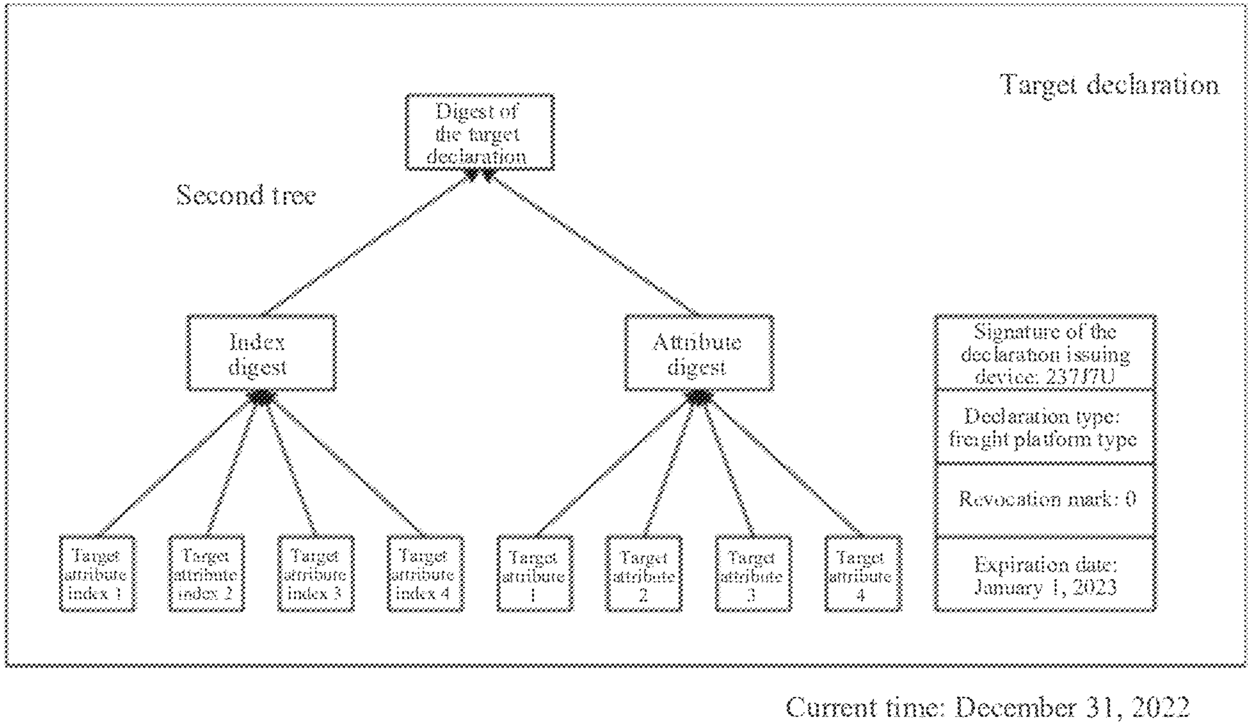
FIG. 15A shows an example of setting a revocation mark based on an expiration date according to an embodiment of this application.

As shown in FIG. 15A, the current time is Dec. 31, 2022, the expiration date of the target declaration is Jan. 1, 2023, and the current time does not exceed the expiration date of the target declaration. Therefore, the revocation mark of the target declaration is maintained as 0, and the target declaration can be continuously used normally.

Figure 15B:
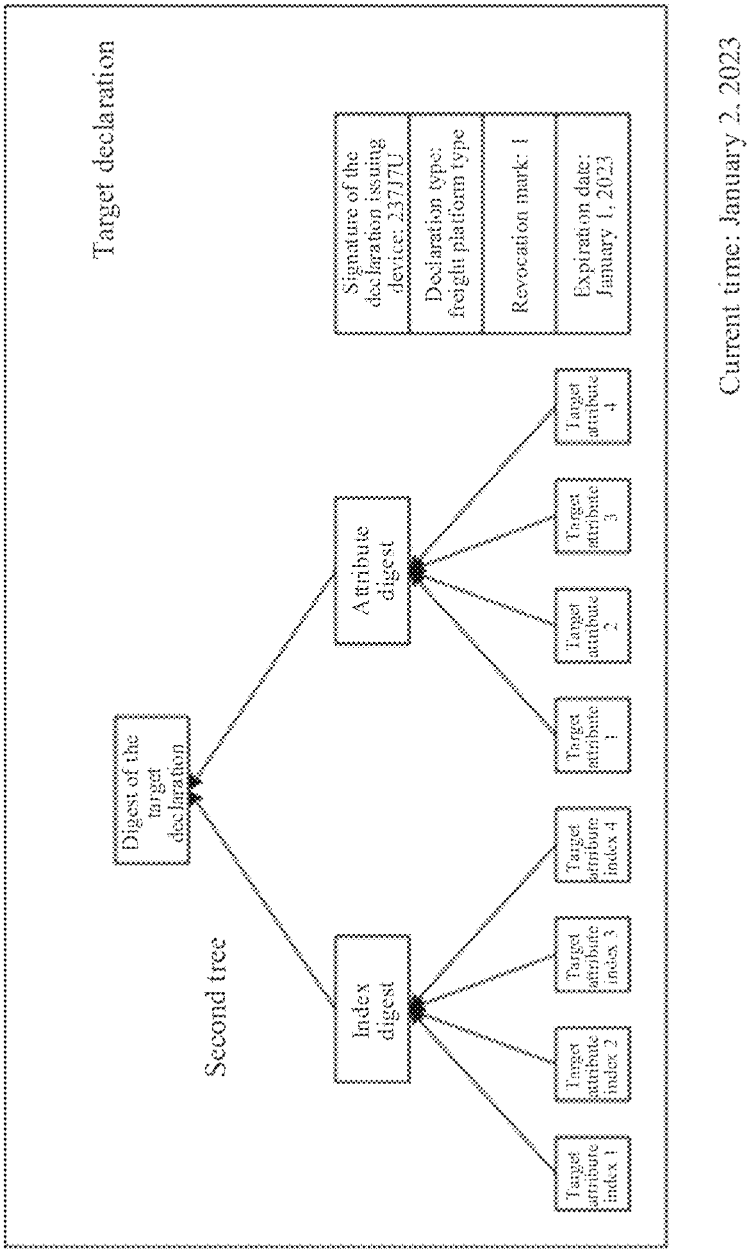
FIG. 15B shows an example of setting a revocation mark based on an expiration date according to an embodiment of this application.

As shown in FIG. 15B, the current time is Jan. 2, 2023, the expiration date of the target declaration is Jan. 1, 2023, the current time exceeds the expiration date of the target declaration, and the target declaration needs to be revoked. In this case, the target declaration is maintained on a bottom-layer node corresponding to a node index 4 in the first tree, and the revocation mark of the target declaration is set to 1.

In this manner, it can be determined, according to the comparison between the current time and the expiration date of the target declaration, whether the target declaration is within the usable time, so that the target declaration that exceeds the usable time can be revoked in time, thereby improving use security of the target declaration.

Detailed Description of Operation 350

In operation 350, the target declaration is transmitted to the object terminal.

During specific implementation of this embodiment, the declaration issuing device may directly transmit the target declaration to a declaration clip of the object terminal, so that the object terminal obtains, when receiving the verification request of the verification device for the target attribute, the first bypass nodes of the first path in the first tree, and transmits the target declaration and the first bypass nodes to the verification device for the first verification.

In some embodiments, a manner for obtaining the first bypass nodes includes, but not limited to, the following three cases:

(1) The object terminal transmits a request for obtaining the first bypass nodes to the declaration issuing device, and the declaration issuing device stores the first bypass nodes of the target declaration in a response according to the request and transmits the response to the object terminal.

(2) The declaration issuing device stores, after generating the target declaration, the target declaration in the first tree, and stores all digests of the first tree in a block, to store the block on a blockchain. The declaration issuing device informs the object terminal of a block identifier of the block. The object terminal may obtain the block from the blockchain according to the block identifier, and extract the first bypass nodes from the block.

(3) The declaration issuing device stores the target declaration in the first tree after generating the target declaration, encrypts and uploads the first bypass nodes of the target declaration to a public website, and informs the object terminal of a key for the encryption. The object terminal may directly obtain the encrypted first bypass nodes of the target declaration from the public website, and decrypt the encrypted first bypass nodes by using the key.

In some embodiments, the first verification includes: performing the digest operation on the target declaration, to obtain the digest of the target declaration; determining a first recovered root node based on the digest of the target declaration and the first bypass nodes; and comparing the root node of the first tree with the first recovered root node, to perform the first verification.

During specific implementation of this embodiment, first, the digest operation is performed on the target declaration by using the predetermined digest algorithm, to obtain the digest of the target declaration. Then, in the first tree, each node on the first path in which the root node is generated upward layer by layer from the bottom-layer node corresponding to the target declaration is reproduced according to the digest of the target declaration and the first bypass nodes, to obtain the first recovered root node. Finally, the root node of the first tree is compared with the first recovered root node. If the root node of the first tree is equal to the first recovered root node, the first verification succeeds. If the root node of the first tree is not equal to the first recovered root node, the first verification fails. The verification device may determine whether the target declaration is credible through the first verification. The verification process is implemented based on the digest of the target declaration and the first bypass nodes, and the first bypass nodes are also digest values, and do not involve real identity information of the object, thereby improving security of the object identity information during the verification. For example, in FIG. 4B, the first bypass nodes include the digest 1-2 and the digest 3. The target declaration, the digest 1-2, and the digest 3 are transmitted to the verification device. The verification device performs the digest operation on the target declaration by using the predetermined digest algorithm to obtain the digest 4; performs the digest operation on a character string combined by the digest 3 and the digest 4, to obtain the digest 3-4; and performs the digest operation on a character string combined by the digest 1-2 and the digest 3-4, to obtain the first recovered root node. Then, the root node of the first tree is requested from the declaration issuing device. If the root node of the first tree is equal to the first recovered root node, the first verification succeeds.

Based on operation 310 to operation 350, the object terminal does not need to upload a verification material once for verification each time the object terminal receives a verification request of the verification device, but requests, for a to-be-subjected-to-verification target attribute of an identity of an object, a declaration issuing device to issue a target declaration once in advance, where the target declaration is a one-time authentication result for the target attribute. Then, each time the object terminal receives the verification request of the verification device, the object terminal directly transmits the target declaration issued by the declaration issuing device to the verification device, thereby reducing repeated verification and improving verification efficiency. The declaration issuing device further maintains a first tree, where bottom-layer nodes of the first tree are digests of declarations issued to the object. A digest operation is performed on the digests upward layer by layer, to obtain a root node of the first tree. When the target declaration is transmitted to the verification device for verification, first bypass nodes further connected to a first path from a bottom-layer node corresponding to the target declaration to the root node in the first tree are also transmitted to the verification device. In this way, the verification device can recover a root node of the first tree according to the target declaration and the first bypass nodes, and compares the recovered root node with the real root node of the first tree. If the recovered root node is consistent with the real root node of the first tree, it is proved that the target declaration is a declaration that the declaration issuing device has really issued to the object, and the target declaration is credible. During verification, an original identity certifying material is not provided, and underlying identity information of the object is not contacted, but only the target declaration of the declaration issuing device is provided, thereby improving security of the object identity information during the verification.

Detailed Description of a Process of Performing Verification on Whether the Target Declaration does not Exist After the target declaration is generated, the target declaration may be revoked according to the revocation request of the object or the expiration date of the target declaration, thereby improving use security of the target declaration. If the revoked target declaration is continuously applied to another identity verification task, an access risk may be brought to a corresponding verification device. Based on this, in the embodiments of this application, a solution for performing verification on that the target declaration does not exist is considered, so that verification accuracy can further be improved, and a risk can be reduced.

Figure 17:
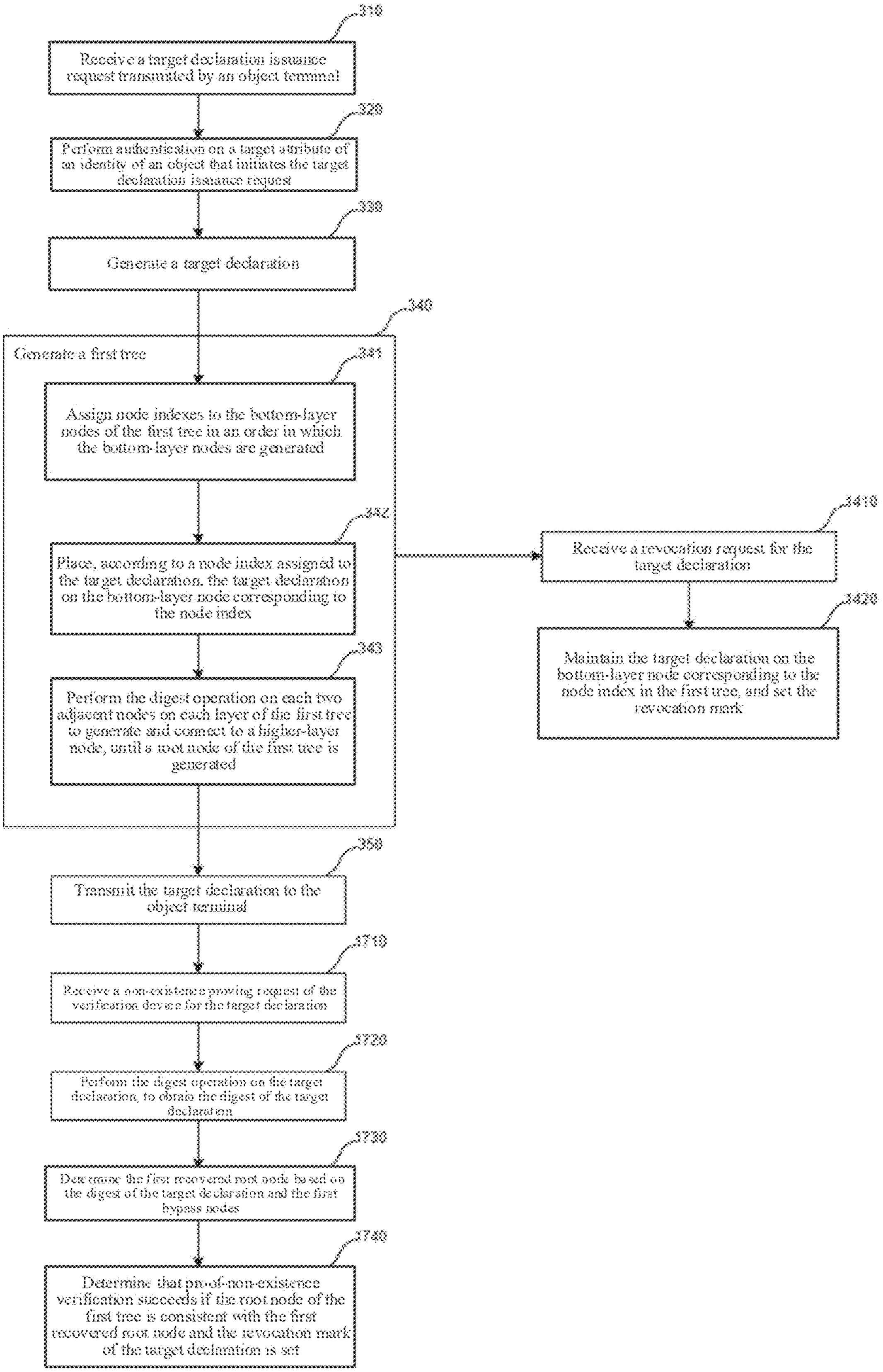
FIG. 17 is a flowchart of an identity verification method according to another embodiment of this application.

As shown in FIG. 17, after operation 350, the identity verification method according to an embodiment of this application may further include the following operations.

Operation 1710: Receive a non-existence proving request of the verification device for the target declaration.

Operation 1720: Perform the digest operation on the target declaration, to obtain the digest of the target declaration.

Operation 1730: Determine the first recovered root node based on the digest of the target declaration and the first bypass nodes.

Operation 1740: Determine that proof-non-existence verification succeeds if the root node of the first tree is consistent with the first recovered root node and the revocation mark of the target declaration is set.

Operation 1710 to operation 1740 are described in detail below.

In operation 1710, the non-existence proving request is a request triggered by the verification device that intends to inform the declaration issuing device to perform verification on existence of the target declaration provided by the object terminal.

Operation 1720 is similar to a specific implementation process of generating the digest of the target declaration in the first verification in operation 350. A difference lies in that, operation 1720 is performed by the declaration issuing device; and the specific implementation process of generating the digest of the target declaration in the first verification in operation 350 is performed by the verification device. Details are not described herein again.

Operation 1730 is similar to a specific implementation process of determining the first recovered root node in the first verification in operation 350. A difference lies in that, operation 1730 is performed by the declaration issuing device; and the specific implementation process of determining the first recovered root node in operation 350 is performed by the verification device. Details are not described herein again.

In operation 1740, two determining processes are considered when verification is performed on whether the target declaration does not exist. In one process, it is determined whether the revocation mark of the target declaration is set. In the other process, it is determined whether the root node of the first tree is consistent with the first recovered root node. If the root node of the first tree is consistent with the first recovered root node and the revocation mark of the target declaration is set, it indicates that the target declaration does not exist, and it is determined that the proof-non-existence verification succeeds. In addition, in other cases, it may be determined that the proof-non-existence verification fails. The determining that the proof-non-existence verification fails includes the following three cases.

(1) If the root node of the first tree is consistent with the first recovered root node but the revocation mark of the target declaration is not set, it is determined that the proof-non-existence verification fails.

(2) If the root node of the first tree is not consistent with the first recovered root node but the revocation mark of the target declaration is set, it is determined that the proof-non-existence verification fails.

(3) If the root node of the first tree is not consistent with the first recovered root node and the revocation mark of the target declaration is not set, it is determined that the proof-non-existence verification fails.

Based on operation 1710 to operation 1740, based on the revocation mark of the target declaration and consistency between the root node of the first tree and the first recovered root node, it can be more conveniently determined whether the target declaration does not exist, so that verification accuracy can be improved, and a risk caused when the non-existent target declaration is applied to an identity verification task can be reduced.

Detailed Description of a Process of Generating an Object Identity Tree

Both generation and revocation of a declaration are important to identity verification of the object, the foregoing identity verification method relies only on the first tree for identity verification, and the first tree is a tree structure constructed when the declaration is generated, and often cannot well reflect a case after the declaration is revoked. Based on this, in this application, a solution for constructing the object identity tree based on all declarations generated for the object and the revoked declaration is considered, to reflect an identity status of the object through the object identity tree, thereby improving data security.

Figure 18:
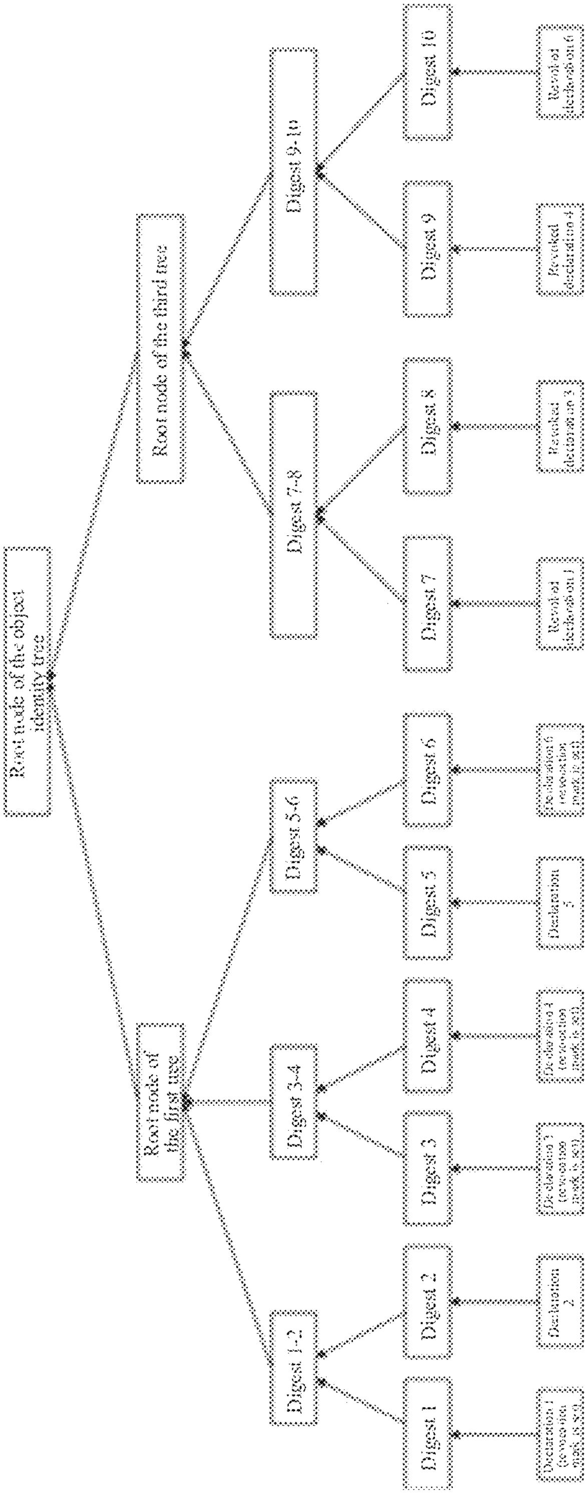
FIG. 18 is a schematic diagram of an object identity tree according to an embodiment of this application.
Figure 19:
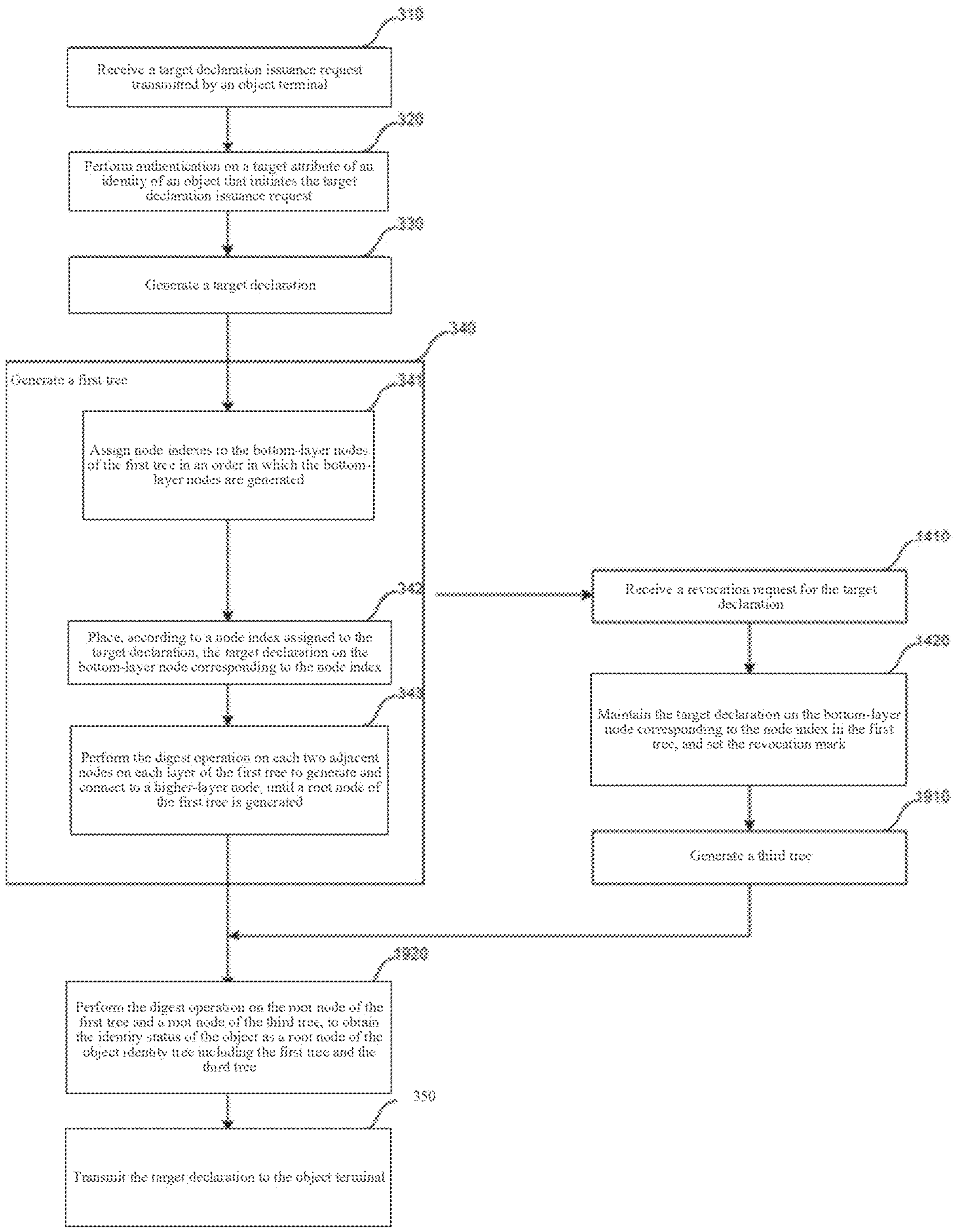
FIG. 19 is a flowchart of an identity verification method according to another embodiment of this application.

The following describes the process of generating the object identity tree in detail with reference to FIG. 18 and FIG. 19.

As shown in FIG. 19, after operation 1420, the identity verification method according to an embodiment of this application may further include the following operations.

Operation 1910: Generate a third tree.

Operation 1920: Perform the digest operation on the root node of the first tree and a root node of the third tree, to obtain the identity status of the object as a root node of the object identity tree including the first tree and the third tree.

Operation 1910 and operation 1920 are described in detail below.

In operation 1910, first, the digest of the target declaration with the revocation mark being set in the first tree is used as a bottom-layer node of the third tree, namely, a lowest-layer node in the third tree; and digests of other declarations with revocation marks being set of the object in the first tree are used as other bottom-layer nodes of the third tree. Further, the digest operation is performed on each two adjacent nodes on each layer of the third tree, to generate and connect to a higher-layer node, until the root node of the third tree is generated.

The specific implementation of the process is similar to a specific implementation process of generating the first tree in operation 340. A difference lies that, in operation 1910, a declaration with a revocation mark being set of the object is used as a bottom-layer node to generate the third tree; and in operation 340, all declarations of the object are used as bottom-layer nodes to generate the first tree. Details are not described herein again.

As shown in FIG. 18, declarations with revocation marks being set in the first tree include a declaration 1, a declaration 3, a declaration 4, and a declaration 6. Therefore, a digest of the declaration 1 is used as a bottom-layer node of the third tree, namely, a digest 7; a digest of the declaration 3 is used as a bottom-layer node of the third tree, namely, a digest 8; a digest of the declaration 4 is used as a bottom-layer node of the third tree, namely, a digest 9; and a digest of the declaration 6 is used as a bottom-layer node of the third tree, namely, a digest 10. Next, the digest operation is performed on the digest 7 and the digest 8, to generate and connect to a higher-layer node, namely, a digest 7-8; and the digest operation is performed on the digest 9 and the digest 10, to generate and connect to a higher-layer node, namely, a digest 9-10. Finally, the digest operation is performed on the digest 7-8 and the digest 9-10, to generate and connect to a higher-layer node, namely, the root node of the third tree. Note that as described earlier, "generate and connect" indicate a step process, which is generating an upper layer node based on two adjunct (neighboring) nodes at a lower layer, and connect the two lower layer nodes to the generated node.

In operation 1920, the digest operation is performed on the root node of the first tree and the root node of the third tree by using the predetermined digest algorithm, to obtain the identity status of the object, and use the identity status of the object as the root node of the object identity tree including the first tree and the third tree. A specific implementation process of performing the digest operation on the root node of the first tree and the root node of the third tree is similar to the implementation process of operation 334. Details are not described herein again.

As shown in FIG. 18, first, digests of the declaration 1 to the declaration 6 are used as bottom-layer nodes of the first tree. Then, the digest operation is performed on a digest 1 and a digest 2, to obtain a digest 1-2 on a higher layer; the digest operation is performed on a digest 3 and a digest 4, to obtain a digest 3-4 on the higher layer; and the digest operation is performed on a digest 5 and a digest 6, to obtain a digest 5-6 on the higher layer. Finally, the digest operation is performed on the digest 1-2, the digest 3-4, and the digest 5-6, to obtain the root node of the first tree. Similarly, the digests of the revoked declaration 1, declaration 3, declaration 4, and declaration 6 are used as the bottom-layer nodes of the third tree, and the digest operation is performed on each two adjacent bottom-layer nodes, to generate and connect to a higher-layer node, and so on, to generate the root node of the third tree. Finally, the digest operation is performed on the root node of the first tree and the root node of the third tree, to obtain the root node of the object identity tree, where the root node can indicate the object identity status of the object.

Based on operation 1910 and operation 1920, it can be convenient to generate the separate third tree according to the revoked declarations of the object, and form the complete object identity tree according to the third tree formed by the digests of the revoked declarations and the first tree formed by the digests of all the declarations of the object; and statuses of all the declarations of the object can be reflected through the object identity tree, so that a risk that declaration data is modified can also be reduced, thereby improving data security of the object identity tree.

Detailed Description of a Process of Performing, by Using the Object Identity Tree, Verification on Whether the Target Declaration does not Exist In the first verification in the foregoing embodiments, verification is performed on whether the target declaration does not exist by using only the first tree. If the target declaration for verification is a revoked declaration, the verification may be inaccurate. Based on this, in the embodiments of this application, a solution for performing, by using the object identity tree, verification on whether the target declaration does not exist is provided, so that verification accuracy can be improved.

Figure 20:
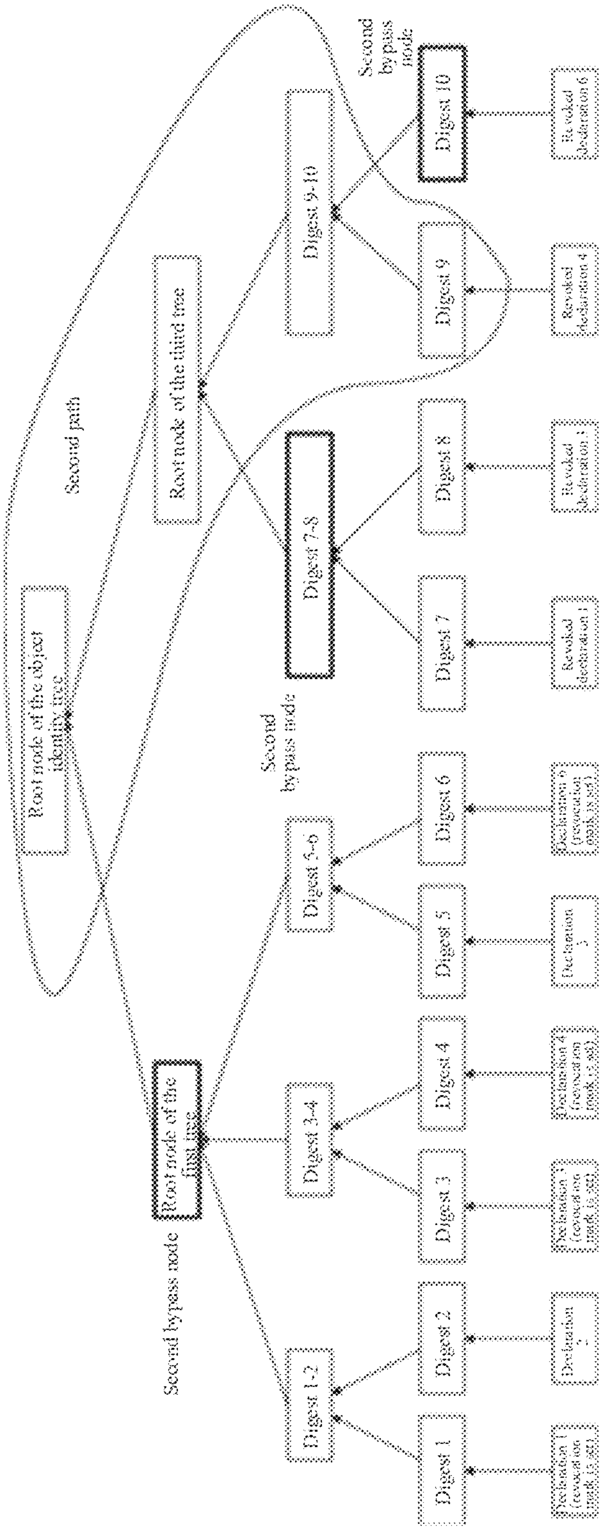
FIG. 20 is a schematic diagram of second bypass nodes of a second path in the object identity tree in FIG. 18.
Figure 21:
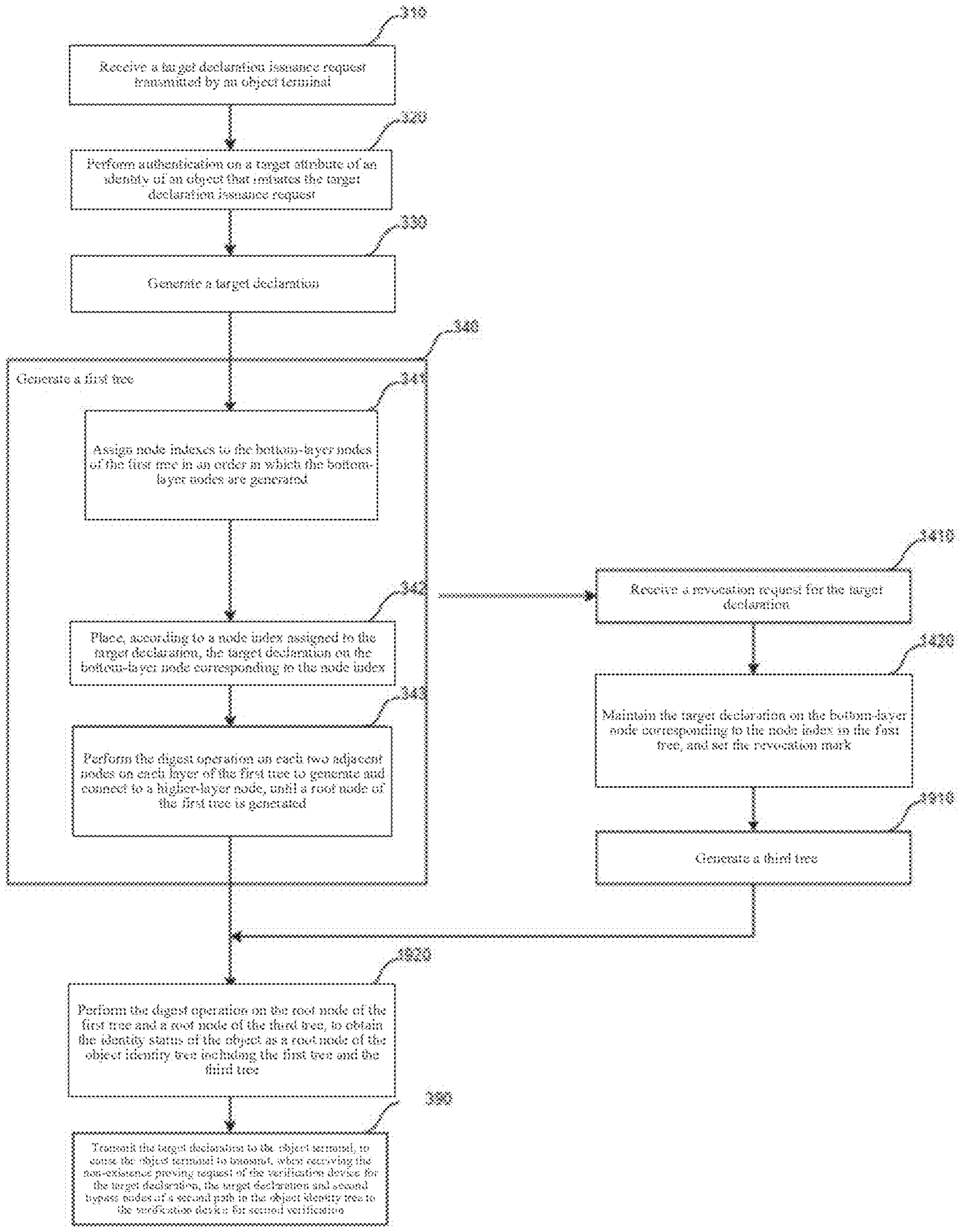
FIG. 21 is a flowchart of an identity verification method according to another embodiment of this application.

The following describes the process of performing, by using the object identity tree, verification on whether the target declaration does not exist in detail with reference to FIG. 20 and FIG. 21.

As shown in FIG. 21, after operation 1920, the identity verification method according to an embodiment of this application may further include the following operation.

Operation 390: Transmit the target declaration to the object terminal, to cause the object terminal to transmit, when receiving the non-existence proving request of the verification device for the target declaration, the target declaration and second bypass nodes of a second path in the object identity tree to the verification device for second verification.

In operation 390, the second path is a path from a node on which the target declaration is located to the root node of the object identity tree in the third tree, and the second bypass nodes are lower-layer nodes to which other nodes except the node on which the target declaration is located are further connected on the second path. Stated in another way, the second bypass nodes are nodes that connect to the second path but are not in the second path.

As shown in FIG. 20, it is assumed that the target declaration is a revoked declaration 4, and the second path is a path from a digest 9 and the root node of the object identity tree in the object identity tree, where the second path covers a path connecting a digest 9-10, the root node of the third tree, and the root node of the object identity tree. The digest 9-10 needs to be generated based on the digest 9 and a digest 10, and if the digest 9 is known, the digest 10 further needs to be obtained. Therefore, the digest 10 is determined as a second bypass node. Similarly, the root node of the third tree needs to be generated based on a digest 7-8 and a digest 9-10, and after the digest 9-10 is generated according to the digest 9 and the digest 10 used as the second bypass node, the digest 7-8 further needs to be obtained. Therefore, the digest 7-8 is determined as a second bypass node. Similarly, the root node of the object identity tree needs to be generated based on the root node of the first tree and the root node of the third tree, and after the root node of the third tree is generated according to the digest 9, the digest 10 used as the second bypass node, and the digests 7-8, the root node of the first tree further needs to be obtained. Therefore, the root node of the first tree is determined as a second bypass node. Therefore, the second bypass nodes of the second path include the digest 10, the digest 7-8, and the root node of the first tree. The second bypass nodes are indicated by black thick solid boxes in FIG. 20. Other features except the second bypass nodes and the target declaration of the object in the object identity tree are not provided to the verification device. Referring to FIG. 20, a bypass node has such properties: the second bypass node is used to generate a node in the second path but is not included in the second path. For example, node digest 10, digest 7-8, and root node of the first tree are all second bypass noded.

During specific implementation of this embodiment, a manner for obtaining the second bypass nodes is similar to the manner for obtaining the first bypass nodes in the first verification in operation 350. Details are not described herein again.

During specific implementation of this embodiment, the second verification includes, but not limited to, the following operations: performing the digest operation on the target declaration, to obtain the digest of the target declaration; determining a second recovered root node based on the digest of the target declaration and the second bypass nodes; and comparing the root node of the object identity tree with the second recovered root node, to perform the second verification.

A specific implementation process of the second verification is similar to the specific implementation process of the first verification in operation 350. A difference lies in that, the second recovered root node in the second verification is determined based on the digest of the target declaration and the second bypass nodes, and in the second verification, the root node of the object identity tree is compared with the second recovered root node; and the first recovered root node in the first verification in operation 350 is determined based on the digest of the target declaration and the first bypass nodes, and in the first verification, the root node of the first tree is compared with the first recovered root node. Details are not described herein again.

In this manner, when the verification device performs the second verification, verification can be performed on the revoked target declaration by using the object identity tree including the first tree and the third tree, and information related to generation of the root node of the object identity tree from the digest of the target declaration upward layer by layer can be provided to the verification device, thereby ensuring that the verification device can perform correct second verification, and improving verification accuracy. In addition, information unrelated to generation of the root node of the object identity tree from the digest of the target declaration upward layer by layer is not provided to the verification device as much as possible, thereby reducing leakage of object information, and improving data security.

Detailed Description of a Process of Performing Data On-Chaining on the Object Identity Tree Tasks to which the target declaration are applied are quite extensive; and if related information of the target declaration is stored in only the declaration issuing device, other parties need to transmit a request to the declaration issuing device when the other parties need to use the related information. This puts a great pressure on communication transmission, and also affect efficiency of obtaining data. Based on this, to improve convenience of obtaining the related information by the other parties, in the embodiments of this application, a solution is further provided: After the declaration issuing device generates the target declaration and the related information, data is stored in a block and the block is on-chained to a blockchain; and when the other parties need to use the related information, the related information can be directly extracted from the corresponding block of the blockchain. In this way, data sharing can be achieved, thereby improving convenience of obtaining the data; and the digest of the declaration is recorded on the blockchain, thereby improving data security.

Figure 22A:
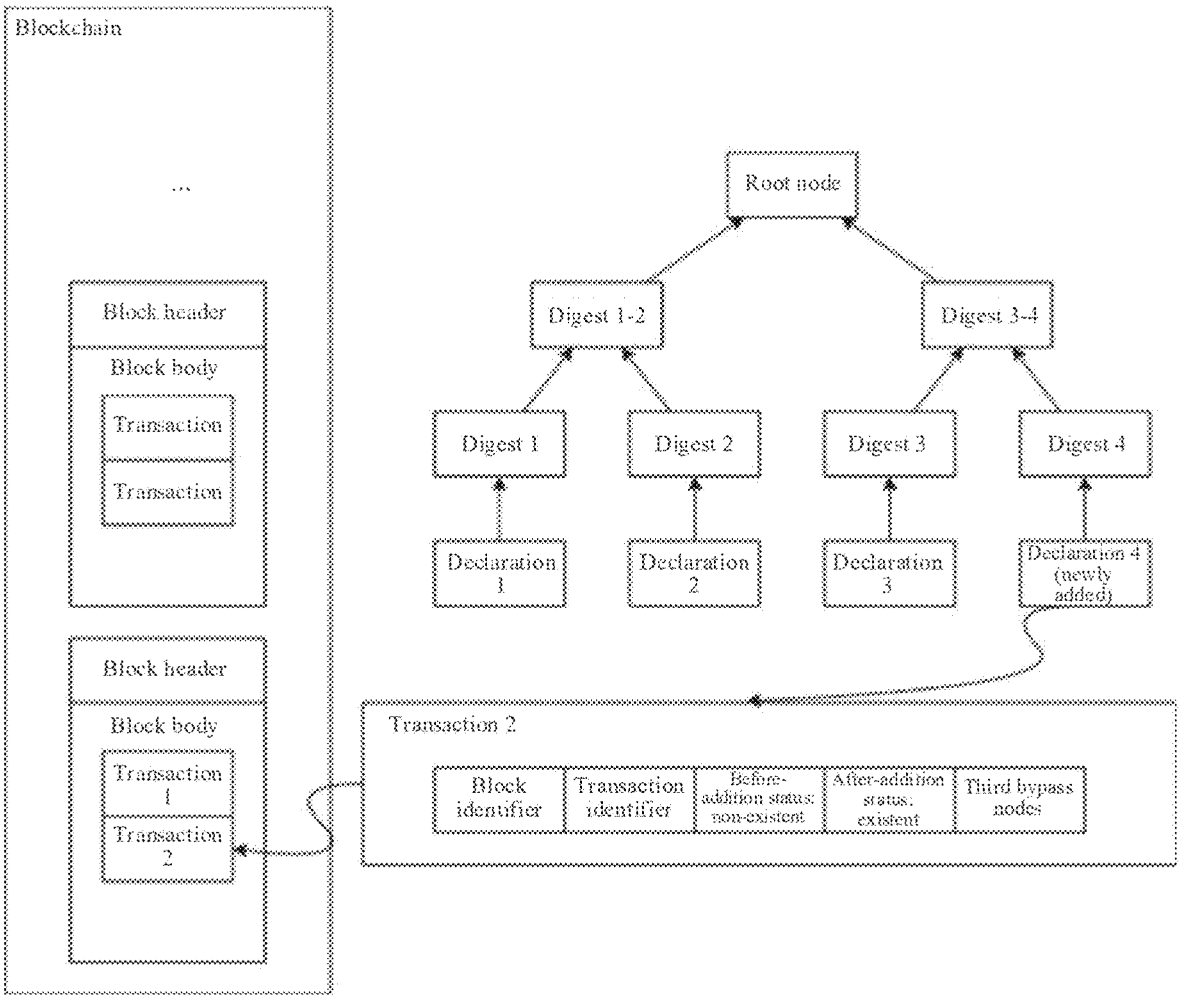
FIG. 22A shows an exemplary process of on-chaining related information in response to addition of a lowest-layer node in a first tree.
Figure 22B:
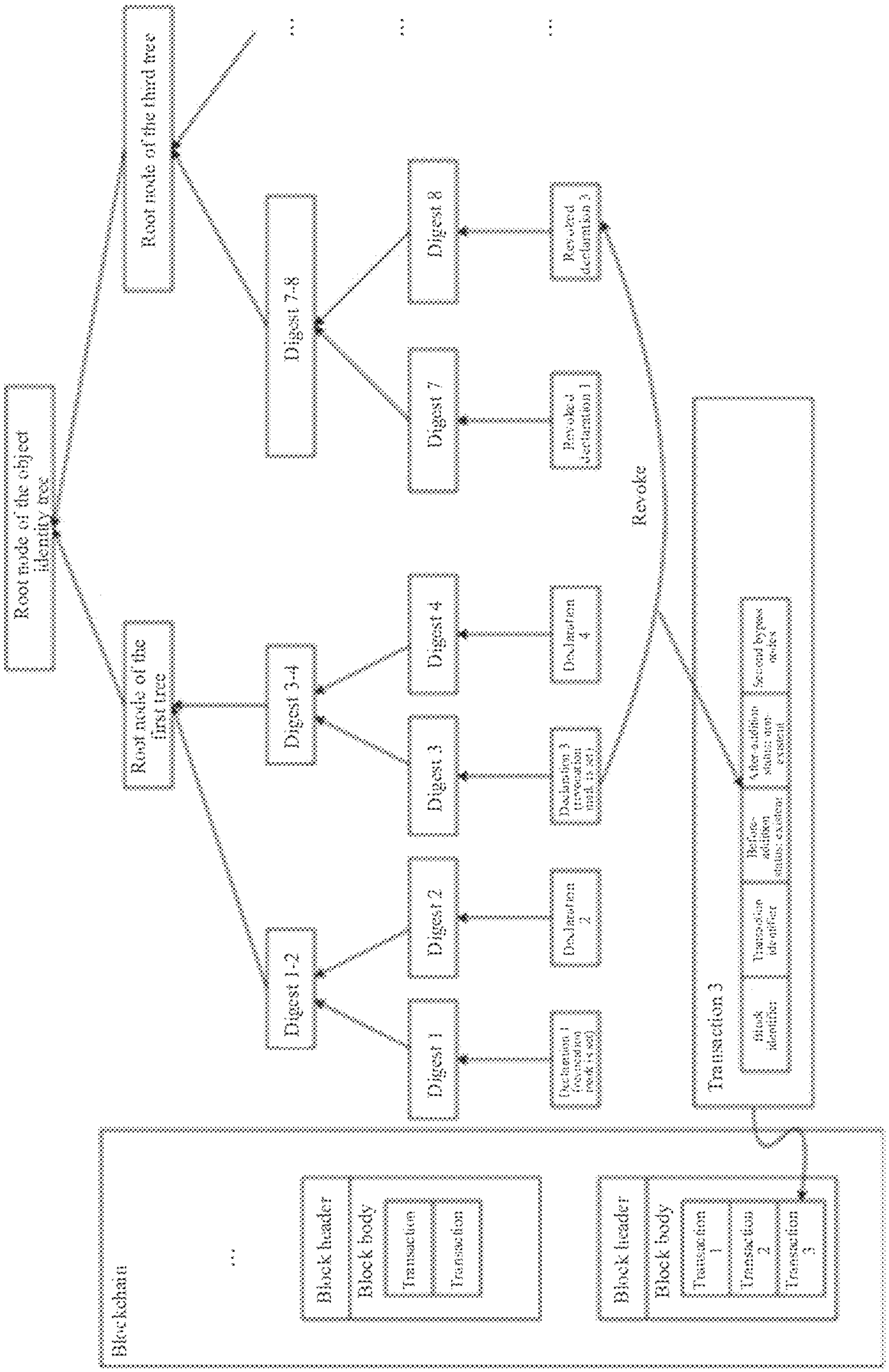
FIG. 22B shows an exemplary process of on-chaining related information in response to addition of a lowest-layer node in a third tree.
Figure 23:
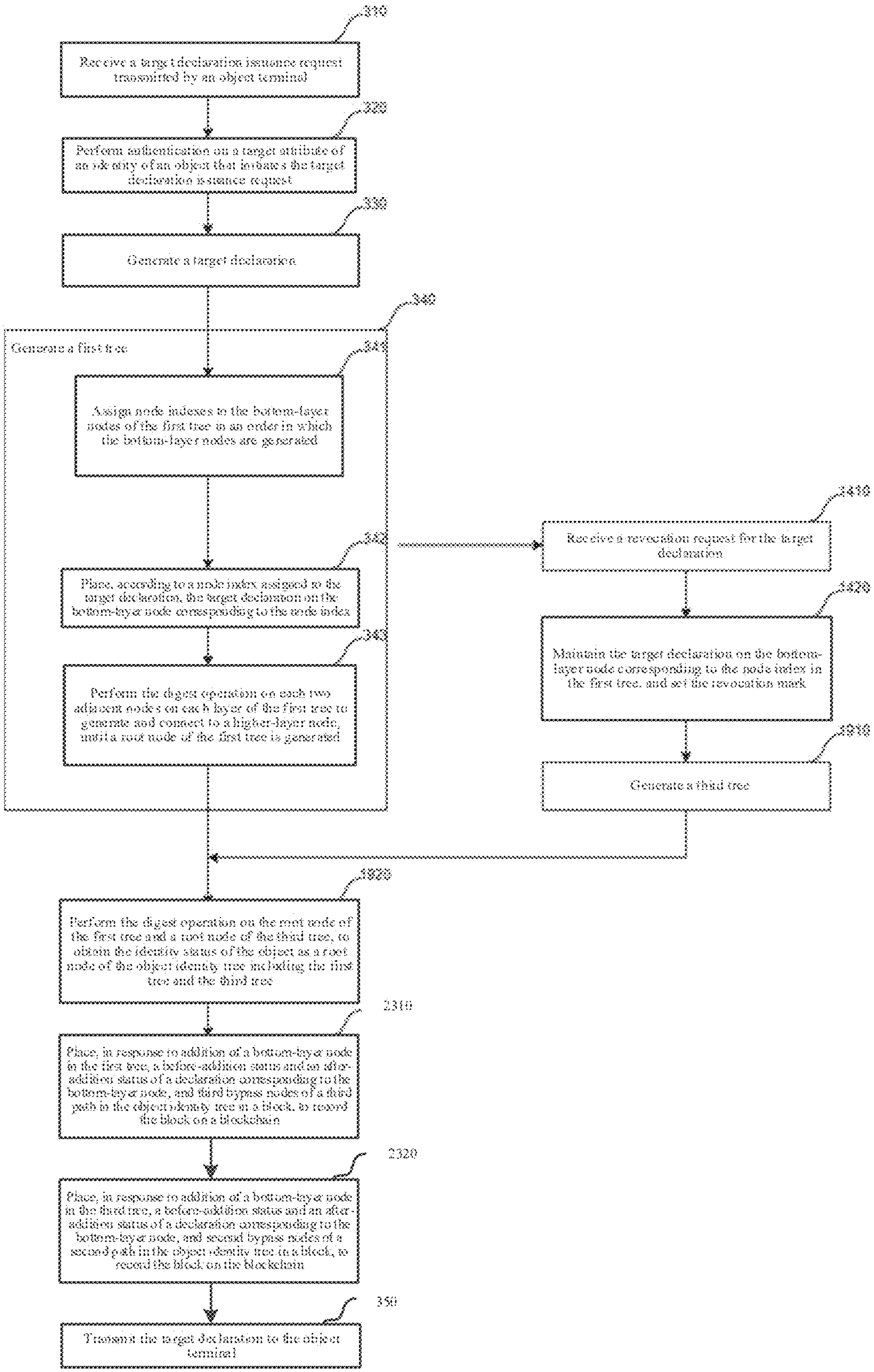
FIG. 23 is a flowchart of an identity verification method according to another embodiment of this application.

The following describes the process of performing data on-chaining on the object identity tree in detail with reference to FIG. 22A, FIG. 22B, and FIG. 23.

As shown in FIG. 23, after operation 1920, the identity verification method according to an embodiment of this application may further include the following operations.

Operation 2310: Place, in response to addition of a bottom-layer node in the first tree, a before-addition status and an after-addition status of a declaration corresponding to the bottom-layer node, and third bypass nodes of a third path in the object identity tree in a block, to record the block on a blockchain.

Operation 2320: Place, in response to addition of a bottom-layer node in the third tree, a before-addition status and an after-addition status of a declaration corresponding to the bottom-layer node, and second bypass nodes of a second path in the object identity tree in a block, to record the block on the blockchain.

In operation 2310, the third path is a path from the bottom-layer node added in the first tree to the root node of the object identity tree, and the third bypass nodes being lower-layer nodes to which other nodes except the added bottom-layer node are further connected on the third path.

During specific implementation of this embodiment, after generating a new declaration according to a declaration issuance request of the object terminal, the declaration issuing device needs to add a digest of the new declaration to the first tree as a new bottom-layer node of the first tree. Before the addition, a status of the declaration is non-existent. Therefore, a before-addition status of the declaration is non-existent. After the addition, a status of the declaration is existent. Therefore, an after-addition status of the declaration is existent.

Further, after the digest of the new declaration is added to the first tree, third bypass nodes of the declaration in the object identity tree are determined. A process of determining the third bypass nodes is similar to the specific implementation process of determining the second bypass nodes in the second verification in operation 390. For brevity, details are not described herein again.

Finally, the before-addition status and the after-addition status of the declaration, and the third bypass nodes are used as one transaction, and the transaction is stored in a block, so that the before-addition status and the after-addition status of the declaration, and the third bypass nodes are recorded on the blockchain.

As shown in FIG. 22A, a declaration 4 is a declaration newly added to the first tree, a before-addition status of the declaration 4 is non-existent, and an after-addition status of the declaration 4 is existent. Finally, the before-addition status and the after-addition status of the declaration 4, and third bypass nodes are used as a transaction 2, and the transaction 2 is stored in a block of the blockchain, so that the before-addition status and the after-addition status of the declaration 4, and the third bypass nodes are recorded on the blockchain.

A specific implementation process of operation 2320 is similar to that of operation 2310. A difference lies in that, in operation 2310, the before-addition status of the declaration is non-existent, and the after-addition status of the declaration is existent; and in operation 2320, the before-addition status of the declaration is existent, and the after-addition status of the declaration is non-existent. Details are not described herein again.

As shown in FIG. 22B, a declaration 3 is a latest revoked declaration in the first tree, a before-addition status of the declaration 3 is existent, and an after-addition status of the declaration 3 is non-existent. Finally, the before-addition status and the after-addition status of the declaration 3, and second bypass nodes are used as a transaction 3, and the transaction 3 is stored in a block of the blockchain, so that the before-addition status and the after-addition status of the declaration 3, and the second bypass nodes are recorded on the blockchain.

Based on operation 2310 and operation 2320, when a status transition of a declaration occurs, a before-transfer status and an after-transfer status of the declaration, and bypass nodes corresponding to the declaration can be stored in a block together, and the block is recorded on the blockchain, thereby improving storage and recording of the status transition of the declaration. In this way, verification can be performed on a status change of the declaration at any time based on status transition data recorded in the block, thereby improving security of the status transition data.

Detailed Description of a Process of Performing Verification on Whether a Status Transition of a Declaration is Legal When a declaration is newly generated or revoked, a status of the declaration is changed. In some cases, the status change of the declaration is legal. However, in other cases, the status change of the declaration is illegal. Such illegality is mainly reflected in illegality of a before-addition status in a block recorded on the blockchain in the foregoing embodiments. For example, the before-addition status in the block is that the declaration exists, but in fact, from the object identity tree, the declaration has been revoked. If the declaration has an illegal status change, it often affects verification accuracy to a great extent. Based on this, in the embodiments of this application, a solution for performing verification on whether a status transition of a declaration is normal is considered, so that verification can be performed on legality of the status transition before data is on-chained, thereby improving data security, and reducing a risk caused by an illegal status transition.

The following describes the process of performing verification on whether the status transition of the declaration is normal in detail with reference to FIG. 24, FIG. 25A, FIG. 25B, and FIG. 26.

Figure 26:
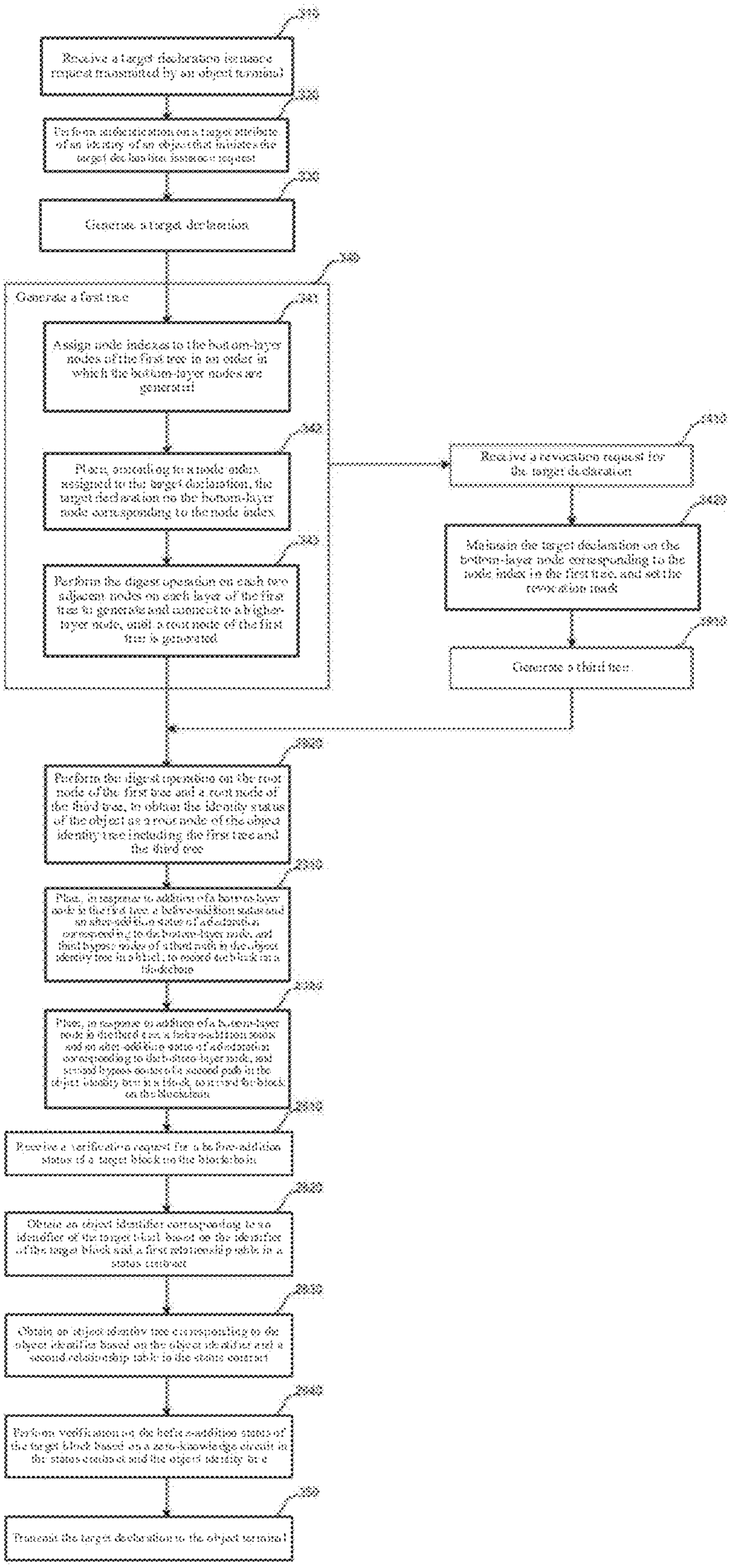
FIG. 26 is a flowchart of an identity verification method according to another embodiment of this application.

As shown in FIG. 26, after operation 2320, the identity verification method according to an embodiment of this application may further include the following operations.

Operation 2610: Receive a verification request for a before-addition status of a target block on the blockchain.

Operation 2620: Obtain an object identifier corresponding to an identifier of the target block based on the identifier of the target block and a first relationship table in a status contract.

Operation 2630: Obtain an object identity tree corresponding to the object identifier based on the object identifier and a second relationship table in the status contract.

Operation 2640: Perform verification on the before-addition status of the target block based on a zero-knowledge circuit in the status contract and the object identity tree.

Operation 2610 to operation 2640 are described in detail below.

In operation 2610, the verification request is a request triggered for performing verification on whether a status transition of a declaration that has subjected to the status transition is legal.

Figures 24, 25A, 25B:
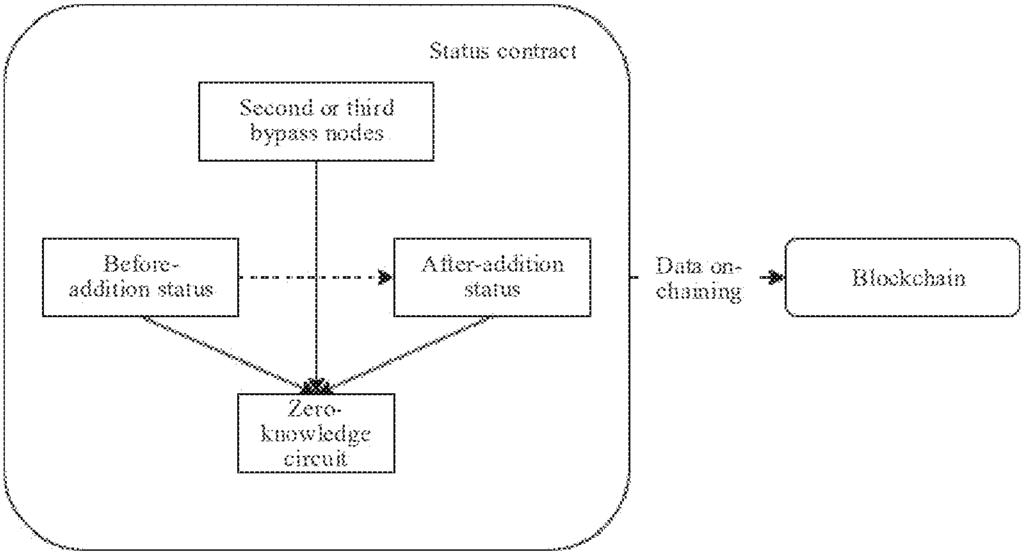
FIG. 24 is a schematic diagram of performing verification on a before-addition status of a target block according to an embodiment of this application.
FIG. 25A shows an example of a first relationship table according to an embodiment of this application.
FIG. 25B shows an example of a second relationship table according to an embodiment of this application.

In operation 2620, on the blockchain, the status contract of the declaration issuing device maintains data such as the object identifier and status transition information, and constructs the first relationship table according to the correspondence between the object identifier and the block identifier, where identifiers of blocks and object identifiers in the first relationship table are in a one-to-one correspondence. As shown in FIG. 25A, a left column of the first relationship table includes an identifier 1 of a first block, an identifier 2 of a second block, . . . , and an identifier n of an $n^{th}$ block. A right column of the first relationship table includes an object identifier corresponding to each item in the left column, where the identifier 1 of the first block corresponds to an object identifier 1, the identifier 2 of the second block corresponds to an object identifier 2, . . . , and the identifier n of the $n^{th}$ block corresponds to an object identifier n.

The verification request includes the identifier of the to-be-subjected-to-verification target block. According to the identifier of the target block, the object identifier corresponding to the block identifier of the target block is searched for in the first relationship table, to determine an object to which a declaration in a before-addition status that needs to be subjected to verification belongs.

In operation 2630, on the blockchain, the status contract of the declaration issuing device also maintains data related to an object identity status, and constructs the second relationship table according to the correspondence between the object identifier and the object identity tree, where object identifiers and object identity trees in the second relationship table are in a one-to-one correspondence. As shown in FIG. 25B, a left column of the second relationship table includes an object identifier 1, an object identifier 2, . . . , and an object identifier n. A right column of the second relationship table includes an object identity tree corresponding to each item in the left column, where the object identifier 1 corresponds to an object identity tree 1, the object identifier 2 corresponds to an object identity tree 2, . . . , and the object identifier n corresponds to an object identity tree n.

During specific implementation of this embodiment, according to the object identifier, the object identity tree corresponding to the object identifier is searched for in the second relationship table, to determine an object identity tree to which the declaration in the before-addition status that needs to be subjected to verification belongs.

In operation 2640, the status contract provides a status transition interface, and verification is performed on the before-addition status of the target block by using the object identity tree and a verification capability of the zero-knowledge circuit in the status transition interface.

During specific implementation of this embodiment, a process of performing verification on the before-addition status of the target block by using the zero-knowledge circuit and the object identity tree includes, but not limited to, the following operations: extracting the before-addition status, an after-addition status, and second or third bypass nodes from the target block; obtaining, by using the zero-knowledge circuit, a latest status of a declaration corresponding to the target block from the object identity tree according to the second or third bypass nodes; and performing verification on whether the latest status is consistent with the before-addition status.

In a specific embodiment, if it is verified that the latest status is consistent with the before-addition status, it indicates that the status transition information in the target block is legal, and it is determined that the verification on the before-addition status of the target block succeeds. If it is verified that the latest status is not consistent with the before-addition status, it indicates that the status transition information in the target block is illegal, and it is determined that the verification on the before-addition status fails. For example, if the target block indicates that a before-addition status of a declaration A is non-existent, but the zero-knowledge circuit obtains that a latest status change of the declaration A before this is from non-existent to existent, a contradiction occurs, and the verification fails.

As shown in FIG. 24, the before-addition status, the after-addition status, and the second or third bypass nodes of the target block are provided to the zero-knowledge circuit through the status transition interface of the status contract. When the zero-knowledge circuit verifies that the status transition information in the target block is legal, the zero-knowledge circuit performs data on-chaining on the before-addition status, the after-addition status, and the second or third bypass nodes of the target block, to record the target block on the blockchain.

The status contract is substantially a smart contract, which is a contract running in a network space based on a computer. The status contract is configured to maintain related information generated when the declaration issuing device issues a declaration to the object terminal, and is further configured to record the target block on the blockchain after the zero-knowledge circuit verifies the before-addition status of the target block, to achieve sharing of data of all parties on the blockchain.

Based on operation 2610 to operation 2640, before data on-chaining, based on the correspondence between the block identifier and the object identifier and the correspondence between the object identifier and the object identity tree, verification is performed on whether the status transition of the declaration is secure and legal, so that legality of the status transition and security of on-chained data can be improved. In addition, during the verification, the zero-knowledge circuit in the status contract is introduced, and the zero-knowledge circuit can implement batch verification on status transitions of declarations, so that verification efficiency can further be improved.

Detailed Description of Another Identity Verification Manner

If the object terminal requests the declaration issuing device to issue a new declaration each time the object terminal receives a verification request, a large number of declarations may be repeated, reducing multiplexing of the declarations, and also resulting in low verification efficiency. Based on this, in the embodiments of this application, a solution in which a verification request is compared with an existing declaration and declarations are provided in different manners according to different comparison results is considered, so that the multiplexing of the declarations can be improved, and verification efficiency can also be improved.

Figure 27:
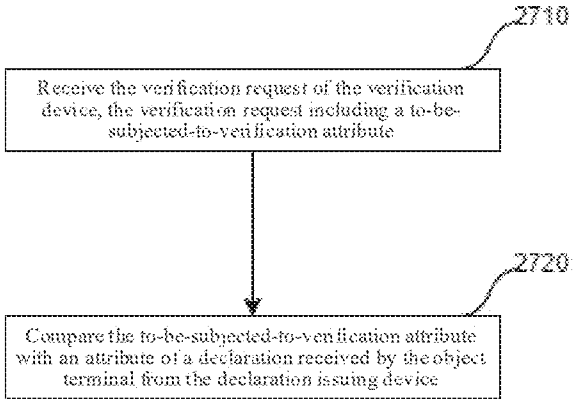
FIG. 27 is a detailed flowchart of receiving a verification request of a verification device for a target attribute in operation 350 in FIG. 3.

As shown in FIG. 27, in some embodiments, a specific execution process when the object terminal receives the verification request of the verification device for the target attribute includes the following operations.

Operation 2710: Receive the verification request of the verification device, the verification request including a to-be-subjected-to-verification attribute.

Operation 2720: Compare the to-be-subjected-to-verification attribute with an attribute of a declaration received by the object terminal from the declaration issuing device, and find that the to-be-subjected-to-verification attribute is consistent with the target attribute of the target declaration.

In operation 2710, the verification request of the verification device is a request triggered by the verification device that intends to perform verification on whether the identity information of the object terminal satisfies some particular privileges. The verification request includes one or more to-be-subjected-to-verification attributes. The to-be-subjected-to-verification attributes are similar to the foregoing target attributes. The to-be-subjected-to-verification attributes include some pieces of data related to the object identity of the object terminal on which the verification device intends to perform verification. For example, the to-be-subjected-to-verification attributes include a city, an industry, and work seniority of the object of the object terminal.

In operation 2720, because the object terminal stores the declaration received from the declaration issuing device in the declaration clip of the object terminal, the object terminal may compare the to-be-subjected-to-verification attribute with an attribute of each declaration in the declaration clip. If it is found that the to-be-subjected-to-verification attribute is consistent with the target attribute of the target declaration, it indicates that the target declaration can satisfy a verification requirement of the verification device, and the target declaration and the first bypass nodes corresponding to the target declaration are provided to the verification device for the first verification. A manner for obtaining the first bypass nodes and a process of implementing the first verification are similar to those in operation 350. Details are not described herein again.

In some embodiments, if the object terminal compares the to-be-subjected-to-verification attribute with the attribute of the declaration received by the object terminal from the declaration issuing device and finds that the to-be-subjected-to-verification attribute is not consistent with the target attribute of the target declaration, the object terminal generates a new target declaration issuance request and transmits the target declaration issuance request to the declaration issuing device. The declaration issuing device issues a target declaration capable of satisfying the foregoing verification request to the object terminal according to the specific implementation process of operation 310 to operation 350.

Based on operation 2710 and operation 2720, the object terminal compares the to-be-subjected-to-verification attribute with the attribute of the declaration that has already existed in the declaration clip. When the target attribute of the target declaration is consistent with the to-be-subjected-to-verification attribute, the target declaration is directly invoked to the verification device for verification, so that multiplexing of the target declaration is improved, and verification efficiency can also be improved. When the target attribute of the target declaration is not consistent with the to-be-subjected-to-verification attribute, a new declaration is directly requested to be generated from the declaration issuing device, the new declaration is provided to the verification device, so that the verification device can perform normal identity verification. In addition, the new declaration is also stored in the declaration clip, so that the new declaration can be applied to other tasks, thereby improving diversity of declarations in the declaration clip.

Figure 28:
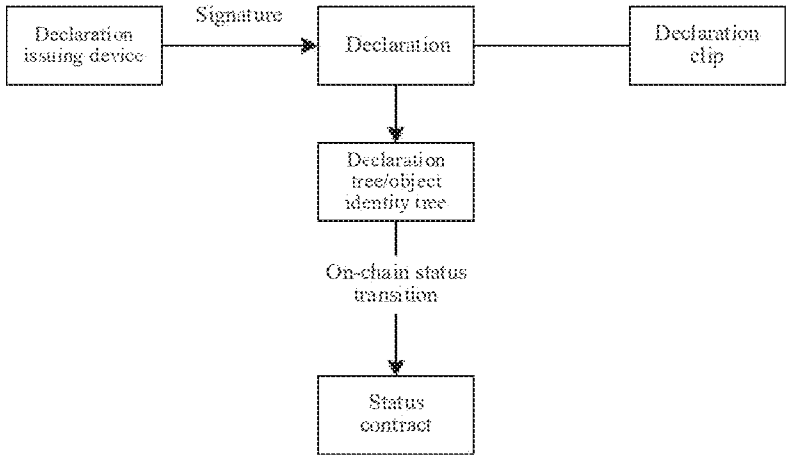
FIG. 28 is a summary diagram of an identity verification method according to an embodiment of this application.

General Description of the Identity Verification Method in the Embodiments of this Application FIG. 28 is a general diagram of an identity verification method according to an embodiment of this application.

As shown in FIG. 28, after receiving a declaration issuance request from an object terminal, a declaration issuing device firstly generates a corresponding declaration according to operation 310 to operation 340. Next, the declaration issuing device transmits the declaration to a declaration clip of the object terminal, so that the object terminal transmits, after receiving a verification request of a verification device, the declaration and bypass nodes corresponding to the declaration to the verification device for identity verification. In addition, the declaration issuing device generates, based on the generated declaration, an object identity tree according to operation 1910 and operation 1920. Next, the declaration issuing device further performs on-chaining on declaration data of the object identity tree and status transition data of the declaration according to operation 2310, operation 2320, and operation 2610 to operation 2640, and records the data on a blockchain through a status contract.

Advantages of this lie in that, a first tree is constructed by using an attribute of each declaration, so that a data structure of the declaration is more standard. The declaration is issued based on operation 310 to operation 350, so that a procedure of issuing the declaration by the declaration issuing device can be more canonical and appropriate, and verification efficiency can be improved. In addition, in the embodiments of this application, the declaration issued by the declaration issuing device for an object is presented in terms of the first tree and a third tree, so that a risk that the declaration is randomly tampered can be reduced by using characteristics of a sparse tree, and proof-of-existence and proof-of-non-existence of the declaration can be implemented by using the sparse tree. When status transition verification is performed on the declaration, an identity status of the object is maintained on the blockchain in the form of the status contract, and a zero-knowledge circuit is also introduced for verification, so that verification can be better performed on whether an on-chain status and an off-chain status of the declaration are consistent, and verification accuracy and verification efficiency can be improved. In the embodiments of this application, during verification, an original identity certifying material is not provided, and underlying identity information of the object is not contacted, but only the target declaration of the declaration issuing device and information about the target declaration are provided, so that security of object identity information during the verification can be improved.

Description of an Apparatus and a Device in the Embodiments of this Application

Although the steps in the flowcharts are sequentially shown according to indication of arrows, the steps are not necessarily sequentially performed according to orders indicated by the arrows. Unless otherwise explicitly specified in this embodiment, execution of the steps is not strictly limited, and the steps may be performed in other orders. In addition, at least some steps in the above flowcharts may include a plurality of steps or a plurality of stages, and these steps or stages are not necessarily performed at same time, but may be performed at different time. The steps or stages are not necessarily performed sequentially, but may be performed by turn or alternately with other steps or at least part of steps or stages in other steps.

In specific implementations of this application, when relevant processing needs to be performed based on data related to characteristics of a target object, such as attribute information or an attribute information set of the target object, permission or consent of the target object is first obtained, and collection, use, and processing of such data all comply with relevant laws, regulations, and standards in relevant countries and regions. In addition, when the attribute information of the target object needs to be obtained in the embodiments of this application, individual permission or individual consent of the target object is obtained by popping up a window, jumping to a confirmation page, or the like. After the individual permission or individual consent of the target object is explicitly obtained, relevant data of the target object that is necessary for ensuring the embodiments of this application operate normally is obtained.

Figure 29:
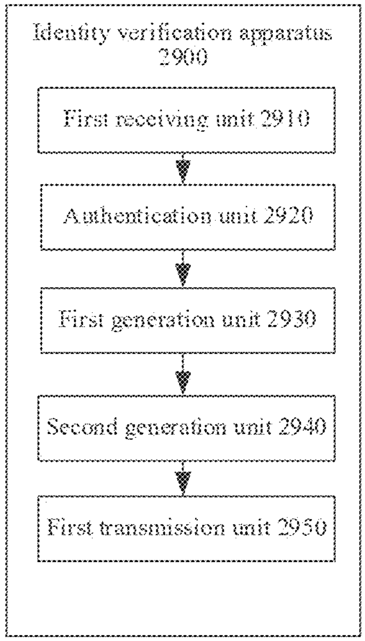
FIG. 29 is a block diagram of an identity verification apparatus according to an embodiment of this application.

FIG. 29 is a schematic structural diagram of an identity verification apparatus 2900 according to an embodiment of this application. The identity verification apparatus 2900 includes: a first receiving unit 2910, configured to receive a target declaration issuance request transmitted by an object terminal; an authentication unit 2920, configured to perform authentication on a target attribute of an identity of an object that initiates the target declaration issuance request; a first generation unit 2930, configured to generate a target declaration after the authentication succeeds, the target declaration being an authentication result for the target attribute of the object identity; a second generation unit 2940, configured to generate a first tree, a digest of the target declaration being a bottom-layer node of the first tree, digests of other declarations issued to the object being other bottom-layer nodes of the first tree, and a digest operation being performed on each two adjacent nodes on each layer of the first tree to generate and connect to a higher-layer node, until a root node of the first tree is generated; and a first transmission unit 2950, configured to transmit the target declaration to the object terminal, to cause the object terminal to transmit, when receiving a verification request of a verification device for the target attribute, the target declaration and first bypass nodes of a first path in the first tree to the verification device for first verification, the first path being a path from the digest of the target declaration to the root node in the first tree, and the first bypass nodes being lower-layer nodes to which other nodes except the digest of the target declaration are further connected on the first path.

In one embodiment, the first verification includes: performing the digest operation on the target declaration, to obtain the digest of the target declaration; determining a first recovered root node based on the digest of the target declaration and the first bypass nodes; and comparing the root node of the first tree with the first recovered root node, to perform the first verification.

In one embodiment, the target declaration issuance request includes a level of a task to which the target declaration is applied, and the authentication unit 2920 is further configured to: obtain the task level in the target declaration issuance request; perform first authentication on the target attribute if the task level satisfies a predetermined condition, the first authentication including: determining an authentication institution corresponding to the target attribute; transmitting the target attribute to a server of the authentication institution; and receiving the authentication result returned by the server of the authentication institution; and perform second authentication on the target attribute if the task level does not satisfy the predetermined condition, the second authentication including: determining an authentication document corresponding to the target attribute; transmitting a request for the authentication document to the object terminal; and obtaining the authentication document from a response of the object terminal, and performing authentication on the target attribute based on the authentication document.

In one embodiment, the target attribute includes a plurality of target attributes, and the target declaration includes a second tree; and the first generation unit 2930 is further configured to: assign a plurality of target attribute indexes to the plurality of target attributes, and use the plurality of target attribute indexes and the plurality of target attributes as bottom-layer nodes of the second tree; perform the digest operation on the plurality of target attributes, to obtain an attribute digest as a higher-layer node of the plurality of target attributes; perform the digest operation on the plurality of target attribute indexes, to obtain an index digest as a higher-layer node of the plurality of target attribute indexes; and perform the digest operation on the index digest and the attribute digest, to obtain the digest of the target declaration as a root node of the second tree.

In one embodiment, the first generation unit 2930 is further configured to: obtain priorities of the plurality of target attributes; arrange the plurality of target attributes into a first character string according to the priorities; perform the digest operation on the first character string, to obtain the attribute digest; arrange the plurality of target attribute indexes into a second character string according to the priorities; and perform the digest operation on the second character string, to obtain the index digest.

In one embodiment, the identity verification apparatus is located in a declaration issuing device, and the target declaration further includes a signature of the declaration issuing device; and the first generation unit 2930 is further configured to: perform the digest operation on the second tree, to generate a digest of the second tree; and encrypt the digest of the second tree by using a private key of the declaration issuing device, to obtain the signature.

In one embodiment, the target declaration further includes a revocation mark; the second generation unit 2940 is further configured to: assign node indexes to the bottom-layer nodes of the first tree in an order in which the bottom-layer nodes are generated; and place, according to a node index assigned to the target declaration, the target declaration on the bottom-layer node corresponding to the node index; and after the generating a first tree, the identity verification apparatus 2900 further includes: a second receiving unit (not shown), configured to receive a revocation request for the target declaration; and a setting unit (not shown), configured to maintain the target declaration on the bottom-layer node corresponding to the node index in the first tree, and set the revocation mark.

In one embodiment, the target declaration further includes an expiration date and a revocation mark; the second generation unit 2940 is further configured to: assign node indexes to the bottom-layer nodes of the first tree in an order in which the bottom-layer nodes are generated; and place, according to a node index assigned to the target declaration, the target declaration on the bottom-layer node corresponding to the node index; and the identity verification apparatus 2900 further includes: a first determining unit (not shown), configured to determine, after the first tree is generated, that current time exceeds the expiration date of the target declaration; and a setting unit, configured to maintain the target declaration on the bottom-layer node corresponding to the node index in the first tree, and set the revocation mark.

In one embodiment, the identity verification apparatus 2900 further includes: a third receiving unit (not shown), configured to receive a non-existence proving request of the verification device for the target declaration; a first digest operation unit (not shown), configured to perform the digest operation on the target declaration, to obtain the digest of the target declaration; a second determining unit (not shown), configured to determine the first recovered root node based on the digest of the target declaration and the first bypass nodes; and a third determining unit (not shown), configured to determine that proof-non-existence verification succeeds if the root node of the first tree is consistent with the first recovered root node and the revocation mark of the target declaration is set.

In one embodiment, the identity verification apparatus 2900 further includes: a third generation unit (not shown), configured to generate a third tree, the digest of the target declaration with the revocation mark being set being used as a bottom-layer node of the third tree, digests of other declarations with revocation marks being set of the object being used as other bottom-layer nodes of the third tree, and the digest operation being performed on each two adjacent nodes on each layer of the third tree to generate and connect to a higher-layer node, until a root node of the third tree is generated; and a second digest operation unit (not shown), configured to perform the digest operation on the root node of the first tree and the root node of the third tree, to obtain an identity status of the object as a root node of an object identity tree including the first tree and the third tree.

In one embodiment, the identity verification apparatus 2900 further includes: a second transmitting unit (not shown), configured to transmit the target declaration to the object terminal, to cause the object terminal to transmit, when receiving the non-existence proving request of the verification device for the target declaration, the target declaration and second bypass nodes of a second path in the object identity tree to the verification device for second verification, the second path being a path from a node on which the target declaration is located to the root node of the object identity tree in the third tree, and the second bypass nodes being lower-layer nodes to which other nodes except the node on which the target declaration is located are further connected on the second path.

In one embodiment, the identity verification apparatus 2900 further includes: a first on-chaining unit (not shown), configured to place, in response to addition of a bottom-layer node in the first tree, a before-addition status and an after-addition status of a declaration corresponding to the bottom-layer node, and third bypass nodes of a third path in the object identity tree in a block, to record the block on a blockchain, the third path being a path from the bottom-layer node added in the first tree to the root node of the object identity tree, and the third bypass nodes being lower-layer nodes to which other nodes except the added bottom-layer node are further connected on the third path; and a second on-chaining unit (not shown), configured to place, in response to addition of a bottom-layer node in the third tree, a before-addition status and an after-addition status of a declaration corresponding to the bottom-layer node, and second bypass nodes of a second path in the object identity tree in a block, to record the block on the blockchain, the second path being a path from the bottom-layer node added in the third tree to the root node of the object identity tree, and the second bypass nodes being lower-layer nodes to which other nodes except the added bottom-layer node are further connected on the second path.

In one embodiment, the identity verification apparatus 2900 further includes: a fourth receiving unit (not shown), configured to receive a verification request for a before-addition status of a target block on the blockchain; a first obtaining unit (not shown), configured to obtain an object identifier corresponding to an identifier of the target block based on the identifier of the target block and a first relationship table in a status contract, the first relationship table indicating a correspondence between the object identifier and the block identifier; a second obtaining unit (not shown), configured to obtain an object identity tree corresponding to the object identifier based on the object identifier and a second relationship table in the status contract, the second relationship table indicating a correspondence between the object identifier and the object identity tree; and a verification unit (not shown), configured to perform verification on the before-addition status of the target block based on a zero-knowledge circuit in the status contract and the object identity tree.

In one embodiment, the object terminal generates the target declaration issuance request in the following manner: obtaining the task to which the target declaration is applied; determining an attribute corresponding to the task as the target attribute; and generating the target declaration issuance request, the target declaration issuance request including the target attribute.

In one embodiment, the receiving a verification request of a verification device for the target attribute includes: receiving the verification request of the verification device, the verification request including a to-be-subjected-to-verification attribute; and comparing the to-be-subjected-to-verification attribute with an attribute of a declaration received by the object terminal from the declaration issuing device, and finding that the to-be-subjected-to-verification attribute is consistent with the target attribute of the target declaration.

Figure 30:
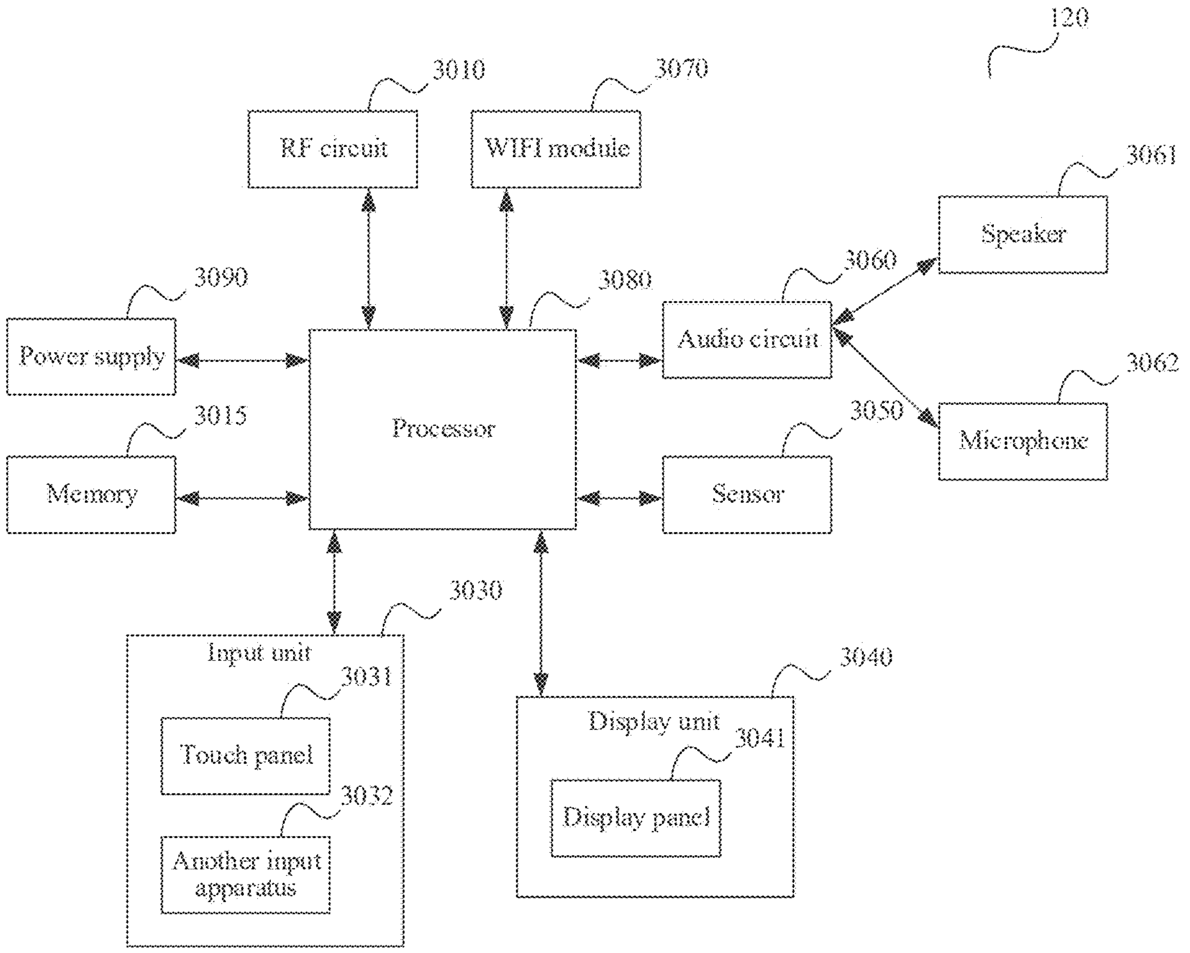
FIG. 30 is a structural diagram of an object terminal according to an embodiment of this application.

Referring to FIG. 30, FIG. 30 is a block diagram of a partial structure of an object terminal 120 that implements an identity verification method according to an embodiment of this application. The object terminal 120 includes components such as a radio frequency (RF) circuit 3010, a memory 3015, an input unit 3030, a display unit 3040, a sensor 3050, an audio circuit 3060, a wireless fidelity (WiFi) module 3070, a processor 3080, and a power supply 3090. A person skilled in the art may understand that the structure of the object terminal 120 shown in FIG. 30 does not constitute a limitation on a mobile phone or a computer, and the mobile phone or the computer may include more components or fewer components than those shown in the figure, or some components may be combined, or a different component deployment may be used.

The RF circuit 3010 may be configured to receive and transmit signals during an information receiving and transmitting process or a call process. Particularly, the RF circuit receives downlink information from a base station, then delivers the downlink information to the processor 3080 for processing, and transmits designed uplink data to the base station.

The memory 3015 may be configured to store a software program and module.

The processor 3080 runs the software program and module stored in the memory 3015, to implement various functional applications and data processing of the object terminal.

The input unit 3030 may be configured to receive inputted digit or character information, and generate a keyboard signal input related to the user setting and function control of the object terminal. Specifically, the input unit 3030 may include a touch panel 3031 and another input apparatus 3032.

The display unit 3040 may be configured to display inputted or provided information and various menus of the object terminal. The display unit 3040 may include a display panel 3041.

The audio circuit 3060, a speaker 3061, and a microphone 3062 may provide audio interfaces.

In this embodiment, the processor 3080 included in the object terminal 120 may perform the identity verification method in the foregoing embodiments.

The object terminal 120 in the embodiments of this application may include, but not limited to, a mobile phone, a computer, a smart voice interaction device, a smart home appliance, an in-vehicle terminal, an aircraft, or the like. The embodiments of the present disclosure can be applied to various scenarios, including, but not limited to, data security, a blockchain, data storage, information technologies, and the like.

Figure 31:
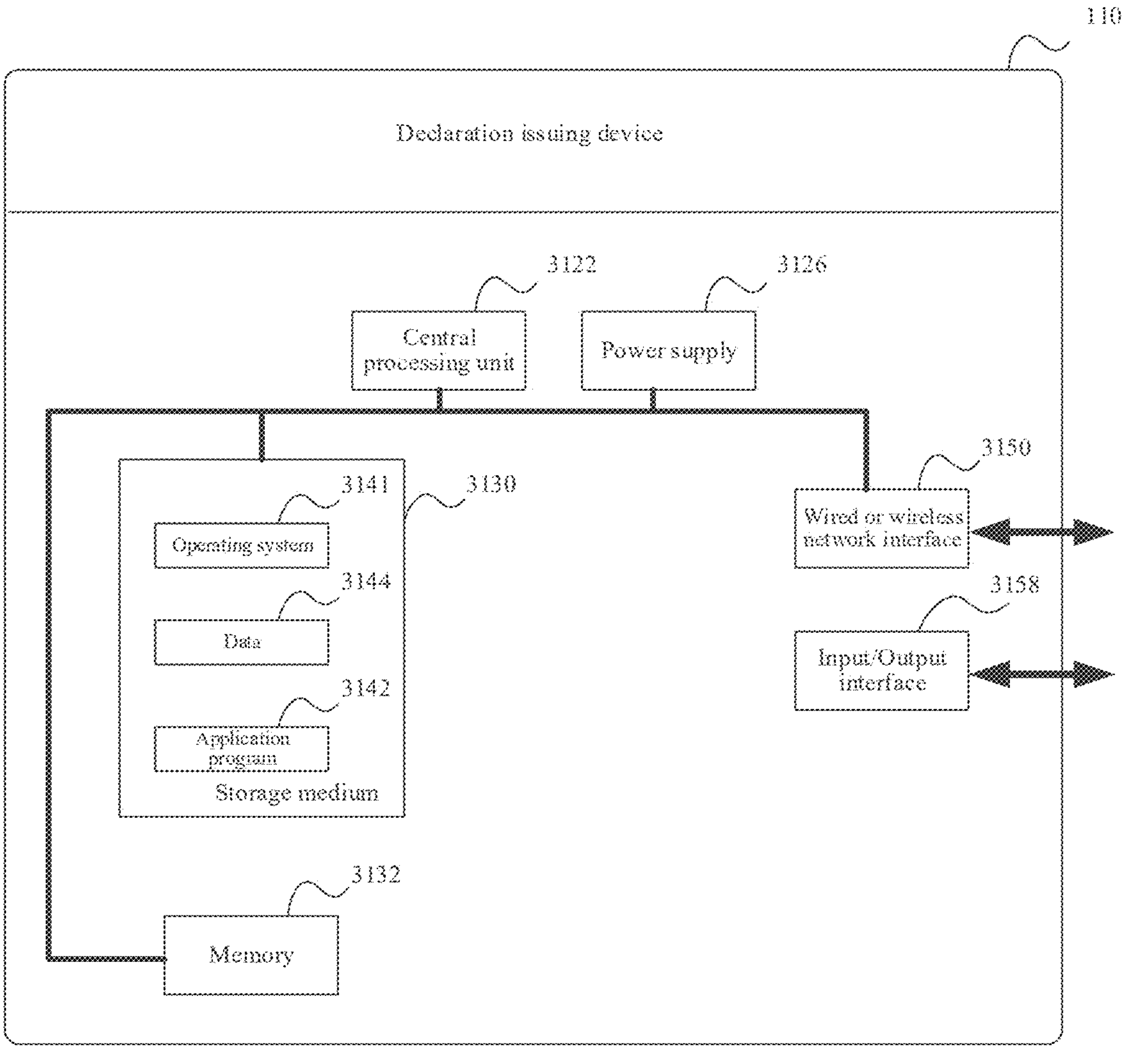
FIG. 31 is a structural diagram of a declaration issuing device according to an embodiment of this application.

FIG. 31 is a block diagram of a partial structure of a declaration issuing device 110 that implements an identity verification method according to an embodiment of this application. The declaration issuing device 110 may vary a lot due to different configuration or performance, and may include one or more central processing units (CPUs) 3122 (for example, one or more processors), a memory 3132, and one or more storage media 3130 (for example, one or more mass storage apparatuses, one or more non-transitory computer-readable storage) for storing an application program 3142 or data 3144. The memory 3132 and the storage medium 3130 may be transient storage or persistent storage. The program stored in the storage medium 3130 may include one or more modules (not marked in the figure), and each module may include a series of instruction operations to a server 3100. Still further, the central processing unit 3122 may be configured to communicate with the storage medium 3130, and execute, on the server 3100, the series of instruction operations stored in the storage medium 3130.

The server 3100 may further include one or more power supplies 3126, one or more wired or wireless network interfaces 3150, one or more input/output interfaces 3158, and/or one or more operating systems 3141 such as Windows Server™, Mac OS X™, Unix™, Linux™, and FreeBSD™.

The central processing unit 3122 included in the server 3100 may be configured to perform the identity verification method in the embodiments of this application.

An embodiment of this application further provides a non-transitory computer-readable storage medium, configured to store program code, the program code being configured to perform the identity verification method in the foregoing embodiments.

An embodiment of this application further provides a computer program product, including a computer program. A processor of a computer device reads and executes the computer program, to cause the computer device to perform the foregoing identity verification method.

In the specification and accompanying drawings of this application, the terms “first”, “second”, “third”, “fourth”, and so on (if existent) are intended to distinguish between similar objects but do not necessarily indicate a specific order or sequence. Data used in this way may be interchanged in an appropriate case, so that the embodiments of this application described herein can be implemented in a sequence other than the sequence illustrated or described herein. In addition, the terms “include” and “have” and any other variants are intended to cover the non-exclusive inclusion. For example, a process, method, system, product, or apparatus that includes a list of steps or units is not necessarily limited to those expressly listed steps or units, but may include other steps or units not expressly listed or inherent to such a process, method, product, or apparatus.

In this application, “at least one” refers to one or more, and “a plurality of” refers to two or more. The term “and/or” is configured for describing an association between associated objects and representing that three associations may exist. For example, “A and/or B” may indicate that only A exists, only B exists, and both A and B exist, where A and B may be singular or plural. A character “/” generally indicates an “or” relationship between the associated objects. “At least one of the following” or a similar expression thereof refers to any combination of these items, including one item or any combination of a plurality of items. For example, at least one of a, b, or c may represent a, b, c, “a and b”, “a and c”, “b and c”, or “a, b, and c”, where a, b, and c may be singular or plural.

In the description of the embodiments of this application, “a plurality of (or multiple)” means two or more; “greater than”, “less than”, “exceed”, and the like are understood as excluding a number itself; and “above”, “below”, “within”, and the like are understood as including a number itself.

In several embodiments provided in this application, the disclosed system, apparatus, and method may be implemented in other manners. For example, the described apparatus embodiment is merely exemplary. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may or may not be physical units, may be located in one position, or may be distributed on a plurality of network units. Some or all of the units may be selected according to an actual requirement to achieve the objectives of the solutions in the embodiments.

In addition, functional units in the embodiments of this application may be integrated into one processing unit, or each of the units may be physically separated, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for indicating a computer apparatus (which may be a personal computer, a server, or a network apparatus) to perform all or some of the steps of the methods described in embodiments of this application. The foregoing storage medium includes: any medium that can store program code, such as a USB flash disk, a removable hard disk, a read-only memory (ROM), a random access memory (RAM), a magnetic disk, or an optical disc.

The implementations provided in the embodiments of this application may also be randomly combined to achieve different technical effects.

The foregoing is specific description of the implementations of this application, but this application is not limited to the foregoing implementations. A person skilled in the art may make various equivalent variations or replacements without departing from the spirit of this application. These equivalent variations or replacements are all included in the scope defined by the claims of this application.

What is claimed is:

1. A method for identity verification, performed by an electronic device, the method comprising:

receiving a target declaration issuance request transmitted by an object terminal;

performing authentication on a target attribute of an identity of an object that initiates the target declaration issuance request;

generating a target declaration, the target declaration being an authentication result for the target attribute of the object identity;

generating a first tree, a digest of the target declaration being a bottom-layer node of the first tree, digests of other declarations issued to the object being other bottom-layer nodes of the first tree, and a digest operation being performed on each two adjacent nodes on each layer of the first tree to generate a higher-layer node and connect the each two adjacent nodes to the higher-layer node, until a root node of the first tree is generated; and transmitting the target declaration to the object terminal, to cause the object terminal to transmit, when receiving a verification request for the target attribute from a verification device, the target declaration and first bypass nodes of a first path in the first tree to the verification device for first verification, the first path being a path from the digest of the target declaration to the root node in the first tree, and the first bypass nodes being nodes that connect to the first path but are not in the first path.

2. The method according to claim 1, wherein the first verification comprises:

performing the digest operation on the target declaration, to obtain the digest of the target declaration;

determining a first recovered root node based on the digest of the target declaration and the first bypass nodes; and comparing the root node of the first tree with the first recovered root node, to perform the first verification.

3. The method according to claim 1, wherein the target declaration issuance request comprises a task level of a task to which the target declaration is applied, and wherein performing authentication on the target attribute of the identity of the object that initiates the target declaration issuance request comprises:

obtaining the task level in the target declaration issuance request;

performing first authentication on the target attribute in response to the task level satisfying a predetermined condition, the first authentication comprising: determining an authentication institution corresponding to the target attribute; transmitting the target attribute to a server of the authentication institution; and receiving the authentication result returned by the server of the authentication institution; and performing second authentication on the target attribute in response to the task level not satisfying the predetermined condition, the second authentication comprising: determining an authentication document corresponding to the target attribute; transmitting a request for the authentication document to the object terminal; and obtaining the authentication document from a response of the object terminal, and performing authentication on the target attribute based on the authentication document.

4. The method according to claim 1, wherein:

the target attribute comprises a plurality of target attributes;

the target declaration comprises a second tree; and generating the target declaration comprises:

assigning a plurality of target attribute indexes to the plurality of target attributes, and using the plurality of target attribute indexes and the plurality of target attributes as bottom-layer nodes of the second tree;

performing the digest operation on the plurality of target attributes, to obtain an attribute digest as a higher-layer node of the plurality of target attributes;

performing the digest operation on the plurality of target attribute indexes, to obtain an index digest as a higher-layer node of the plurality of target attribute indexes; and performing the digest operation on the index digest and the attribute digest, to obtain the digest of the target declaration as a root node of the second tree.

5. The method according to claim 4, wherein:

performing the digest operation on the plurality of target attributes, to obtain the attribute digest comprises:

obtaining priorities of the plurality of target attributes; arranging the plurality of target attributes into a first character string according to the priorities; and performing the digest operation on the first character string, to obtain the attribute digest; and performing the digest operation on the plurality of target attribute indexes, to obtain the index digest comprises:

arranging the plurality of target attribute indexes into a second character string according to the priorities; and performing the digest operation on the second character string, to obtain the index digest.

6. The method according to claim 4, wherein:

the identity verification method is performed by a declaration issuing device, and the target declaration further comprises a signature of the declaration issuing device; and generating the target declaration further comprises:

performing the digest operation on the second tree, to generate a digest of the second tree; and encrypting the digest of the second tree by using a private key of the declaration issuing device, to obtain the signature.

7. The method according to claim 1, wherein:

the target declaration further comprises a revocation mark;

the generating a first tree comprises:

assigning node indexes to the bottom-layer nodes of the first tree in an order in which the bottom-layer nodes are generated; and placing, according to a node index assigned to the target declaration, the target declaration on the bottom-layer node corresponding to the node index; and after the generating the first tree, the method further comprises:

receiving a revocation request for the target declaration; and maintaining the target declaration on the bottom-layer node corresponding to the node index in the first tree, and setting the revocation mark.

8. The identity verification method according to claim 1, wherein:

the target declaration further comprises an expiration date and a revocation mark;

generating the first tree comprises:

assigning node indexes to the bottom-layer nodes of the first tree in an order in which the bottom-layer nodes are generated; and placing, according to a node index assigned to the target declaration, the target declaration on the bottom-layer node corresponding to the node index; and after the generating the first tree, the method further comprises:

determining that current time exceeds the expiration date of the target declaration; and maintaining the target declaration on the bottom-layer node corresponding to the node index in the first tree, and setting the revocation mark.

9. The identity verification method according to claim 7, wherein after transmitting the target declaration to the object terminal, the method further comprises:

receiving a non-existence proving request of the verification device for the target declaration;

performing the digest operation on the target declaration, to obtain the digest of the target declaration;

determining the first recovered root node based on the digest of the target declaration and the first bypass nodes; and determining that proof-non-existence verification succeeds if the root node of the first tree is consistent with the first recovered root node and the revocation mark of the target declaration is set.

10. The method according to claim 7, wherein after maintaining the target declaration on the bottom-layer node corresponding to the node index in the first tree, and setting the revocation mark, the method further comprises:

generating a third tree, the digest of the target declaration with the revocation mark being set being used as a bottom-layer node of the third tree, digests of other declarations with revocation marks being set of the object being used as other bottom-layer nodes of the third tree, and the digest operation being performed on each two adjacent nodes on each layer of the third tree to generate and connect to a higher-layer node, until a root node of the third tree is generated; and performing the digest operation on the root node of the first tree and the root node of the third tree, to obtain an identity status of the object as a root node of an object identity tree comprising the first tree and the third tree.

11. The method according to claim 10, wherein after performing the digest operation on the root node of the first tree and the root node of the third tree, the method further comprises:

transmitting the target declaration to the object terminal, to cause the object terminal to transmit, when receiving the non-existence proving request of the verification device for the target declaration, the target declaration and second bypass nodes of a second path in the object identity tree to the verification device for second verification, the second path being a path from a node on which the target declaration is located to the root node of the object identity tree in the third tree, and the second bypass nodes being nodes that connect to the second path but are not in the second path.

12. The identity verification method according to claim 10, wherein after performing the digest operation on the root node of the first tree and the root node of the third tree, the method further comprises:

placing, in response to addition of a bottom-layer node in the first tree, a before-addition status and an after-addition status of a declaration corresponding to the bottom-layer node, and third bypass nodes of a third path in the object identity tree in a block, to record the block on a blockchain, the third path being a path from the bottom-layer node added in the first tree to the root node of the object identity tree, and the third bypass nodes being lower-layer nodes to which other nodes except the added bottom-layer node are further connected on the third path; and placing, in response to addition of a bottom-layer node in the third tree, a before-addition status and an after-addition status of a declaration corresponding to the bottom-layer node, and second bypass nodes of a second path in the object identity tree in a block, to record the block on the blockchain, the second path being a path from the bottom-layer node added in the third tree to the root node of the object identity tree, and the second bypass nodes being lower-layer nodes to which other nodes except the added bottom-layer node are further connected on the second path.

13. The method according to claim 12, wherein after placing, in response to addition of the bottom-layer node in the third tree, the before-addition status and the after-addition status of the declaration corresponding to the bottom-layer node, and second bypass nodes of a second path in the object identity tree in a block, the method further comprises:

receiving a verification request for a before-addition status of a target block on the blockchain;

obtaining an object identifier corresponding to an identifier of the target block based on the identifier of the target block and a first relationship table in a status contract, the first relationship table indicating a correspondence between the object identifier and the block identifier;

obtaining an object identity tree corresponding to the object identifier based on the object identifier and a second relationship table in the status contract, the second relationship table indicating a correspondence between the object identifier and the object identity tree; and performing verification on the before-addition status of the target block based on a zero-knowledge circuit in the status contract and the object identity tree.

14. The method according to claim 1, wherein the object terminal generates the target declaration issuance request in the following manner:

obtaining the task to which the target declaration is applied;

determining an attribute corresponding to the task as the target attribute; and generating the target declaration issuance request, the target declaration issuance request comprising the target attribute.

15. The method according to claim 1, wherein receiving the verification request of the verification device for the target attribute comprises:

receiving the verification request of the verification device, the verification request comprising a to-be-subjected-to-verification attribute; and comparing the to-be-subjected-to-verification attribute with an attribute of a declaration received by the object terminal from the declaration issuing device, and finding that the to-be-subjected-to-verification attribute is consistent with the target attribute of the target declaration.

16. A device comprising a memory for storing computer instructions and a processor in communication with the memory, wherein, when the processor executes the computer instructions, the processor is configured to cause the device to:

receive a target declaration issuance request transmitted by an object terminal;

perform authentication on a target attribute of an identity of an object that initiates the target declaration issuance request;

generate a target declaration, the target declaration being an authentication result for the target attribute of the object identity;

generate a first tree, a digest of the target declaration being a bottom-layer node of the first tree, digests of other declarations issued to the object being other bottom-layer nodes of the first tree, and a digest operation being performed on each two adjacent nodes on each layer of the first tree to generate a higher-layer node and connect the each two adjacent nodes to the higher-layer node, until a root node of the first tree is generated; and transmit the target declaration to the object terminal, to cause the object terminal to transmit, when receiving a verification request for the target attribute from a verification device, the target declaration and first bypass nodes of a first path in the first tree to the verification device for first verification, the first path being a path from the digest of the target declaration to the root node in the first tree, and the first bypass nodes being nodes that connect to the first path but are not in the first path.

17. The device according to claim 16, wherein the first verification comprises:

performing the digest operation on the target declaration, to obtain the digest of the target declaration;

determining a first recovered root node based on the digest of the target declaration and the first bypass nodes; and comparing the root node of the first tree with the first recovered root node, to perform the first verification.

18. The device according to claim 16, wherein the target declaration issuance request comprises a task level of a task to which the target declaration is applied, and wherein, when the processor is configured to cause the device to perform authentication on the target attribute of the identity of the object that initiates the target declaration issuance request, the processor is configured to cause the device to:

obtain the task level in the target declaration issuance request;

perform first authentication on the target attribute in response to the task level satisfying a predetermined condition, the first authentication comprising: determining an authentication institution corresponding to the target attribute; transmitting the target attribute to a server of the authentication institution; and receiving the authentication result returned by the server of the authentication institution; and perform second authentication on the target attribute in response to the task level not satisfying the predetermined condition, the second authentication comprising: determining an authentication document corresponding to the target attribute; transmitting a request for the authentication document to the object terminal; and obtaining the authentication document from a response of the object terminal, and performing authentication on the target attribute based on the authentication document.

19. The device according to claim 16, wherein:

the target attribute comprises a plurality of target attributes;

the target declaration comprises a second tree; and when the processor is configured to cause the device to generate the target declaration, the processor is configured to cause the device to:

assign a plurality of target attribute indexes to the plurality of target attributes, and using the plurality of target attribute indexes and the plurality of target attributes as bottom-layer nodes of the second tree;

perform the digest operation on the plurality of target attributes, to obtain an attribute digest as a higher-layer node of the plurality of target attributes;

perform the digest operation on the plurality of target attribute indexes, to obtain an index digest as a higher-layer node of the plurality of target attribute indexes; and perform the digest operation on the index digest and the attribute digest, to obtain the digest of the target declaration as a root node of the second tree.

20. A non-transitory storage medium for storing computer readable instructions, the computer readable instructions, when executed by a processor, causing the processor to:

receive a target declaration issuance request transmitted by an object terminal;

perform authentication on a target attribute of an identity of an object that initiates the target declaration issuance request;

generate a target declaration, the target declaration being an authentication result for the target attribute of the object identity;

generate a first tree, a digest of the target declaration being a bottom-layer node of the first tree, digests of other declarations issued to the object being other bottom-layer nodes of the first tree, and a digest operation being performed on each two adjacent nodes on each layer of the first tree to generate a higher-layer node and connect the each two adjacent nodes to the higher-layer node, until a root node of the first tree is generated; and transmit the target declaration to the object terminal, to cause the object terminal to transmit, when receiving a verification request for the target attribute from a verification device, the target declaration and first bypass nodes of a first path in the first tree to the verification device for first verification, the first path being a path from the digest of the target declaration to the root node in the first tree, and the first bypass nodes being nodes that connect to the first path but are not in the first path.

* * * * *